US012645709B2

(12) United States Patent
Gerber

(10) Patent No.: US 12,645,709 B2
(45) Date of Patent: Jun. 2, 2026

(54) MULTI-MODEL MACHINE LEARNING ARCHITECTURE FOR GENERATING A VARIABLE INDEX USING RELATIONSHIPS BETWEEN VARIABLES

(71) Applicant: Sander Gerber, New York, NY (US)

(72) Inventor: Sander Gerber, New York, NY (US)

( * ) Notice: Subject to any disclaimer, the term of this patent is extended or adjusted under 35 U.S.C. 154(b) by 0 days.

(21) Appl. No.: 19/051,011

(22) Filed: Feb. 11, 2025

(65) Prior Publication Data
US 2025/0258843 A1 Aug. 14, 2025

Related U.S. Application Data

(60) Provisional application No. 63/552,579, filed on Feb. 12, 2024.

(51) Int. Cl.
*G06F 16/28* (2019.01)
*G06F 16/22* (2019.01)
(52) U.S. Cl.
CPC ........ *G06F 16/288* (2019.01); *G06F 16/2228* (2019.01)
(58) Field of Classification Search
None
See application file for complete search history.

(56) References Cited

U.S. PATENT DOCUMENTS

| | | | | |
|---|---|---|---|---|
| 2014/0067713 A1* | 3/2014 | Gerber | .................. | G06Q 10/06 |
| | | | | 705/36 R |
| 2022/0084126 A1* | 3/2022 | Gerber | .................. | G06Q 40/04 |
| 2023/0186367 A1* | 6/2023 | Cheng | ............... | G06Q 30/0202 |
| | | | | 705/26.7 |

* cited by examiner

*Primary Examiner* — Neveen Abel Jalil
*Assistant Examiner* — John J Morris
(74) *Attorney, Agent, or Firm* — Foley & Lardner LLP

(57) ABSTRACT

A computing device can use a machine learning model to generate configuration parameters for a relationship computing model. The configuration parameters can include a time period for a plurality of variables, an alert threshold parameter for the plurality of variables, a lower relationship threshold parameter for each of the plurality of variables, and an upper relationship threshold parameter for each of the plurality of variables. The computing device can configure the relationship computing model using the configuration parameters. The computing device can execute, in some cases using a machine learning language processing model, the configured relationship computing model to generate relationships for pairs of the variables. Based on the execution, the computing device can generate an alert indicating a set of pairs of variables that correspond to a relationship value exceeding an alert threshold.

20 Claims, 26 Drawing Sheets

Apply input filters to historical performance. 210

Compare filtered results between variable records. 220

Display relation of variable records based on comparison. 230

Receive input of potential investments. 310

Receive input of acceptable risk level. 320

Calculate expected return for potential investments at acceptable risk level using Gerber statistics. 330

Receive input of capital to invest. 340

Allocate capital based upon the calculation of expected return. 350

Receive input of potential investments. 410

Receive input of allocated capital. 420

Calculate expected return for potential investments using Gerber statistics using the Gerber statistic. 430

Receive adjustment of investments or allocation of capital. 440

Calculate expected return for potential investments using Gerber statistics. 450

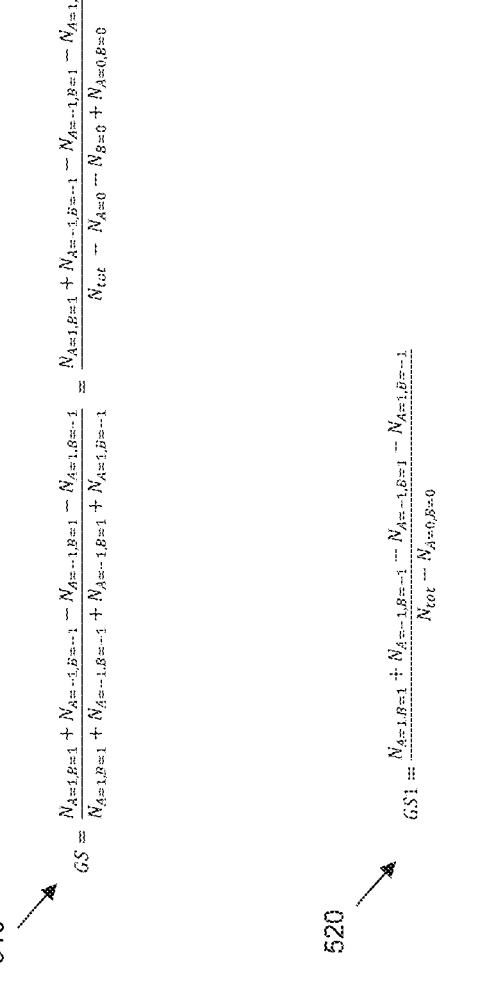
$$GS = \frac{N_{A=1,B=1} + N_{A=-1,B=-1} - N_{A=-1,B=1} - N_{A=1,B=-1}}{N_{A=1,B=1} + N_{A=-1,B=-1} + N_{A=-1,B=1} + N_{A=1,B=-1}} = \frac{N_{A=1,B=1} + N_{A=-1,B=-1} - N_{A=-1,B=1} - N_{A=1,B=-1}}{N_{tot} - N_{A=0} - N_{B=0} + N_{A=0,B=0}}$$
510
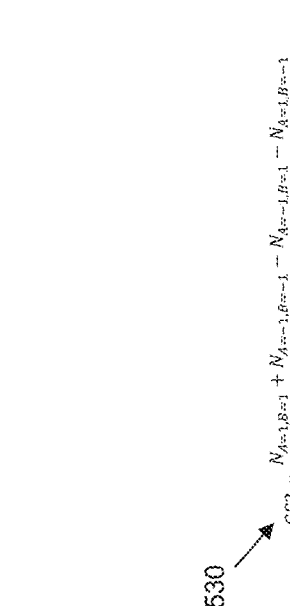
$$GS1 = \frac{N_{A=1,B=1} + N_{A=-1,B=-1} - N_{A=-1,B=1} - N_{A=1,B=-1}}{N_{tot} - N_{A=0,B=0}}$$
520
$$GS2 = \frac{N_{A=1,B=1} + N_{A=-1,B=-1} - N_{A=-1,B=1} - N_{A=1,B=-1}}{\sqrt{N_{A=1} + N_{A=-1}} \sqrt{N_{B=1} + N_{B=-1}}}$$
530
FIG. 5A

FIG. 8

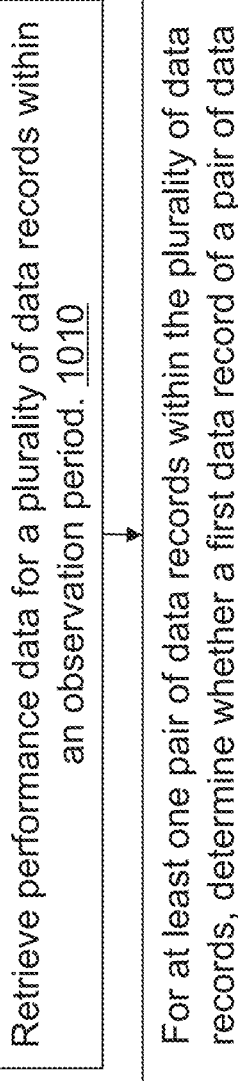

Retrieve performance data for a plurality of data records within an observation period. 1010

For at least one pair of data records, determine whether a first data record of a pair of data records and a second data record of the pair of data records have a positive union or a negative union based on each instance in which a respective value of the performance data for each data record is above an upper threshold or below a lower threshold for the first data record or the second data record. 1020

Display on a graphical user interface a representation of the positive or negative union. 1030

In response to receiving an indication of interaction with the representation of the positive or negative union, dynamically revise the graphical user interface by displaying, for the pair of data records, a visual indicator within four regions. 1040

FIG. 10A

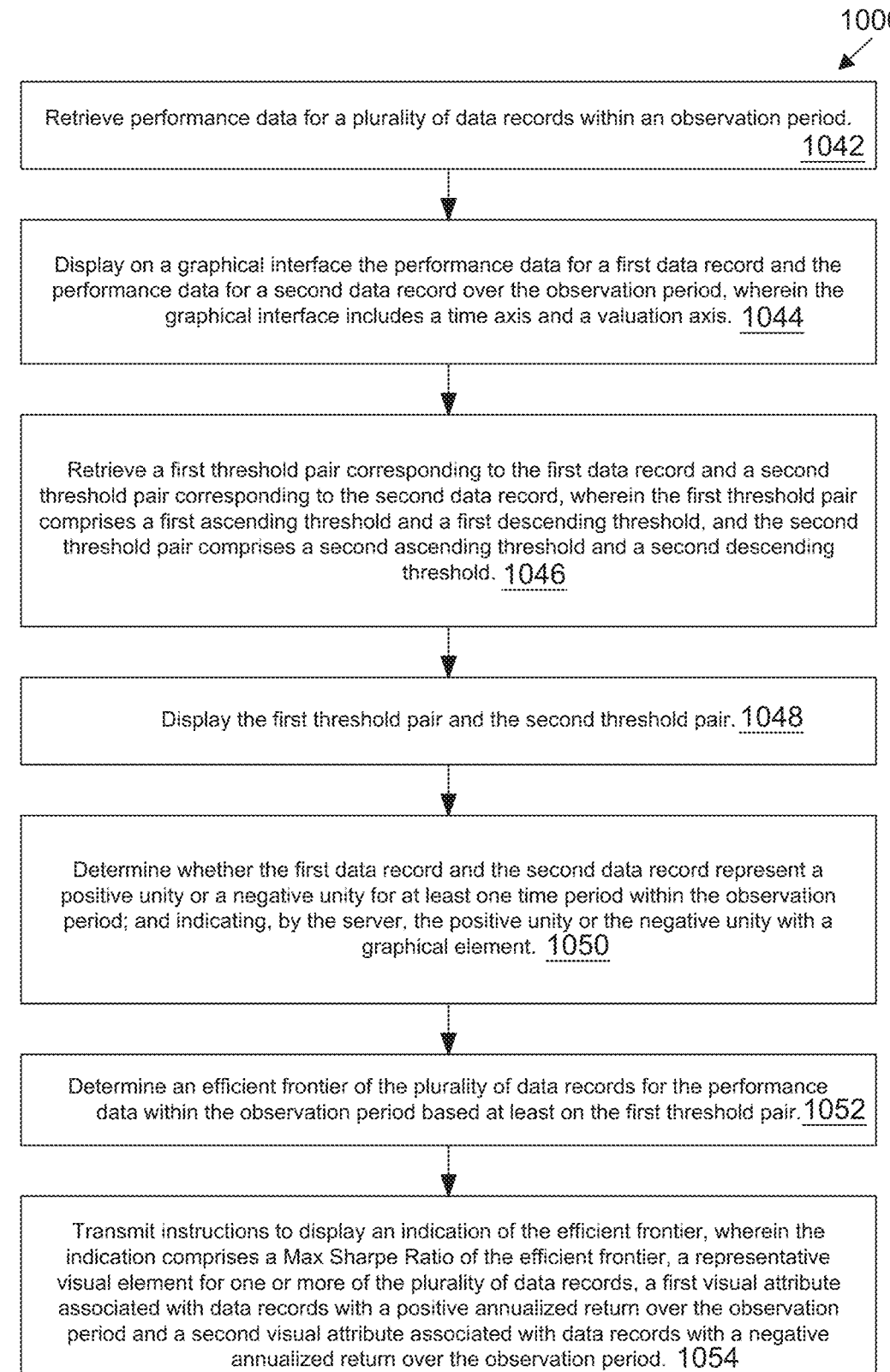

1000

Retrieve performance data for a plurality of data records within an observation period. 1042

Display on a graphical interface the performance data for a first data record and the performance data for a second data record over the observation period, wherein the graphical interface includes a time axis and a valuation axis. 1044

Retrieve a first threshold pair corresponding to the first data record and a second threshold pair corresponding to the second data record, wherein the first threshold pair comprises a first ascending threshold and a first descending threshold, and the second threshold pair comprises a second ascending threshold and a second descending threshold. 1046

Display the first threshold pair and the second threshold pair. 1048

Determine whether the first data record and the second data record represent a positive unity or a negative unity for at least one time period within the observation period; and indicating, by the server, the positive unity or the negative unity with a graphical element. 1050

Determine an efficient frontier of the plurality of data records for the performance data within the observation period based at least on the first threshold pair. 1052

Transmit instructions to display an indication of the efficient frontier, wherein the indication comprises a Max Sharpe Ratio of the efficient frontier, a representative visual element for one or more of the plurality of data records, a first visual attribute associated with data records with a positive annualized return over the observation period and a second visual attribute associated with data records with a negative annualized return over the observation period. 1054

Figure 19:
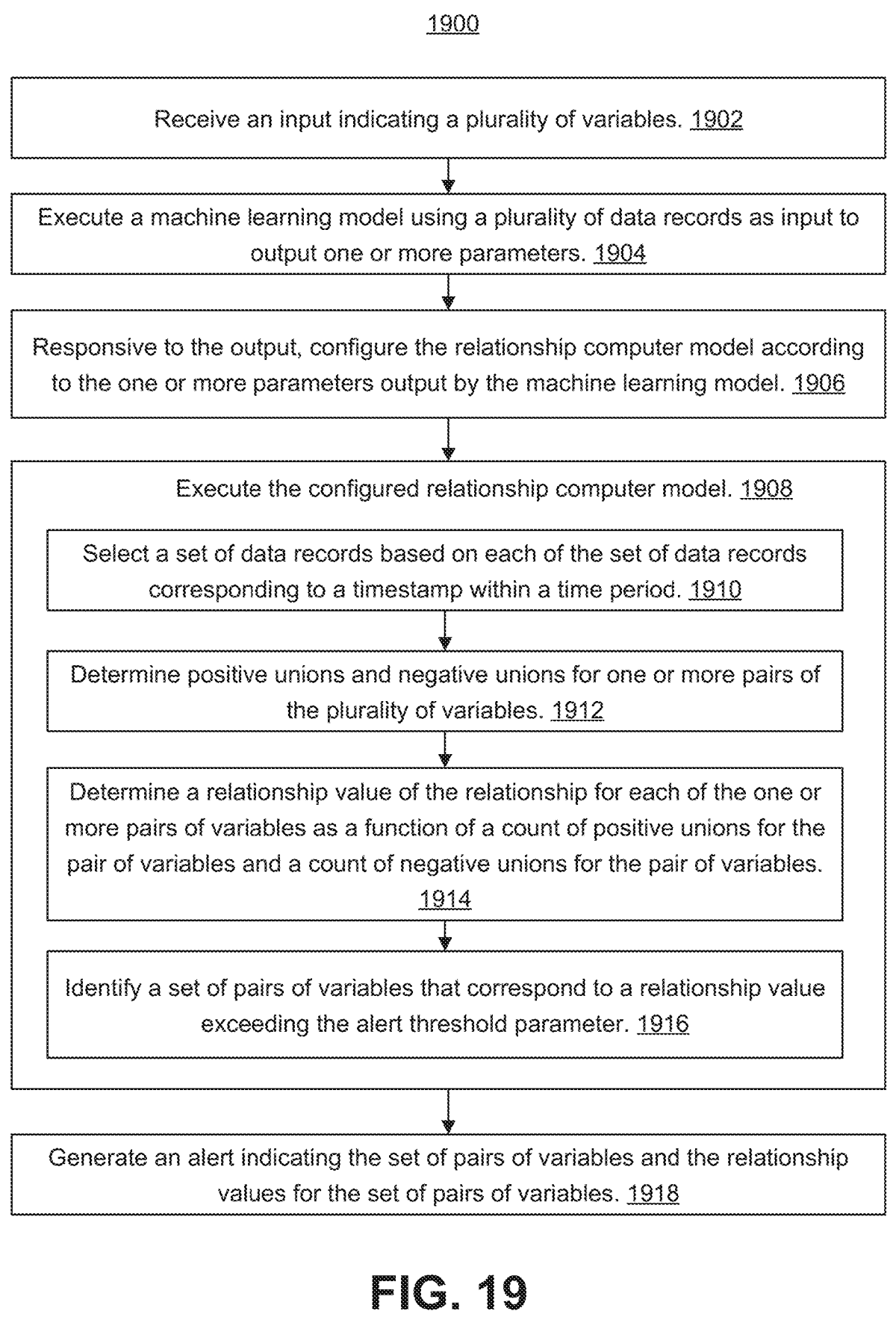

Receive an input indicating a plurality of variables. 1902

Execute a machine learning model using a plurality of data records as input to output one or more parameters. 1904

Responsive to the output, configure the relationship computer model according to the one or more parameters output by the machine learning model. 1906

Execute the configured relationship computer model. 1908

Select a set of data records based on each of the set of data records corresponding to a timestamp within a time period. 1910

Determine positive unions and negative unions for one or more pairs of the plurality of variables. 1912

Determine a relationship value of the relationship for each of the one or more pairs of variables as a function of a count of positive unions for the pair of variables and a count of negative unions for the pair of variables. 1914

Identify a set of pairs of variables that correspond to a relationship value exceeding the alert threshold parameter. 1916

Generate an alert indicating the set of pairs of variables and the relationship values for the set of pairs of variables. 1918

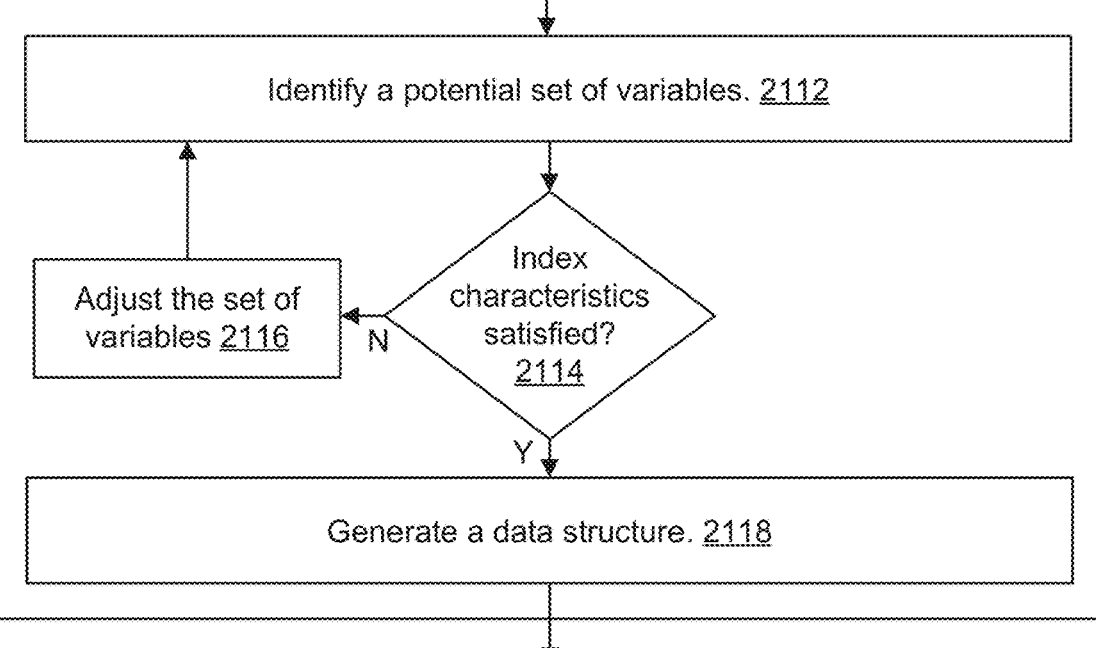

Receive a request for a recommendation for a combination of variables to include in a variable index. 2102

Execute a machine learning language processing model using the request to identify a set of variables. 2104

Execute a relationship computer model to generate a relationship for each of one or more pairs of potential variables. 2106

Determine positive unions and negative unions for one or more pairs of the plurality of variables. 2108

Determine a relationship value of the relationship for each of the one or more pairs of variables as a function of a count of positive unions for the pair of variables and a count of negative unions for the pair of variables. 2110

Identify a potential set of variables. 2112

Adjust the set of variables 2116

Index characteristics satisfied? 2114

N

Y

Generate a data structure. 2118

Present a visual representation of the data structure in the recommendation for the combination of variables for the variable index on the user interface for display on the client device. 2120

FIG. 21

MULTI-MODEL MACHINE LEARNING ARCHITECTURE FOR GENERATING A VARIABLE INDEX USING RELATIONSHIPS BETWEEN VARIABLES

CROSS-REFERENCE TO RELATED APPLICATIONS

This application claims the benefit of priority to U.S. Provisional Application No. 63/552,579, filed Feb. 12, 2024, the entirety of which is incorporated by reference herein.

TECHNICAL FIELD

This invention relates generally to systems and methods for using a multi-model machine learning architecture for generating a variable index using relationships between variables.

BACKGROUND

A computer model, such as a machine learning model, may be trained to interface with different users and make decisions or recommendations regarding different variable indices based on preferences of the users. For example, a computer model may be configured to implement an algorithm or learned weights and/or parameters to automatically generate recommendations for users. However, such models often struggle with cross-domain feature interaction modeling given the dynamic state of variables and the rapid seemingly unrelated changes that occur between variables over time.

In some cases, a computing system may store a computer model that is trained or configured to generate recommendations for variables of a variable index based on the current state or value of other variables in the variable index. The computer model may be manually programmed with parameters to process the relationships between different variables over time. However, this manual programming is prone to errors, as human programmers typically struggle to anticipate and explicitly code all possible interaction patterns, especially given the intricate and often subtle ways that variables can influence each other and how such influence can change in real time. It can be difficult to identify and use the correct parameters for the computer model at any given time. This problem can compound given the rapidly changing nature of a variable index because it may be difficult for a programmer to change the parameters of the computer model in real time to account for every change in the relationships between variables.

One attempt to address these difficulties is to implement a machine learning language processing model (e.g., a large language model, a small language model, or a transformer) to generate recommendations for variable indices based on user inputs and learned parameters. While these models can process natural language prompts and generate flexible recommendations, they are particularly prone to hallucinations when handling large sets of variable identifications, often generating non-existent variables or failing to accurately reference the provided input variables.

SUMMARY

Systems and methods may use a manually programmed computer model to select or identify variables from a variable index in response to requests. For example, a computer model (e.g., a machine learning model) may be configured with manually programmed parameters and weights that determine how the model processes incoming requests to identify variables in the index. However, manually configuring the computer model in this way may cause technical difficulties to arise. For example, the variable index may undergo frequent updates or modifications, making it impractical to manually adjust the model's parameters in real time to accurately reflect each change in the variable index, often requiring system restarts and significant computational overhead for each parameter update. Additionally, many users who modify the model's behavior lack expertise in the specific programming languages required to properly update the model's parameters and weights, which can lead to system downtime and potential memory leaks from improper configuration attempts. Furthermore, allowing unrestricted access to modify the model's parameters creates security and reliability risks, as users might inadvertently or intentionally alter the weights in ways that compromise the model's performance or introduce biases into the model's variable selection process, potentially corrupting the model's underlying data structures.

To overcome the technical challenges arising from manually configuring a computer model on the fly to identify variables based on real-time variable dynamics, a computer may automatically configure the computer model over time using a machine learning model that is configured to generate model configuration parameters. For example, the computer can receive one or more variables selected through a graphical user interface on a client device. The computer can identify historical data records for each of the selected variables. The computer can then execute a parameter machine learning model (e.g., a support vector machine, a neural network, or a random forest) using identifications of the variables and the historical data records as input to automatically determine parameters for a relationship computer model configured to output relationships between variables. The parameters can include a time period, an alert threshold, and upper and lower relationship thresholds for each variable.

The computer can automatically configure the relationship computer model using these generated parameters to configure the relationship computer model, eliminating the need for any manual programming or reprogramming to adjust the parameters of the relationship computer model when the variable index changes. The computer can then execute the relationship computer model based on the configuration to determine relationship values between pairs of variables. The computer can generate an alert at a user interface (e.g., of the client device that submitted the selection of variables) identifying pairs of variables with a relationship value exceeding a threshold. The computer can display the identified pairs of variables and their relationship values through the alert at the client device. In some cases, the computer can automatically adjust a variable index of the user at the client device based on the relationship values and/or the alert, such as by removing variables with no significant relationships, grouping highly correlated variables together, or prioritizing variables with the strongest relationship values for display in the user interface. By using the parameter machine learning model and the relationship computing model in this way, the computer can update the relationship computer model rapidly and in real time as the variable index changes, eliminating the need for users to reprogram the relationship computer model with real-time manual parameter updates, removing the requirement for users to know specific programming languages to modify model behavior, and/or preventing unauthorized or improper modification of model parameters that could compromise performance.

One attempt to address the difficulties of using a computer model to identify variables of a variable index is to implement a machine learning language processing model (e.g., a large language model, a small language model, or a transformer). For example, a computing system may store or implement a machine learning language processing model to generate recommendations regarding different variable indices. The computing system may input prompts with variable indices and historical data for the variable indices, along with instructions to generate a recommendation selecting one or more variables from the variable indices. The computing system may execute the model to cause the machine learning language processing model to apply learned weights and/or parameters to the variable indices. Based on the execution, the machine learning language processing model may generate a predicted set of variables. However, this prediction is prone to hallucinations due to the large number of variable identifications and historical data that may be included in the input prompt. Machine learning language processing models are especially prone to hallucinations when handling large inputs (e.g., inputs with a large number of tokens) or performing arithmetic, as they typically predict text sequences rather than perform mathematical operations. Consequently, the model may inaccurately identify variables to include in a recommendation, sometimes by including non-existent variables or those not provided in the input in the recommendation.

To overcome the hallucination problem that may accompany using a machine learning language processing model identify variables, a computing device may implement a sequence of machine learning models and/or applications to generate responses to requests for recommendations regarding different variables and/or variable indices. For example, the computing device can use a machine learning language processing model (e.g., a large language model, such as a neural network or a transformer) to automatically select and manage different applications or other machine learning models to generate recommendations for managing variable indices in response to requests from users. The machine learning language processing model may have been trained to identify applications stored in memory of the computing device to use to generate responses to requests for recommendations regarding the variable indices. For example, the computing device can receive a request for variables to include in a variable index of a profile. The computing device can input the request into the machine learning language processing model and execute the machine learning language processing model to cause the machine learning language processing model to generate a recommendation containing a set of variables to include in the variable index for presentation to the user.

To generate the recommendation containing the set of variables to include in the variable index, the machine learning language processing model can select and execute a sequence of machine learning models and/or applications. For instance, the machine learning language processing model can generate identifications of a sequence of machine learning models and/or computer models to use to generate the recommendation. The machine learning language processing model may retrieve variables of the variable index associated with the user that input the request. The machine learning language processing model can execute a querying machine learning language processing model using the identifications of the variables of the variable index as well as identifications of variables input and/or selected by the user in the request to retrieve data records containing historical performance data of the variables (e.g., the variables of the variable index and the variables input by the user) for different time windows (e.g., changes in the variables within different time windows, such as different days, weeks, or months). The machine learning language processing model can execute a relationship computer model using the retrieved data records as input to generate relationships between pairs of the variables (e.g., numerical indicators of the co-movement between the pairs of variables). The machine learning language processing model can use the relationships to select or identify a set of variables to include in the variable index. The machine learning language processing model can generate a recommendation including the set of variables and cause presentation of the set of variables on the user interface through which the user input the request.

In another example, the computing device can receive a request for an alert containing a recommendation of a set of pairs of variables to monitor. The computing device may recommend monitoring the set of pairs of variables because the pairs have a high co-movement relationship, for example. The computing device can input the request into the machine learning language processing model and execute the machine learning language processing model to cause the machine learning language processing model to generate an alert according to the request.

To generate the alert containing the set of pairs of variables to monitor, the machine learning language processing model can execute a sequence of machine learning models and/or applications. For instance, the machine learning language processing model can generate identifications of a sequence of machine learning models and/or computer models or applications to use to generate the recommendation. Based on the sequence, the machine learning language processing model may execute a querying machine learning language processing model using the identifications of the selection of variables included in the request as input to retrieve data records containing historical performance data of the variables for different time windows. The machine learning language processing model can execute a parameter machine learning model using the retrieved data records as input to generate or otherwise cause the parameter machine learning model to output different parameters for configuring the relationship computer model. The parameters may be or include an alert threshold parameter for the selection of variables, a lower relationship threshold parameter for each of the selection of variables, and an upper relationship threshold parameter for each of the selection of variables. The relationship computing model can determine relationship values for different pairs of the selection of variables using the upper relationship threshold parameter and the lower relationship threshold parameter of the respective variables as input and determining positive and/or negative unions for corresponding data records of the respective variables of each pair of variables. The relationship computing model can compare the relationship value to the alert threshold and identify any pairs with a relationship value exceeding the threshold. The relationship computing model can output the identified pairs to the machine learning language processing model.

The machine learning language processing model can generate an alert including the set of the pairs of variables identified by the relationship computing model. The machine learning language processing model can cause presentation of the alert to the user on the user interface through which the user input the request. In this way, the machine learning model can generate a unique alert for variables to monitor using criteria and configuration parameters that are generated based on the variables that were input by the user.

Advantageously, the machine learning language processing model can be configured to dynamically generate responses to any number of requests. For example, the computing device can store any number of models or applications that have each been configured or trained to have specific functions. The machine learning language processing model may be trained to identify the correct models and/or applications to select and execute to generate responses to requests regarding variable indices and execute sequences of models accordingly based on such requests. Accordingly, the machine learning language processing model can generate responses to requests with more accuracy and while generating fewer hallucinations than systems that only use trained weights of a machine learning language processing model to generate responses.

According to an implementation of the present disclosure, a method may include receiving, by a server, an input indicating a plurality of variables on a graphical user interface displayed on a client computing device, the plurality of variables corresponding to a plurality of data records comprising historical data associated with the plurality of variables; executing, by the server, a machine learning model using the plurality of data records as input to output one or more parameters, the one or more parameters comprising at least a time period for the plurality of variables, an alert threshold parameter for the plurality of variables, a lower relationship threshold parameter for each of the plurality of variables, and an upper relationship threshold parameter for each of the plurality of variables for a relationship computer model configured to automatically generate a relationship for each of one or more pairs of the plurality of variables; responsive to the output, configuring, by the server, the relationship computer model according to the time period for the plurality of variables, the alert threshold parameter for the plurality of variables, the lower relationship threshold parameter for each of the plurality of variables, and the upper relationship threshold parameter for each of the plurality of variables output by the machine learning model; executing, by the server, the configured relationship computer model to generate a relationship for each of the one or more pairs of the plurality of variables, wherein executing the configured relationship computer model comprises: selecting, by the configured relationship computer model, a set of data records from the plurality of data records based on each of the set of data records corresponding to a timestamp within the time period; for each of the one or more pairs of the plurality of variables: determining, by the configured relationship computer model using the selected set of data records, whether a first data record of a pair of data records for a first variable of the pair of variables and a second data record of the pair of data records for a second variable of the pair of variables have a positive union or a negative union based on whether a respective value of performance data of the first data record and the second data record exceeds the upper relationship threshold parameter for a respective first or second variable or is less than the lower relationship threshold parameter for another of the respective first or second variable; and determining, by the configured relationship computer model, a relationship value of the relationship for the pair of variables as a function of a count of positive unions for the pair of variables and a count of negative unions for the pair of variables; and identifying, by the configured relationship computer model, a set of pairs of variables that correspond to a relationship value exceeding the alert threshold parameter; and generating, by the server to the client computing device, an alert indicating the set of pairs of variables and the relationship values for the set of pairs of variables.

According to another implementation of the present disclosure, a system may include a processor; and a non-transitory, computer-readable medium comprising instructions which, when executed by the processor, cause the processor to: receive an input indicating a plurality of variables on a graphical user interface displayed on a client computing device, the plurality of variables corresponding to a plurality of data records comprising historical data associated with the plurality of variables; execute a machine learning model using the plurality of data records as input to output one or more parameters, the one or more parameters comprising at least a time period for the plurality of variables, an alert threshold parameter for the plurality of variables, a lower relationship threshold parameter for each of the plurality of variables, and an upper relationship threshold parameter for each of the plurality of variables for a relationship computer model configured to automatically generate a relationship for each of one or more pairs of the plurality of variables; responsive to the output, configure the relationship computer model according to the time period for the plurality of variables, the alert threshold parameter for the plurality of variables, the lower relationship threshold parameter for each of the plurality of variables, and the upper relationship threshold parameter for each of the plurality of variables output by the machine learning model; execute the configured relationship computer model to generate a relationship for each of the one or more pairs of the plurality of variables, wherein executing the configured relationship computer model comprises: select, using the configured relationship computer model, a set of data records from the plurality of data records based on each of the set of data records corresponding to a timestamp within the time period; for each of the one or more pairs of the plurality of variables: determine, using the configured relationship computer model using the selected set of data records, whether a first data record of a pair of data records for a first variable of the pair of variables and a second data record of the pair of data records for a second variable of the pair of variables have a positive union or a negative union based on whether a respective value of performance data of the first data record and the second data record exceeds the upper relationship threshold parameter for a respective first or second variable or is less than the lower relationship threshold parameter for another of the respective first or second variable; and determine a relationship value of the relationship for the pair of variables as a function of a count of positive unions for the pair of variables and a count of negative unions for the pair of variables; and identify, using the configured relationship computer model, a set of pairs of variables that correspond to a relationship value exceeding the alert threshold parameter; and generate, to the client computing device, an alert indicating the set of pairs of variables and the relationship values for the set of pairs of variables.

According to another implementation of the present disclosure, a method may include receiving, by a server through a chat component of a user interface presented on a client device, a text request for a recommendation for a combination of variables for a variable index; executing, by the server, a machine learning language processing model using the text request to identify a set of variables that causes the variable index to have one or more index characteristics, wherein executing the machine learning language processing model comprises: executing, by the server using a plurality of data records comprising historical data associated with a plurality of variables, a relationship computer model to generate a relationship for each of one or more pairs of potential variables of the plurality of variables, wherein executing the relationship computer model comprises, for each of one or more pairs of the plurality of variables: determining, by the relationship computer model using the plurality of data records, whether a first data record of a pair of data records for a first variable of the pair of variables and a second data record of the pair of data records for a second variable of the pair of variables have a positive union or a negative union based on whether a respective value of performance data of the first data record and the second data record exceeds an upper relationship threshold or is less than a lower relationship threshold; and determining, by the relationship computer model, a relationship value of the relationship for the pair of variables as a function of a count of positive unions for the pair of variables and a count of negative unions for the pair of variables; and until determining the set of variables that causes the variable index to have the one or more index characteristics, iteratively: identifying, by the machine learning language processing model, the set of variables of the plurality of variables and the relationship values of the relationships of each pair of variables of the set of variables; determining, by the machine learning language processing model, whether the set of variables causes the variable index to have the one or more index characteristics based on the relationship values of the relationships of the pairs of variables of the set of variables; and responsive to determining the set of variables does not cause the variable index to have the one or more index characteristics, adjusting, by the machine learning language processing model, the variables that are included in the set of variables; responsive to determining the set of variables causes the variable index to have the one or more index characteristics, generate, using the machine learning language processing model, a data structure comprising the set of variables; and present a visual representation of the data structure in the recommendation for the combination of variables for the variable index on the user interface for display on the client device.

According to another implementation of the present disclosure, a system may include a processor; and a non-transitory, computer-readable medium comprising instructions which, when executed by the processor, cause the processor to: receive, through a chat component of a user interface presented on a client device, a text request for a recommendation for a combination of variables for a variable index; execute a machine learning language processing model using the text request to identify a set of variables that causes the variable index to have one or more index characteristics, wherein executing the machine learning language processing model comprises: execute, using a plurality of data records comprising historical data associated with a plurality of variables, a relationship computer model to generate a relationship for each of one or more pairs of potential variables of the plurality of variables, wherein executing the relationship computer model comprises, for each of one or more pairs of the plurality of variables: determine, using the relationship computer model using the plurality of data records, whether a first data record of a pair of data records for a first variable of the pair of variables and a second data record of the pair of data records for a second variable of the pair of variables have a positive union or a negative union based on whether a respective value of performance data of the first data record and the second data record exceeds an upper relationship threshold or is less than a lower relationship threshold; and determine, using the relationship computer model, a relationship value of the relationship for the pair of variables as a function of a count of positive unions for the pair of variables and a count of negative unions for the pair of variables; and until determining the set of variables that causes the variable index to have the one or more index characteristics, iteratively: identify, using the machine learning language processing model, the set of variables of the plurality of variables and the relationship values of the relationships of each pair of variables of the set of variables; determine, using the machine learning language processing model, whether the set of variables causes the variable index to have the one or more index characteristics based on the relationship values of the relationships of the pairs of variables of the set of variables; and responsive to determining the set of variables does not cause the variable index to have the one or more index characteristics, adjust, using the machine learning language processing model, the variables that are included in the set of variables; and responsive to determining the set of variables causes the variable index to have the one or more index characteristics, present the set of variables in the recommendation for the combination of variables for the variable index on the user interface for display on the client device.

Additional features and advantages of various embodiments will be set forth in the description which follows, and in part will be apparent from the description. Other advantages will be realized and attained by the structure particularly pointed out in the exemplary embodiments in the written description and claims hereof as well as the appended drawings. It is to be understood that both the foregoing general description and the following detailed description are exemplary and explanatory and are intended to provide further explanation.

BRIEF DESCRIPTION OF THE DRAWINGS

The preferred embodiments of the present invention are illustrated by way of example and not limited to the following figures:

FIGS. 5A-5B depict different methods used for portfolio construction and for comparing two variables, according to an embodiment.

FIGS. 6-9 depict various graphical user interfaces displayed, according to an embodiment.

FIG. 10A depicts a method of portfolio construction, analysis, and visualization, according to an embodiment.

FIG. 10B depicts a method of portfolio construction, analysis, and visualization, according to an embodiment.

FIG. 19 depicts a method for generating a variable index based on relationships between variables, according to an embodiment.

FIG. 21 depicts a method for generating a variable index based on relationships between variables, according to an embodiment.

DETAILED DESCRIPTION

Figure 1:
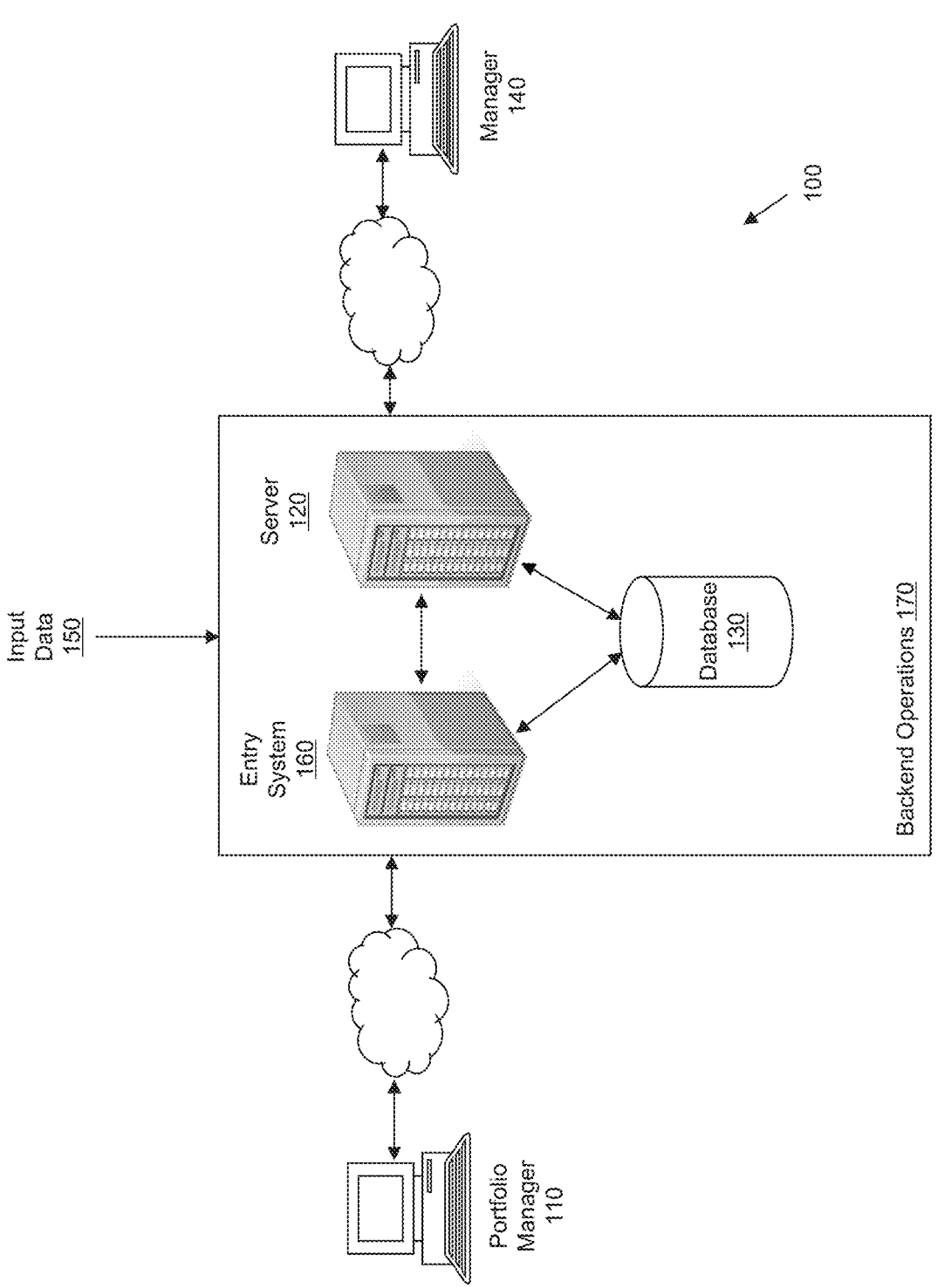
FIG. 1 depicts a system architecture, according to an embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

The embodiments described herein attempt to identify previously hidden relationships between two or more variables or further characterize known relationships between variables. This information has many applications in the field of finance and investment management. For example, information about the relationships between multiple variables (e.g., asset classes, deal codes, investment strategies, and/or sectors or markets) can be used as an input during portfolio construction, such as a measure of covariance across different variables. In another example, when managing multiple investments, it may be useful to analyze relationships between the investments to determine whether those investments are truly independent investments.

The current framework provides numerous advantages over known techniques for measuring relationships between variables. Such conventional techniques often rely on regression analysis, which can have several shortcomings. Regression analysis, as used herein, may refer to the commonly used ordinary least squares linear regressions encompassing an entire data population. For example, regression analysis typically relies upon many data points to represent every movement of the variables, but many of these movements may be minor changes that do not provide any significant insight into the relationship between the two variables. In other words, regression analysis often incorporates "noise" by including too many inconsequential data points. As another example, regression analysis typically incorporates data points covering every movement over an extended period of time, but certain relationships, such as those in financial markets, can change drastically in relatively short periods of time. When such a change occurs, a large number of data points from the distant history may improperly weight the results and minimize the effect of a more recent, substantial movement. As another example, typical regression analysis can rely on R2 calculations, which use a straight-line fit, but relationships in the financial markets often do not follow straight line relationships.

Generally, the systems and methods described herein can measure the relationship between variables by determining when the variables exceed a minimum absolute value change in the same or opposite directions. The relationship between variables, as described herein, is known as the "Gerber relationship." The Gerber relationship between two or more variables (e.g., asset classes, sectors, or markets) is an alternative measure of co-movement between those variables. A Gerber relationship between variables can be a positive relation (e.g., both variables generally move in the same direction at the same time) or a negative relation (e.g., both variables generally move in opposite directions at the same time). A large positive relation may signify that the variables typically move in the same direction, while a large negative relation may signify that the variables typically move in opposite directions.

In contrast to conventional techniques, the systems and methods described herein can incorporate a threshold for filtering data points reflecting smaller variable movements that do not have any economic significance. In some embodiments, a threshold may be applied such that the Gerber relationship only considers data points reflecting a change greater than a predetermined magnitude. For example, when measuring the Gerber relationship between two asset classes, a threshold may be applied such that relatively minor changes in the value of either asset class can be filtered from the analysis. Any movement less than the threshold may be considered "noise," and filtering out those data points below the threshold may be desirable because they are likely to erroneously skew the analysis. After applying a threshold to filter out noise, the remaining data points may be used to measure the Gerber relationship between the variables. Accordingly, the Gerber relationship can overcome the problem of data noise caused by conventional technique's over-inclusion of historical data in favor of more immediate, significant data about the variables.

In some embodiments, the systems and methods described herein may also apply a discretization process such that all data points exceeding the threshold are given equal weight. For example, when measuring the Gerber relationship between two asset classes, data points passing the threshold may be discretized such that a modest movement barely exceeding the threshold is given the same weight as a massive movement that exceeds the threshold ten-fold. Any massive movement might be conventionally considered an outlier, and therefore, its magnitude could have been considered to erroneously skew an analysis. However, the event of the massive movement may still be incorporated into this analysis because it has been discretized. In summary, measuring a Gerber relationship can include implementing a threshold to eliminate data noise and then discretizing the remaining observations to normalize any outliers while still incorporating these economically significant observations into the analysis.

Generally, the systems and methods described herein can calculate a statistic quantifying the Gerber relationship between variables. This statistic representing the Gerber relationship, as described herein, is known as the "Gerber Statistic." In some embodiments, the Gerber Statistic can be a positive or negative number reflecting the relative direction and strength of the relationship. Calculating the Gerber Statistic may include counting the number of instances when values of both variables changed beyond a threshold and considering whether those changes were both in the same direction or in opposite directions. Instances when both variables move beyond the threshold and in the same direction (i.e., have a positive relation) are referred to herein as "positive unions," while instances when both variables move beyond the threshold and in opposite directions (i.e., have a negative relation) are referred to herein as "negative unions." Only periods in which both variables have movements beyond the threshold may be considered when calculating the Gerber Statistic.

In some embodiments, a Gerber Statistic can be a number between −100% and +100% that characterizes the Gerber relationship between a pair of variables. In one example of calculating a Gerber Statistic, a threshold value can be set at a predefined percentage value of the underlying assets (e.g., 1%) for a period of 10 days. During those 10 days, a first variable and a second variable may have movements in the same or opposite directions. Each time period in which the movements of both of these variables exceed the threshold value can be compared to determine the co-movement of the variables. One example method for calculating the Gerber Statistic can include determining the number of positive unions minus the number of negative unions, all divided by a number of total unions. Alternatively, the Gerber Statistic can be calculated by determining the number of positive unions minus a number of negative unions, all divided by the length of the period. The Gerber Statistic is not intended to be limited to any particular formula, but can include any calculation of co-movement where a threshold is applied to eliminate noise, and the remaining observations are compared for positive unions, negative unions, or both positive and negative unions.

In another example of calculating a Gerber Statistic, there are 5 of the 10 days where the value of the first variable moved more than the threshold value. During those 5 days, the second variable only moved more than the threshold value 4 times. Therefore, the number of total unions is 4. During 3 of those 4 days, the first and second variables moved in the same direction (e.g., both positive or both negative), so the number of positive unions is 3. During the 1 remaining day from those 4 days, the first and second variables moved in the opposite directions (e.g., one positive and one negative), so the number of negative unions is 1. In this example, the Gerber Statistic can be calculated as (3−1)/4, which is 50%. By implementing a threshold, any insignificant movements under the threshold value of $50,000 can be eliminated from the comparison. The remaining movements that exceed the threshold are discretized. If one movement was $300,000 and another movement was $70,000, these amounts are considered movements above the threshold value, but the magnitude above the threshold is not considered pertinent to the measure. Each movement above the threshold value is given equal weight, so a value conventionally considered an "outlier" would not skew these results.

In some embodiments, a Gerber Statistic near −100% may indicate that the two variables have a high negative Gerber relationship. In other words, when the two variables both experience large movements, they typically move in opposite directions. On the other hand, a Gerber Statistic close to 100% may indicate that the two variables have a high positive relation. In other words, when the two variables both experience large movements, they typically move in the same direction. Additionally, a Gerber Statistic around 0% may indicate that the two variables do not have any movements beyond the threshold or a relatively equal number of positive and negative unions.

The systems and methods described herein can determine a Gerber relationship and calculate a Gerber Statistic. Upon identifying variables, the systems and methods can retrieve the appropriate historical data to measure the Gerber relationship and calculate the Gerber Statistic. As described herein, the systems and methods can comprise a computer program embodied on a computer-readable medium that can automatically perform the functions described herein, retrieve information to perform these functions, and display or output the results on a graphical user interface or provide the results to another system for further processing.

In some configurations, the methods and systems described herein can be used to calculate relationships between financial variables in order to evaluate strategies in which the relationship between different asset returns is critical to determining the probability of large loss. In turn, the probability of large loss is critical in determining appropriate investment leverage and/or the cost insuring against such a loss. These products include: (i) investments with open-ended loss potential but defined and non-recourse capital commitment; and (ii) specific cases of option replications involving multiple asset classes. The Gerber Statistic allows investors and intermediaries to better model, visualize, interpret, and ultimately invest in such products.

In one example, consider an investment in a multi-strategy hedge fund which delivers consistently positive returns with high returns per unit of realized volatility, but low levels of absolute performance. For example, a fund could deliver 5% absolute return with 2.5% daily annualized volatility employing a combination of ten different underlying strategies. Most investors would consider such returns attractive due to the 2.0 Sharpe ratio (assuming interest rates at zero for simplicity). However, these returns are less attractive in the context of earning sufficient absolute return on un-levered capital. By employing the methods and systems discussed herein (e.g., the Gerber Statistic), the investor and/or intermediary can visualize the frequency of times when the multi-strategy hedge fund would face losses greater certain threshold on unlevered capital. More precisely, using such a visualization, market participants could determine the likelihood of the fund delivering returns below a threshold X % (most commonly −100%) with an inputted statistical confidence level (e.g., 99%). Such a calculation would be more precise and relevant than a correlation analysis which would over-weight small upside moves relative to more important large downside moves. Further, calculating a Gerber Statistic based on a combination of individual strategy returns is superior to merely looking at the historic performance of the fund as fund allocations to different strategies are dynamic through time.

When using the methods and systems discussed herein, a computer system can allow an investor to select a degree of leverage to achieve a target absolute return while formally quantifying the frequency of large losses which would wipe out existing capital and require further commitment. Similarly, an intermediary could use the Gerber Statistic and statistical confidence interval around the Gerber Statistic to appropriately price an insurance policy or put against such an event. With an insurance policy (e.g., put) in place, the multi-strategy hedge fund investment can offer sufficiently high levered returns while functioning more like a "long only" allocation where the investor's maximum loss is capital invested. We see multiple benefits of using the Gerber Statistic when calculating risk and pricing puts (e.g., insurance) on multi-strategy hedge fund investments. The end investor accesses an investment which would be otherwise un-accessible or un-economic. In particular, retail investors could benefit from such access, as they are often otherwise credit-constrained against taking leverage which could result in losses beyond initial capital committed. Said differently, the Gerber Statistic could expand the breadth of "retail structured products" to more complex strategies such as multi-strategy hedge funds. Some institutional investors face similar constraints and opportunities. The hedge fund itself benefits by accumulating greater assets to invest which is one measure of success and profitability. An intermediary pricing the puts/insurance policy uses the Gerber Statistic to improve the pricing of its product, capturing more business in the process.

As a second example, an investor may desire to earn a payout if two separate events occur, such as the price of gold rising and the level of interest rates rising. Such an investment may be motivated by either speculation or hedging purposes and is an increasingly common transaction among many types of investors. In this example, a standard regression may prove sub-optimal because relationships may not be linear and/or all available data points may not be arranged in such a way as to properly capture the complexity of such a payout. The relevant data to achieve the investor's goal may not just be the co-movement of the two assets, but also the magnitude of movement and directional co-movement in periods when both assets are appreciating (e.g., a 9×9 matrix with columns defined as "up," "flat," and "down" for the level of interest rates and rows defined as "up," "flat," and "down" for the price of gold). By employing a Gerber Statistic, investors and traders can model and visualize such outcomes focused exclusively on the subset of outcomes where both assets are higher. Investors may care about both the frequency of these outcomes relative to the entire population as well as the magnitude of co-movement within that subset. Traders looking to hedge such a product could focus on implied probability distributions as priced in the options markets. Investors looking to invest in such a product could compare these pricings to historical frequencies and/or their own forward-looking expectations.

In a non-investment application, consider an ice hockey team who wins games by scoring more goals (offense) than they allow (defense). Focusing on defense and a simplified approach, allowing a goal can be defined as a function of (i) the realized skill of defenseman 1 "D1," (ii) the realized skill of defenseman 2 "D2," and (iii) the realized skill of the goaltender "G." Given unlimited resources and available talent, a team could secure the best of each, paying for the best available D1, D2, and G. Doing so would minimize goals allowed, but is not realistic since teams face competition for players, limited budgets for paying players, and league-imposed limits on total salaries. One option for the team is to divide its constrained budget evenly across the three positions securing the best available player for each, where best is defined by some quantitative combination of qualitative scouting reports and increasingly available precise player analytics. Selecting the best available player for each position is analogous to a traditional linear regression approach securing the best possible team across the full universe of outcomes. By using a Gerber Statistic, the team can instead visualize and focus on the subset of most relevant outcome: goals allowed. By testing various combinations of D1, D2, and G, the team may find, for example that hiring an expensive G allows them to hire less expensive D1 and D2, freeing up salary for other positions. Further, the team could threshold this result to their specific circumstances. For example, if they have a strong offense (or face opponents with weak defense), the threshold may be set to minimizing frequency of allowing more than three goals per game. If they have a weaker offense, the threshold may instead be set to two goals per game.

A further non-investment application of the methods and systems discussed herein (Gerber Statistic) exists in the realm of healthcare and specifically for measurement and display of adverse patient outcomes where multiple treatments interact. For example, consider a patient taking two medications to address two separate medical conditions: high cholesterol and a pain in the neck. Condition one is treated by anti-cholesterol medication. Condition two is treated by pain suppressing medication. Where the Gerber Statistic is valuable is in presentation of this information. At present, the interactions between the two medications are assumed to have already been studied and established. More clearly and consistently presenting this information offers three positive effects: (i) improving decision making for patients who are trained in neither medicine nor statistics, (ii) providing more easily understandable metrics to doctors in high-pressure time-sensitive situations, and (iii) motivating further broad and deep studies of interactions creating data for future use. Using the methods and systems described herein, a patient or healthcare provider could visit a website or mobile application which graphically displays the results of existing studies and/or builds data from another source (e.g., patients logging their own experiences into such a website). The patient could select their threshold of adverse outcome: (i) mild discomfort, (ii) severe discomfort, (iii) hospitalization, and (iv) death. The website would then display a 4×4 grid calibrated to display frequency of adverse outcome. The upper left quadrant would be a general population or placebo statistic since adverse outcomes happen even among healthy patients in the absence of medical treatment. The upper right could display frequency of adverse outcomes for patients taking anti-cholesterol medication but not pain medication. The lower left could display adverse frequency of adverse outcomes for patients taking pain medication but not anti-cholesterol medication. The lower right would display adverse outcomes for patients taking both medications with this joint probability outcome reflecting a "thresholded" Gerber Statistic. This could be color coded to make for especially clear interpretation. After reviewing the graphical data presentation, the patient may decide that the interaction risk is sufficiently low to be worth tolerating, that the drugs should be applied in sequence to avoid a negative incremental impact of drug one on drug two (or vice-versa) or that the joint probability of adverse outcome is too high to be tolerable. Further, by calculating the Gerber Statistic for different combinations of drugs at different thresholds of adverse outcome, the patient may make a more informed decision.

Architecture for Generating Gerber Statistics

Referring now to FIG. 1, an example architecture of a system 100 is shown. At least one user (e.g., a manager, a portfolio manager, trader, or analyst) can communicate with backend operations 170, including a server 120, over a network using a computer 110, such as a personal computer, desktop computer, laptop computer, personal data assistant (PDA), mobile device (e.g., a cellular phone), tablet computer, telephone, smart phone, or any other computing device. The network can be a local area network, wide area network, WI-FI network, or any other type of connection between the server 120 and the computer 110. Although the computer 110 is described as being used by the portfolio manager, it is intended that the label of a portfolio manager is not limited to an entity that has a supervisory role, but rather can include any entity, such as a trader, analyst, or investor, and each entity can have its own computer 110 for interaction with the system 100. The embodiments described herein use the terms investor, trader, manager, portfolio manager, analyst, and user, though it is intended that these functions and roles can be performed by or on behalf of any entity that instructs, uses, or implements the methods and systems described herein. In the example embodiment, the portfolio manager can identify and propose new investments for purposes of portfolio construction.

Figure 2:
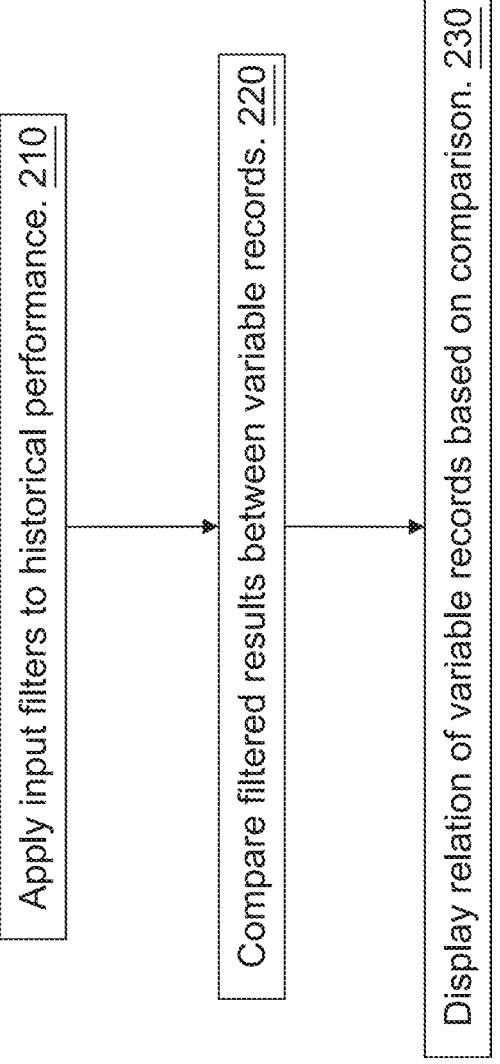
FIG. 2 depicts a method of comparing two variables, according to an embodiment.

The system 100 can also include an entry system 160, which can be a component of the server 120 or a separate, communicatively-coupled device, shown in the example configuration in FIG. 2 as a separate server. The entry system 160 can allow the portfolio manager using computer 110 to submit input data regarding variables as well as inputs controlling backend operations 170. The entry system 160 can also be configured to automatically process input data regarding variables from input data 150. The entry system 160 can also communicate with the server 120 and any other components of the system 100.

At least one manager, such as a chief risk officer or a chief investment manager, can communicate with the server 120 over a network using a computer 140, such as a personal computer, desktop computer, laptop computer, personal data assistant (PDA), mobile device (e.g., a cellular phone), tablet computer, telephone, smart phone, or any other computing device. The network can be a local area network, wide area network, WI-FI network, or any other type of connection between the server 120 and the computer 140. In the example embodiment, the manager can monitor asset allocation and evaluate risk of an investment strategy. The manager may reduce an allocation or impose a different portfolio construction based on an evaluation of diversification and risk.

The server 120 can transmit and receive information from the portfolio manager's computer 110 and the manager's computer 140, and can receive input data 150 from additional sources. Input data 150 can include any data about variables for purposes of measurement and analysis, and other related information. The input data 150 can be imported directly into the server 120, entry system 160 can transmit the input data 150 to the server 120, or computer 110 and computer 140 can transmit the input data 150 to the server 120. In some embodiments, the input data 150 can include real-time updates on stock prices, trade data from a data feed, historical data regarding one or more financial markets, dealer quotes, valuation services, models, good faith estimates or data from other financial data monitoring services.

The server 120 can store information in a database 130. The database 130 can be connected to the server 120 using a network, or alternatively, the server 120 and the database 130 can be integrated as a single computing device. It is also understood that the server 120 and the database 130 can each comprise multiple devices. The database 130 can manage (e.g., store, maintain, delete, search, and retrieve) records regarding variables, analysis regarding the variables, and other related information. In some embodiments, the database 130 can also include records regarding portfolio construction or asset allocation. The database 130 can store time-series data including, but not limited to, data points regarding variables and other external data. The time-series data in the database 130 can be for both current and historical data.

In the example embodiment, a system can compare two or more ideas, concepts, projects, or strategies, which may be implemented into the system as variables. Examples of these ideas, concepts, projects, or strategies can include sport statistics, behavioral statistics, employment statistics, real estate statistics, deal codes, investment strategies, and/or any other measurable objective data. In an embodiment, the systems and methods can be used to assess the relationship between financial indicators (e.g., asset classes, sectors, or markets) implemented into the system as variables. A financial indicator implemented into the system as a variable can be based on, but is not limited to, an asset class, sector, index, market, geographic area, note, corporate bond, municipal bond, stock, treasury stock, debenture, mutual funds, certificate of interest, certificate of deposit, derivative, commodity, currency, trust, put, call, straddle, option, investment in a partnership, investment in a limited liability corporation, fixed income security, equity or debt security, any other type of security or investment or any combination thereof.

Variable records may be stored in the database 130. Each record stored in the database 130 can include data points regarding the variable. The database 130 can store additional information in the record or associated with the record. The additional information can include, but is not limited to, variable type, present variable value, and comments. The database 130 can store variable data points collected during the history of a particular variable, so that a user, such as the portfolio manager or the manager, can query the database 130 to determine, in substantially real-time, the behavior of a variable since it was first entered into the system.

The portfolio manager via computer 110 and the manager via computer 140 can communicate with the server 120 to add, modify, delete, transfer, associate, and update variable records in the database 130. Input data 150 imported into the server 120 can also be used to update or otherwise modify the variable records in the database 130. The portfolio manager via computer 110 or the manager via computer 140 can search the database 130 for substantially real-time variable data points or for historical data. Additionally, the data can be aggregated based on any of the available fields for all date ranges. For example, the database 130 can aggregate all variable records based upon a particular criterion (e.g., all variable records relating to an asset class can be aggregated).

An example process for measuring variables and the relationships between them can be characterized according to (1) a filtering stage, (2) an evaluation stage, and (3) a monitoring stage. It is intended that these stages are merely illustrative. The method is not limited to the order of steps or stages described, and steps or stages may be omitted in some embodiments.

Each of the stages of the system 100 can be implemented by a software module executed by a processor via one or more of the computer 110, server 120, computer 140, or a combination thereof. The first stage can be implemented in a filtering and collecting software module, the second stage can be implemented in an evaluative and performance statistics software module, and the third stage can be implemented in a monitoring software module. These modules can function together with the database 130 to provide data storage, evaluation, and monitoring of variables.

The storage of variable records in the database 130 allows for comparing multiple variables with each other. In this embodiment, calculation of a Gerber Statistic may be performed, though it is understood that other types of statistical analysis may be performed in combination with calculation of a Gerber Statistic.

The system 100 can present information for display on computer 110 for the portfolio manager or computer 140 for the manager regarding data points associated with a variable record in the database 130. The portfolio manager or the manager can query the system 100 to analyze the Gerber relationship between two or more variables, and the system 100 can output this information for each variable.

The systems and methods described herein are related to those described in the U.S. patent application Ser. Nos.

13/601,310 and 14/015,257, which are incorporated by reference in their entirety. For example, the use of deal code records to monitor investments as taught in the '310 and '257 applications is another implementation of the current framework for measuring relationships between variables. In the context of the systems and methods of the '310 and '257 application, each deal code record can be considered a variable and the investment monitoring system can measure the relationships between those variables.

Figure 8:
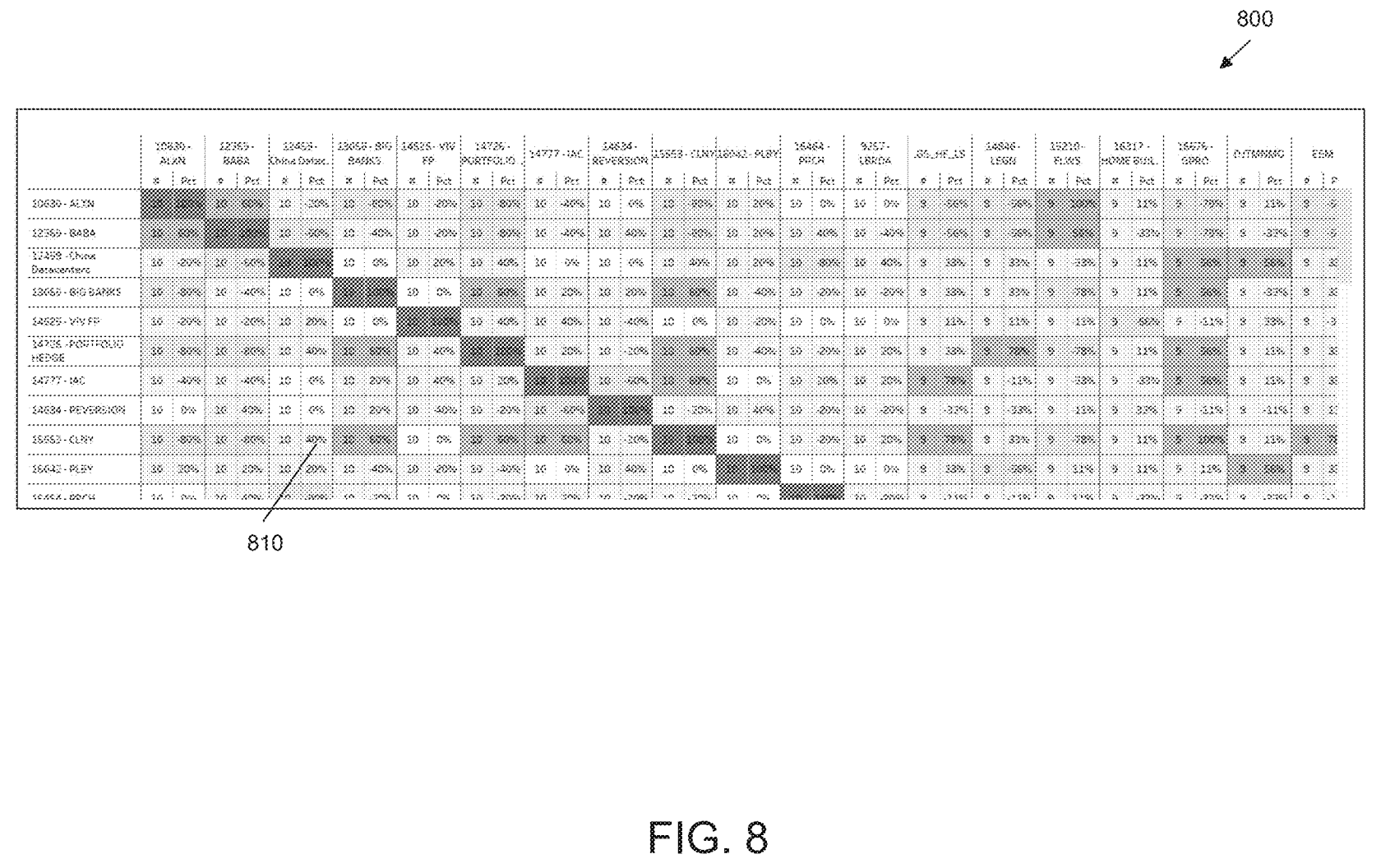
Figure 9:
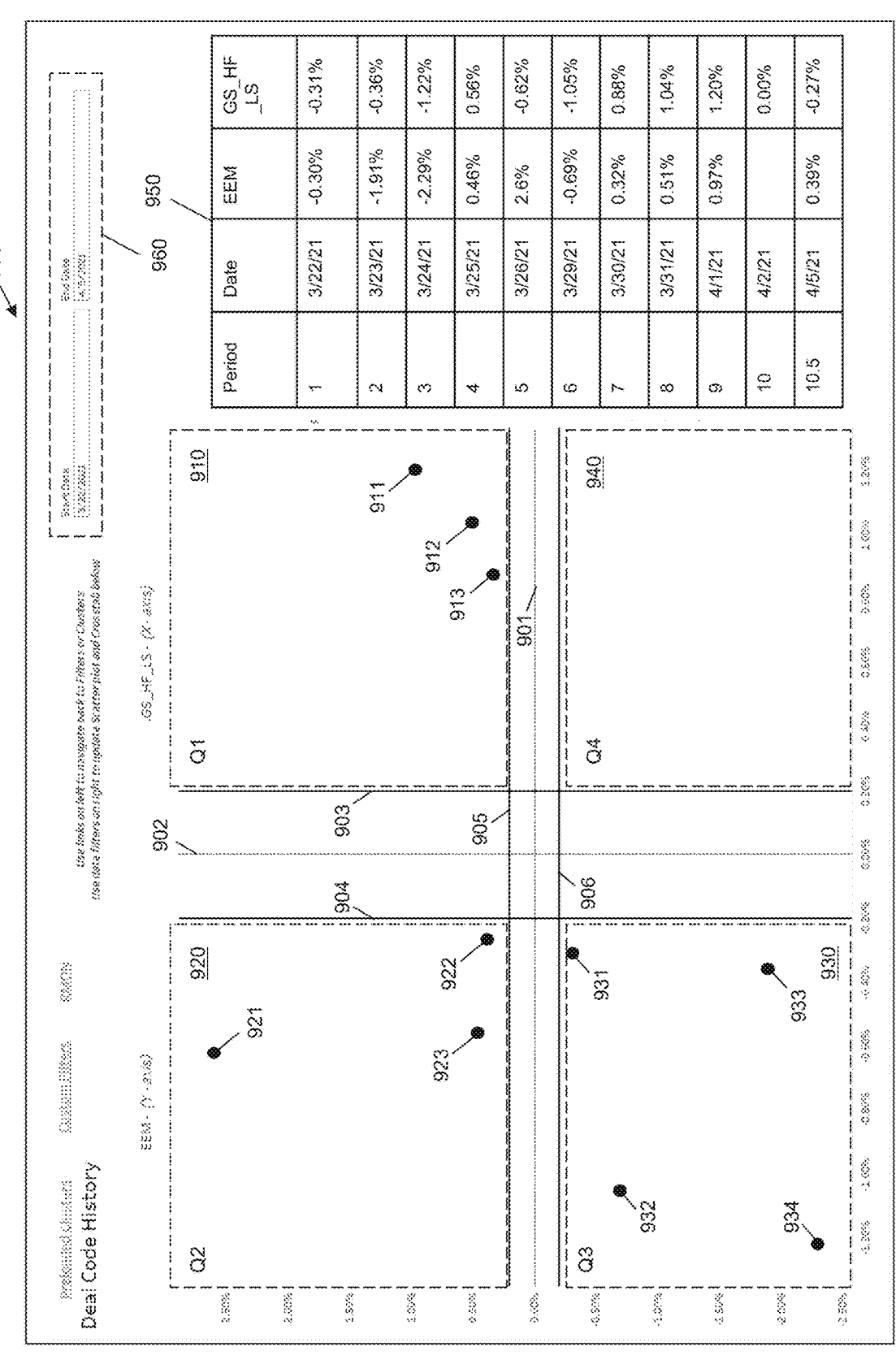

Based on the Gerber relationships between variables, the system can display on a user interface the extent of a relationship between two or more variables, as depicted in FIGS. 8-9. The relationship can be depicted in a format whereby variables moving in the same direction and having a positive relation may be depicted differently (e.g., different size, color, or shape) than those variables moving in a different direction and having a negative relation. In one example, the user interface can present a treemapping of Gerber Statistic values, whereby the size of a nested rectangle can be indicative of the extent of a Gerber relationship between two variables, whereby variables represented by larger rectangles are more related to other variables than those variables represented by smaller rectangles. In one alternative, the treemapping of variable relationships can include only those variables having a positive relation or can perform filtering based on other criteria. In another example, the analysis can be presented in a cartographic generalization, whereby a geographic map is generated based on the relationships and elevation can represent an extent of a relationship. In yet another example, the analysis can be presented in a multi-layer Venn diagram, whereby overlapping sections can represent the extent of a relationship between variables. In another example, different assets can be displayed in a spanning tree in accordance with their corresponding Gerber relationships. It is intended that any representation can be displayed, including the use of pictures, symbols, colors, and words, to show an extent of relationship between variables.

In some embodiments, the Gerber relationship between variables (e.g., investments, assets classes, sectors, and markets) can be used to evaluate the co-movement of the variables. A diversity score can be calculated that represents an extent of co-movement between two or more variables. For example, points can be allocated to represent the direction and extent of a Gerber relationship between two or more variables to generate a diversity score. Each variable can be allocated with a point for each instance where the variable has a negative Gerber Statistic (i.e., generally moves in opposite directions) with respect to another variable. Variables can also be allocated with fractional points for those negative relations that occur less than a hundred percent of the time (e.g., for a relation of −20%, a 0.2 can be awarded). Likewise, a negative point or fraction thereof can be applied each time a variable has a positive relation (i.e., generally moves in the same direction) with respect to another variable. The total points for a variable can be considered a diversity score. In some configurations and embodiments, a higher diversity score is more favorable for some variables (e.g., investments).

The Gerber relationship can be used in the context of portfolio construction. In constructing a portfolio, an investor determines how to allocate capital between various assets (e.g., equities, fixed income securities, cash, real estate, currency, alternatives, commodities, collectibles, and derivatives) based upon risk tolerance or minimum rate of return. A portfolio with a high diversification of assets can subject the investor to lower risk for the same level of expected return, and the Gerber relationship can be used to measure the diversification of a portfolio.

An established method for portfolio construction according to mean-variance optimization involves analyzing the risk of potential investments using expected return, expected variance, and expected covariance. This method is described in further detail in "Portfolio Selection" and "Portfolio Selection: Efficient Diversification of Investments," incorporated herein by reference in their entirety. The portfolio can then be optimized based on risk tolerance or return requirements. When applying this method, the Gerber relationship can be used in place of correlation to provide a more accurate measure of expected covariance than the conventional measure of expected covariance and/or expected semi-variance.

In allocating capital among various assets with different levels of risk, an investor might focus on achieving the best possible rate of return for the portfolio without exceeding a risk limit, which is affected by the diversification of the individual assets in the portfolio. As described herein, risk can be described as an estimated probability of a return below a negative threshold. In other words, the investor typically desires the best possible return for a given risk level. In some scenarios, an investor may seek the minimum amount of risk based on a given return target. The risk of a portfolio's return is related to the variance of its return, and so a goal of portfolio construction is to create a portfolio with a high return and a minimized variance. But the variance of a portfolio also depends on the covariances between the individual investments. Accordingly, optimal portfolio construction accounts for the co-movement of investments.

Conventional portfolio construction methods attempt to determine a risk-adjusted return of a portfolio of investments using each investment's expected return and covariance with the other investments in the portfolio. Traditionally, covariance of two investments is based on correlation and may be calculated as follows:

$$\mathrm{Cov}(R_X, R_Y) = \sigma_X \sigma_Y \rho_{XY}$$

Where $R_X$ denotes a return of the first investment, $R_Y$ denotes a return of the second investment, $\sigma_X$ denotes a standard deviation of the return of the first investment, $\sigma_Y$ denotes a standard deviation of the return of the second investment, and $\rho_{XY}$ denotes a correlation value between the first and second investments. A correlation value must always be a number between −1 and 1, whereby a correlation of 1 indicates that the investments move perfectly together, a correlation of 0 indicates that the investments move independently from each other, and a correlation of −1 indicates that the investments move perfectly in opposite directions. Conventional methods use this covariance formula to calculate the standard deviation of the returns from a multi-investment portfolio, whereby the standard deviation may represent an indicator of risk for the portfolio.

The system can use Gerber relationships to calculate covariance of investments instead of the conventional methods that rely on correlation. In some embodiments, the system can use Gerber relationships to calculate a covariance matrix comparing each possible pair of investments in a portfolio. A Gerber Statistic can provide a co-movement measure in the same units and range as a conventional correlation calculation (e.g., a number between −1 and 1). As a result, the Gerber Statistic can easily replace the conventional correlation measurement when calculating the covariance of a portfolio. Using the Gerber Statistic as a replacement for correlation, the same expected variances may be used to calculate covariances or semi-variances, which can then be used with the same expected returns to identify a mean-variance optimal allocation for each investment in the portfolio. The resulting portfolio construction or optimization will produce improved results because of the previously discussed advantages that measuring the Gerber Statistic has over conventional correlation.

An investor can use a computer system, such as system 100, to calculate the expected return of a proposed portfolio or an existing portfolio. The investor can input the portfolio's investments into the system, which can access historical data about the investments and calculate the necessary Gerber Statistic. The computer system can assess the Gerber Statistic and display a figure, number, scale, or other graphic to the investor about the risk in the investments. Based upon an input of a capital amount to invest, the systems can determine how to allocate the capital based upon the investor's acceptable level of risk or target returns. For example, when attempting to maximize returns of a portfolio for a given level of risk, the computer system can vary the weightings of different investments to find the best possible expected returns without exceeding the given level of risk. The system may then allocate capital based upon the weighting of those investments to maintain the appropriate risk-reward levels. In one embodiment, the investor can adjust a level of acceptable risk, and the computer system can suggest a new weighting of the investments to maximize returns for that risk level. Upon a confirmation by the investor, the system can automatically allocate the capital accordingly.

As described herein, risk may refer to an estimated probability of a return below a negative threshold. Furthermore, different end users may have different risk tolerances and/or risk preferences. For instance, a long-term investor may view a −20% return worse than a +20% return because the latter takes greater returns to recover from. Therefore, the methods and systems described herein can be used for investment strategies with stop losses, managing assets where their "downside volatility" is believed to be more costly than "upside volatility," hedging of fixed strike exotic options, issuance of structured products with capital floors where the hedger takes residual gap risk, or potential extensions into risk allocation and portfolio sizing using other protocols, such as Kelly Criterion.

The Gerber Statistic is a robust measure of correlation between data points representing different assets. The Gerber Statistic allows a processor to analyze (e.g., count) the proportion of simultaneous co-movements in series of data points when their amplitudes exceed data-dependent thresholds. The Gerber Statistic described herein is unlike conventional methods, such as the Kendall's Tau or the standard Pearson correlation that are sensitive to outliers or the Spearman correlation that relies on ranking observations.

As will be described herein, the one or more versions of the Gerber Statistic are neither affected by extremely large or extremely small movements. Therefore, the Gerber Statistic is suited to analyze financial time series data since these time series data can be noisy, include fluctuations, and/or exhibit extreme movements (e.g., sudden spikes or asset price re-basing on material incremental information). A computer server, such as the computer system 100 depicted in FIG. 2, can utilize the Gerber Statistic to calculate an estimate of a covariance matrix that is suitable for portfolio optimization.

Portfolio construction and optimization, such as the Markowitz method described herein, relies heavily on the availability of the matrix of covariances between securities' returns. In some configurations, the historic covariance matrix is used as an estimate for future covariance matrix. Various models have been used to ease the computational burden and to improve statistical properties of covariance matrix estimates. However, many conventional methods suffer from a technical shortcoming when estimating covariance matrices. For instance, conventional methods use product-moment-based estimates that are inherently inefficient if the underlying distribution is prone to containing extreme measurements or outliers.

These shortcomings cause incorrect results or require heavy computational resources when applied to financial data. For instance, financial time series data are particularly noisy, and a computer analyzing the financial time series data using conventional methods can easily misinterpret the noise as information. One consequence, for example, is that the correlation matrix estimates (even ones constructed using robust techniques) often have non-zero entries corresponding to series that in fact have no meaningful correlation. The correlation estimates can also be distorted if the series contains extremely large (positive or negative) observations.

The Gerber Statistic versions described herein provide a robust method for computing a co-movement measure that ignore fluctuations below a certain threshold, while simultaneously limiting the effects of extreme movements. For instance, $r_{tk}$ may represent the return of security k at time t (e.g., for k=1, . . . , K securities and t=1, . . . , T time periods). For every pair (i, j) of assets for each time t, the Gerber Statistic may convert each return observation pair $(r_{ti}, r_{tj})$ to a joint observation $m_{ij}(t)$ defined using the equation depicted below:

$$
m_{ij}(t) = \begin{cases}
+1 & \text{if } r_{ti} \geq +H_i \text{ and } r_{tj} \geq +H_j, \\
+1 & \text{if } r_{ti} \leq -H_i \text{ and } r_{tj} \leq -H_j, \\
-1 & \text{if } r_{ti} \geq +H_i \text{ and } r_{tj} \leq +H_j,, \\
-1 & \text{if } r_{ti} \leq -H_i \text{ and } r_{tj} \geq +H_j, \\
0 & \text{otherwise}
\end{cases}
$$

In the depicted equation, $H_k$ represents a threshold for security k. The joint observation $m_{ij}(t)$ is therefore set to +1 if the series i and j simultaneously satisfy their thresholds in the same direction at time t; to −1 if they satisfy their thresholds in opposite directions at time t, or to zero if at least one of the series does not satisfy its threshold at time t.

A pair for which both components satisfy their thresholds while moving in the same direction can also be referred to as a concordant pair (e.g., co-movement), and one whose components satisfy their thresholds while moving in opposite directions can be referred to as a discordant pair.

In a configuration, the system utilizing the Gerber Statistic may set the threshold $H_k$ for security k to be:

$$H_k = c\sigma_k$$

Where c is some fraction (e.g., ½) and $\sigma_k$ is the sample standard deviation of the return of security k. The system may also consider a window of time over which the standard of deviation is calculated (e.g., a period for each individual return). For instance, the standard deviation value for an asset calculated for 1 day of minute-by-minute value changes in USDJPY may differ from the standard deviation of the same asset for 10 years of monthly returns. In alternative configurations, more robust measures than standard deviation can be used for the threshold computation. The Gerber Statistic for a pair of assets can then be defined as:

$$g_{ij} = \frac{\sum_{t=1}^{T} m_{ij}(t)}{\sum_{t=1}^{T} |m_{ij}(t)|} \tag{1}$$

Letting $n^c{}_{ij}$ be the number of concordant pairs for series i and j, and letting $n^d{}_{ij}$ be the number of discordant pairs, it can be shown that Equation (1) is equivalent to:

$$g_{ij} = \frac{n_{ij}^c - n_{ij}^d}{n_{ij}^c + n_{ij}^d}.$$

Since this statistic relies on counts of the number of simultaneous satisfaction of thresholds (and not on the extent to which the thresholds are satisfied), it may be less sensitive to extreme movements that distort product-moment-based measures. At the same time, since a series must exceed its threshold before it becomes a candidate to be counted, the measure is also less sensitive to small movements that may simply be noise.

To generate the desired matrix, the system may define $R \in R^{T \times K}$ as the return matrix having $r_{tk}$ in its $t^{th}$ row and $k^{th}$ column. The system may also define U as a matrix with the same size as R having entries $u_{tj}$ such that:

$$u_{tj} = \begin{cases} 1 & \text{if } r_{tj} \geq +H_j, \\ 0 & \text{otherwise} \end{cases}.$$

With these definitions, the matrix of the number of samples that exceed the upper threshold will become $N^{uu}=U^t U$. In this example, the ij element $n^{UU}{}_{ij}$ of $N^{UU}$ is the number of samples for which both time series i exceeds the upper threshold and for which time series j simultaneously exceeds the upper threshold.

Similarly, the system may define D as the matrix with the same size as R having entries $d_{tj}$ such that:

$$d_{tj} = \begin{cases} 1 & \text{if } r_{tj} \leq -H_j, \\ 0 & \text{otherwise} \end{cases}.$$

With this definition, the matrix of the number of samples that are under the lower threshold will become $N^{DD}=D^t D$. As can be inferred, this method may utilize the useful property that ij element $n^{DD}{}_{ij}$ of $N^{DD}$ is the number of samples for which both time series i is below the lower threshold and for which time series j is simultaneously below the lower threshold. Accordingly, the matrix containing the number of concordant pairs becomes:

$$N_{CONC} = N^{UU} + N^{DD} = U^{\top} U + D^{\top} D.$$

Furthermore, the matrix containing the numbers of discordant pairs becomes:

$$N_{DISC} = U^{\top} D + D^{\top} U.$$

The system may then generate the Gerber matrix "G" (e.g., the matrix that contains $g_{ij}$ in its $i^{th}$ row and $j^{th}$ column) in the equivalent matrix form:

$$G = (N_{CONC} - N_{DISC}) \oslash (N_{CONC} + N_{DISC})$$

Where the symbol $\emptyset$ represents the Hadamard (element-wise) division. To simplify the description of various versions of the Gerber Statistic, it is useful to consider the following graphical representation for the relationship between two securities:

| | | |
|---|---|---|
| UD | UN | UU |
| ND | NN | NU |
| DD | DN | DU |

As depicted above, the rows represent categorizations of security i. The columns represent categorizations of security j. The boundaries between the rows and the columns represent the chosen thresholds. The letter U represents the case in which a security's return lies above the upper threshold (e.g., is up). The letter N represents the case in which a security's return lies between the upper and lower thresholds (e.g., is neutral). The letter D represents the case in which a security's return lies below the lower threshold (e.g., is down). In a non-limiting example, if at time t, the return of security i is above the upper threshold, this observation lies in the top row. If, at the same time t, the return of security j lies between the two thresholds, this observation lies in the middle column. Therefore, this observation lies in the UN region.

When executed iteratively and over a period of time (e.g., t=1, . . . , T), there will be observations scattered over the nine regions. Let $n^{pg}{}_{ij}$ be the number of observations for which the returns of securities i and j lie in regions p and q. Respectively, for p, $q \in \{U, N, D\}$. With this notation, the system can obtain another equivalent expression for the Gerber Statistic as:

$$g_{ij} = \frac{n_{ij}^{UU} + n_{ij}^{DD} - n_{ij}^{UD} - n_{ij}^{DU}}{n_{ij}^{UU} + n_{ij}^{DD} + n_{ij}^{UD} + n_{ij}^{DU}}.$$

The correlation matrix constructed from the Gerber Statistic described in the patent applications to which this application claims priority and as defined in Equation (1) may sometimes lead to results that are not positive semi-definite (PSD). If the system encounters a covariance matrix that is not PSD, then the system may construct a portfolio indicating a negative risk. As a result, the system may indicate an arbitrarily large position based on the mistaken belief that risk tolerances will not be breached, which may lead to erroneous results.

As a result, the system may also utilize a few alternative methods. In a first non-limiting example, the system may use:

$$g_{ij}^{(1)} = \frac{\sum_{t=1}^{T} m_{ij}(t)}{T - n_{ij}^{NN}}.$$

This can be written in terms of the alternative notation as:

$$g_{ij}^{(1)} = \frac{n_{ij}^{UU} + n_{ij}^{DD} - n_{ij}^{UD} - n_{ij}^{DU}}{T - n_{ij}^{NN}}, \tag{2}$$

The above equation (Equation (2)) is also referred to herein as Gerber Statistic (GS1), which is a different version of the Gerber Statistic (GS). Another version, Gerber Statistic 2 (GS2), can be defined as:

$$g_{ij}^{(2)} = \frac{n_{ij}^{UU} + n_{ij}^{DD} - n_{ij}^{UD} - n_{ij}^{DU}}{\sqrt{n_{ij}^{(A)} n_{ij}^{(B)}}} \tag{3}$$

where the $n^{(A)}{}_{ij}$ and $n^{(B)}{}_{ij}$ in the denominator are defined as:

$$n_{ij}^{(A)} = n_{ij}^{UU} + n_{ij}^{UN} + n_{ij}^{UD} + n_{ij}^{DU} + n_{ij}^{DN} + n_{ij}^{DD},$$

$$n_{ij}^{(B)} = n_{ij}^{UU} + n_{ij}^{NU} + n_{ij}^{DU} + n_{ij}^{UD} + n_{ij}^{ND} + n_{ij}^{DD}.$$

Let $Q = N_{CONC} - N_{DISC}$; and let q=the $\sqrt{\text{Diag}(Q)}$ to be the vector of square roots of the diagonal element of Q (which are all positive). Therefore, it can be shown that GS2 can be written in the matrix form:

$$G^{(2)} = (N_{CONC} - N_{DISC}) \oslash (qq^T)$$

Written differently (letting J=J$^r$) be the diagonal matrix with the inverse of the $i^{th}$ element of q in its $i^{th}$ diagonal position would lead to:

$$G^{(2)} = J^{\top}(N_{CONC} - N_{DISC})J.$$

Portfolio optimizers may require the covariance matrix of securities' returns to be positive semidefinite. The methods and systems described herein (e.g., Gerber matrix) can be used as a robust version of the correlation matrix from which a corresponding robust version of the covariance matrix can be constructed. The system may use this version of the covariance matrix in a portfolio optimizer. Therefore, the system may require the Gerber matrix to be positive semidefinite.

The Gerber matrix can be viewed as a matrix ratio whose numerator matrix is $Q = N_{CONC} - N_{DISC}$ and whose denominator matrix depends on the particular alternative chosen. If the numerator matrix is positive semidefinite, the Gerber matrix will be positive semidefinite if the denominator is positive semidefinite. Therefore, to establish that the given alternatives are positive semidefinite the following proves that the numerator matrix is positive semidefinite.

From the definitions of $N_{CONC}$ and $N_{DISC}$, the numerator matrix can be written in the following squared form:

$$Q = N_{CONC} - N_{DISC}$$
$$= U^{\top}U + D^{\top}D - U^{\top}D - D^{\top}U$$
$$= (U - D)^{\top}(U - D)$$

Therefore, for arbitrary but non-zero X:

$$x^{\top}Qx = x^{\top}(U - D)^{\top}(U - D)x = u^{\top}u \geq 0.$$

As a result, the numerator matrix will be positive semi-definite. For certain cases, it is possible to extend this analysis to show that the Gerber matrix itself is positive semidefinite. For example, in the second alternative form:

$$x^{\top}G^{(2)}x = x^{\top}J^{\top}HJx$$
$$= x^{\top}J^{\top}(U - D)^{\top}(U - D)Jx = u^{T}u \geq 0.$$

GS1 also produces positive semidefinite correlation matrices. This can be proven by noting that the numerator matrix Q is positive semidefinite as shown above, and the Hadamard denominator matrix is a positive matrix itself.

The system may also use an optimal shrinkage estimator protocol. The system may use the methods described herein to calculate covariance between a pair of assets. For instance, in a non-limiting example of a sample covariance matrix method described below, let $r_{j,t}$ denote the historical return for asset i at time period t and the average return over the time ranging from t=1 to t=T to be $\bar{r}i$:

$$\bar{r}_i = \frac{1}{T}\sum_{t=1}^{T} r_{i,t}.$$

Then the sample covariance between a pair of assets can be estimated via:

$$\text{Cov}(r_i, r_j) = \frac{1}{T-1}\sum_{t=1}^{T}(r_{i,t} - \bar{r}_i)(r_{j,t} - \bar{r}_i) \overset{def}{=} \hat{\sigma}_{ij}.$$

The historical covariance matrix for N assets can be specified via evaluating the above equation for pairs of i, j assets or:

$$\hat{\Sigma}_{HC} = \begin{bmatrix} \hat{\sigma}_{11} & \hat{\sigma}_{12} & \cdots & \hat{\sigma}_{1N} \\ \hat{\sigma}_{211} & \hat{\sigma}_{22} & \cdots & \hat{\sigma}_{2N} \\ \vdots & \vdots & \ddots & \vdots \\ \hat{\sigma}_{N1} & \hat{\sigma}_{N2} & \cdots & \hat{\sigma}_{NN} \end{bmatrix}.$$

The estimated covariance matrices can then be obtained from the historical correlation matrix:

$$\hat{\Sigma}_{HC} = \text{diag}(\hat{\sigma})\hat{C}_{HC}\text{diag}(\hat{\sigma})$$

Where $\sigma$ is an N×1 vector of sample standard deviation of the historical asset returns, expected future returns, or expected future returns as priced by various derivative markets and $C_{HC}$ is the sample correlation matric of the historical asset returns. In another non-limiting example, such as the single-index method described below, the system may use a Sharpe's single-index model. The single-index model assumes the return of an individual stock i is related to the return of a stock market index m, as follows:

$$r_i = \alpha_i + \beta_i r_m + \epsilon_i$$

Where $\alpha_i$ is the excess return that is independent of the market changes, $\beta_i$ is a measurement of the sensitivity of asset i's return to the market index return, and $\epsilon_i$ is the residual term with $\mathbb{E}[\epsilon i]=0$. The single-index covariance estimator assumes that the residual terms between assets are independent e.g., $\epsilon i$ and $\epsilon_j$ are independent for i and j pairs such that:

$$\mathbb{E}[\epsilon_i \epsilon_j] = 0, \forall\ i,\ j(i \neq j).$$

Given this assumption, one can show the variance of an asset i is:

$$\sigma_i^2 = \underbrace{\beta_i^2 \sigma_m^2}_{Systematic\ risk} + \underbrace{\sigma_{\epsilon_i}^2}_{Asset\ specific\ risk},$$

Where $\sigma_m^2$ is the variance of the market returns and $\sigma_{ei}^2$ is the variance of $\epsilon_i$. The covariance between two assets i and j is given by:

$$\sigma_{ij} = \beta_i \beta_j \sigma_m^2 \forall\ i,\ k,\ i \neq j,$$

and the estimated covariance matrix implied by such model is:

$$\hat{\sum}_{SI} = \hat{\beta}\hat{\beta}^T \sigma_m^2 + \text{diag}(\hat{\sigma}_\epsilon^2),$$

Where $\beta=[\beta_1 \ldots \beta_N]^T$ denotes a vector of estimated betas and the following represent a vector of estimated variances of residual terms for each asset:

$$\hat{\sigma}_\epsilon^2 = [\hat{\sigma}_{\epsilon 1}^2, \ldots, \hat{\sigma}_{\epsilon N}^2]$$

In some configurations, the system may utilize a shrinkage method that achieves a balance between the sample covariance and single-index methods described herein. For instance, the system may use a shrinkage parameter of:

$$\alpha \in [0,1]$$

This shrinkage parameter may balance between the two approaches discussed herein, as depicted below:

$$\sum_{SM} = a\sum_{SI} + (1-a)\sum_{HC}.$$

The system may find the optimal shrinkage parameter a via minimizing the Frobenius norm between the asymptomatically true covariance matrix and shrinkage estimate as depicted below:

$$a^* = \arg\min_a \left\| a\sum_{SI} + (1-a)\sum_{HC} - \sum \right\|_F^2$$

Figure 5B:
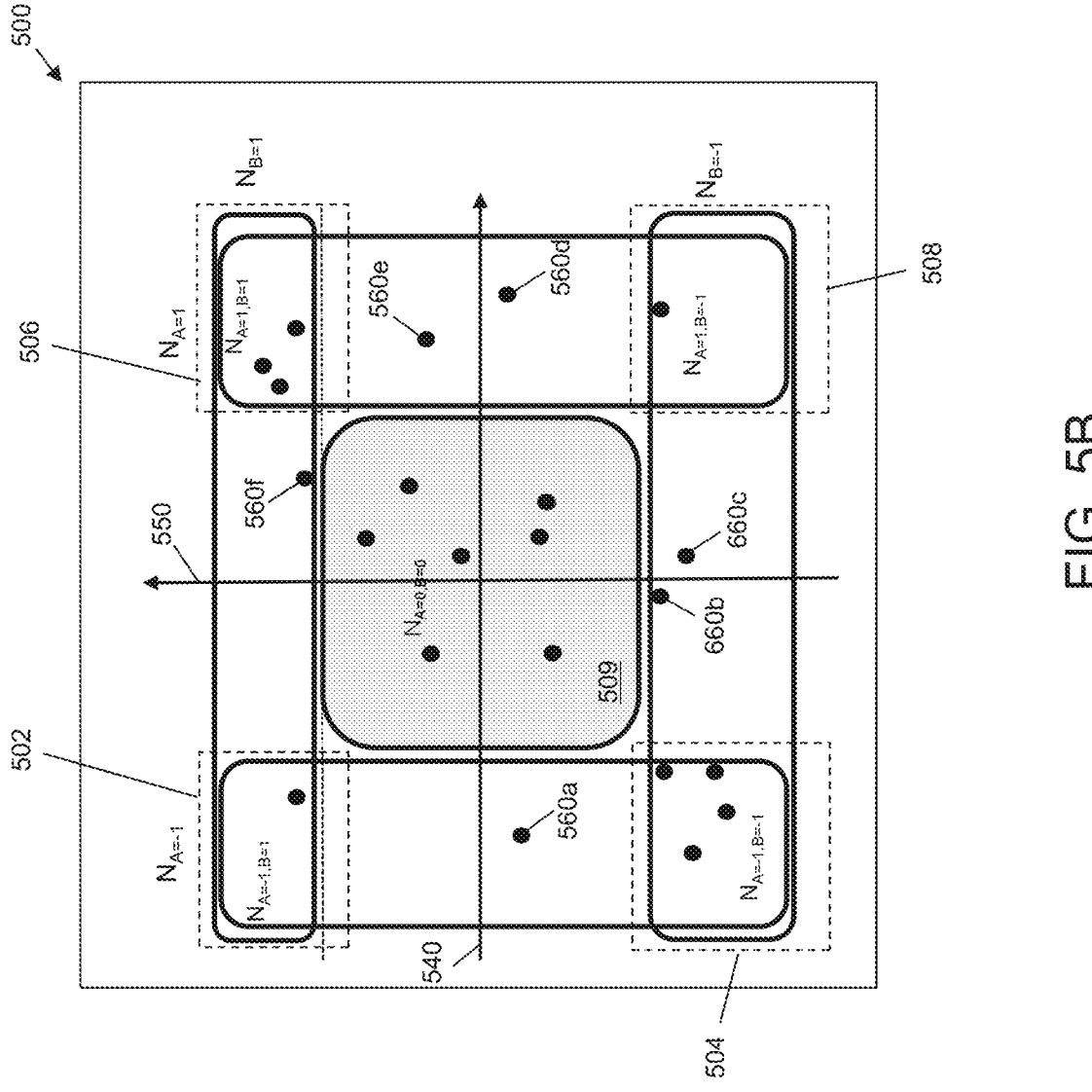

Referring now to FIGS. 5A and B, different versions of the Gerber Statistic (GS, GS1 and GS2) are depicted by equations 510-530. These equations correspond to analyzing data represented by the data points depicted within the graph 500 (FIG. 5B). In FIG. 5A, the Gerber Statistic (GS) is represented by the equation 510, which indicates which data points depicted in FIG. 5B are used to calculate the Gerber Statistic. GS1 is represented by equation 520, which indicates which data points depicted in FIG. 5B are used by GS1. GS2 is represented by equation 530, which indicates which data points depicted in FIG. 5B are used by GS2.

In the embodiment depicted in FIGS. 5A and B, different versions of the Gerber Statistic are used to analyze data associated with two assets (A and B). Each data point within the graph 500 (depicted in FIG. 5B) may represent a transformed (e.g., discretized or normalized) value associated with each asset. For instance, data points reflecting stock prices for different times may be transformed into a range of −1 to 1. These data points are shown in the graph 500 and arranged based on their values with respect to the axis 540 and 550. As depicted, the equation 510 accounts for a difference between the data points within the boxes 506 and 504 compared with data points within the boxes 502 and 508. In the denominator, the equation 510 accounts for a difference between the total number of data points and the data points outside the boxes 502, 504, 506, and 508 (e.g., data points within the box 509).

A difference between GS and GS1 (represented by the equation 520) is that while the numerator of both equations are the same, the denominator of the equation 520 accounts for more data points. Specifically, the equation 520 accounts for all the data points excluding the data points within the box 509 (where both asset A and B are below the threshold). Effectively, the equation 520 also accounts for data points 560a-f, which are not considered in the equation 510. This modification allows for the system to account for more data points while maintaining PSD results.

GS2 (represented by the equation 530) shares the same numerator as the other equations. The equation 530 includes the square roots of the data points where asset A satisfies the threshold (e.g., every time that a data point for asset A is above the threshold on either side, whether is it negative or positive) multiplied by the square root of all data points where asset B satisfies a threshold (e.g., every time that asset B is above the threshold on either sides, whether is it negative or positive). This modification allows for the system to account for more data points while maintaining PSD results.

Some aspects of the present disclosure discuss a 2×2 matrix to be analyzed (e.g., a matrix that analyzed data points and determines whether they are above or below a threshold). However, it is understood that the methods and systems described herein can apply to other number of variables too. For instance, the methods and systems described herein can use a 3×3 matrix where each variable is bucketed into the following three categories: above-threshold (e.g., box 502), below-threshold (e.g., box 504), and between-threshold (box 509). Using this data a server can identify many insights. For instance, data points that are in between thresholds may describe how infrequently the assets move sufficiently and may also indicate outcomes of smaller "drift" moves. In some embodiments, a graphical user interface may display the data points on the end-user's device, such as depicted in FIG. 9 where the data points of all three categories are displayed.

Classical portfolio construction optimization methods generally rely upon covariance matrix methods. Covariance of assets can be mathematically defined as the multiplication of the standard deviation of each asset by the correlation of the two asset returns. Using the methods discussed herein, the correlation, as used in the classical portfolio construction optimization methods, can be replaced by the Gerber relationship calculated using one or more versions of the Gerber Statistic because the Gerber Statistic is more efficient and accurate measurement of co-movement between two assets. Therefore, an optimizer can change covariance with Gerber Statistic (any of the versions) to achieve better results. Using the methods and systems described herein, performance of an asset can be monitored, such that investments can be managed while limiting the risk (e.g., preventing or minimizing the probability of the return from going below a pre-determined threshold). Therefore, utilizing the Gerber Statistic will improve classical portfolio optimization methods by maximizing return and minimizing drawdown.

Moreover, the methods discussed herein also provide a semi-variance relationship between the analyzed data points. Semi-variance is defined as the expected squared deviation from a threshold, d, usually chosen as either 0 or the mean value for time-series data to be analyzed, as depicted in the following equation:

$$S = E\{(r - d)\_^2\}$$

Where E is the expectation operator, r is the portfolio return, and the negative part function is:

$$x\_ = \begin{cases} x & \text{if } x < 0 \\ 0 & \text{if } x \geq 0 \end{cases}$$

In the covariance methods, the upside risk and the downside risk are mathematically defined the same. For instance, the risk of an asset increasing or decreasing by 2% is weighted equally by covariance optimization methods. In contrast, a semi-variance method weights these risk differently. For instance, a 2% chance of an asset increasing may be deemed more important than a 2% chance of the same asset decreasing (or vice versa).

The semi-variance method discussed herein may yield better results because the return distribution for financial time-series data is typically not symmetrical and/or because investor preferences may differ. The Gerber Statistic can be used in conjunction with optimizers to construct and optimize portfolios.

In general, the objective of the mean-variance portfolio problem is to choose a portfolio x so as to:

$$\text{minimize } V = x^\top C x$$
$$\text{subject to } \mu^\top x = E,$$
$$Ax = b,$$

-continued
$$x \geq 0,$$
$$\text{for all } E \in [E_{min}, E_{max}].$$

Using the methods described herein, the system may minimize semi-variance (or alternatively, the variance below a predetermined value). Therefore, instead of minimizing V in the problem above, the system may minimize S in the below equation:

$$S = E\left[(r_p - d)_-^2\right] \quad (1)$$

where $r_p$ is the portfolio return, d is a downside threshold, the symbol E represents the expectation operator, and the negative sign in the subscript denotes the absolute value of the negative part, that is:

$$x\_ = \begin{cases} |x| & \text{if } x < 0, \\ 0 & \text{if } x \geq 0 \end{cases}.$$

To perform downside optimization of S, in the above equation (1), the system may use:

$$S = \frac{1}{T}\sum_{t=1}^{T}(r_p(t) - d)_-^2$$

where $r_p(t)$ is the return of the portfolio at time t.

When using a semi-variance method, the system may use the portfolio's expected return in place of d (in equation 1). Therefore, the downside optimization is replaced by a semi-variance optimization. Specifically, the system may define R as the T×n matrix of historical security returns:

$$R = \begin{bmatrix} r_{11} & r_{12} & \cdots & r_{1n} \\ r_{21} & r_{22} & \cdots & r_{2n} \\ \vdots & \vdots & \ddots & \vdots \\ r_{T1} & r_{T2} & \cdots & r_{Tn} \end{bmatrix}$$

That is, the element in row t and column j is the return of the $j^{th}$ security in period t. The securities' returns in excess of their means can be defined as:

$$R - \iota\mu^T,$$

where $\mu$ is the n-vector of mean returns and t is an appropriately dimensioned vector of ones. Therefore, the time-series of portfolio returns below the mean is:

$$[(R - \iota\mu^T)x]_-,$$

Accordingly, the portfolio's semi-variance can be written as:

$$S = \frac{1}{T}[(R - \iota\mu^\top)x]_-^\top[(R - \iota\mu^\top)x]_-. \quad (2)$$

whereby defining the matrix as:

$$B = \frac{1}{\sqrt{T}}[R - \iota\mu^\top]$$

and the two variables y and z are defined as y=Bx and:

$$z = y_-.$$

With these definitions, the semi-variance defined in equation (2) becomes S=$z^T$z. The system can then reformulate the semi-variance problem as a minimization of a simple square subject to a new set of constraints, as shown below:

$$\text{minimize } S = z^T z$$
$$\text{subject to } \mu^T x = E,$$
$$Ax = b,$$
$$Bx - y + z = 0,$$
$$x, y, z \geq 0,$$
$$\text{for all } E \in [E_{min}, E_{max}],$$

The Gerber relationship can be calculated based on the coordinated movements of multiple variables using one or more versions of the Gerber Statistic described herein (e.g., GS, GS1, and/or GS2). Referring to FIG. 2, this analysis can be performed by a data processing system (e.g., the system depicted in FIG. 1), in step 210. In one embodiment, an input filter may specify both the number of observation periods and a threshold value that the measured movement must exceed to be considered as a qualifying event. For example, the analysis may consider the instances over the last 25 days where both variables moved over a predefined amount (e.g., 1% of the value) in the same day. For each of the variable records in the analysis, the system 100 can then compare the filtered results of each variable record to each of the other variable records, in step 220. The results, which may indicate the frequency of similar behavior, can be used to determine the uniqueness, with regard to performance, of each variable when compared to the other individual variables in the analysis. The analysis of step 230 can be performed by computer 110, computer 140, server 120, or any combination thereof. The results can be displayed, in step 230. For example, computer 110 or computer 140 can present the comparison of variables.

In some situations, groups of variables may exhibit related performance over time. For example, a collection of variables associated with one characteristic (e.g., various investments associated with the same asset class) may exhibit a pattern of performance when compared to a collection of variables associated with a second characteristic (e.g., investments associated with a different asset class). Accordingly, the systems and methods described herein can measure the Gerber relationships between a first group of variables and a second group of variables.

The methods and systems described herein can be used to construct a customized portfolio and dynamically reallocate assets to be invested in an automated fashion. The system may provide an electronic platform in which a robotic advisor (e.g., virtual advisor or robo-advisor) can ingest investment preferences, goals, list of investment vehicles, and other relevant information from a user (e.g., portfolio manager, investor, or any other party interested in constructing a portfolio). The robo-advisor can construct a portfolio using the one or more versions of the Gerber Statistic discussed herein applied via one or more optimization methods that utilize the user's inputted preferences to maximize returns.

The methods and systems described herein can be used to create a return-linked structured product. In a non-limiting example, an investor may have a defined capital pool of $100. Such an amount may prevent the investor from "shorting" or "leveraging" any asset without an exhaustive and impractical credit analysis. As a result, the inventor may have three choices: (i) a long-only portfolio with zero leverage (which may not be optimal and may incentivize buying higher-leverage assets within the portfolio even if those assets offer inferior risk/reward); (ii) buy puts or calls to achieve defined-loss leverage and shorts (this strategy would introduce theta decay and added complexity which may not be optimal); or (iii) buy a structured product for $100 where a counterparty executes a strategy on their behalf. Assuming that the strategy could possibly go "negative" and incur losses beyond the initial $100, the risk to the counterparty may be embedded in the price of the product, which is undesirable to the investor.

Using the methods and systems described herein, the investor's assets can be managed better in pricing catastrophic capital destruction cases than other methods of portfolio construction. Specifically, using the Gerber Statistic discussed herein, counterparties (e.g., banks) could price the above-described risk more efficiently. As a result, the investor could get access to a broader range of investments/strategies at a more reasonable price.

Figure 3:
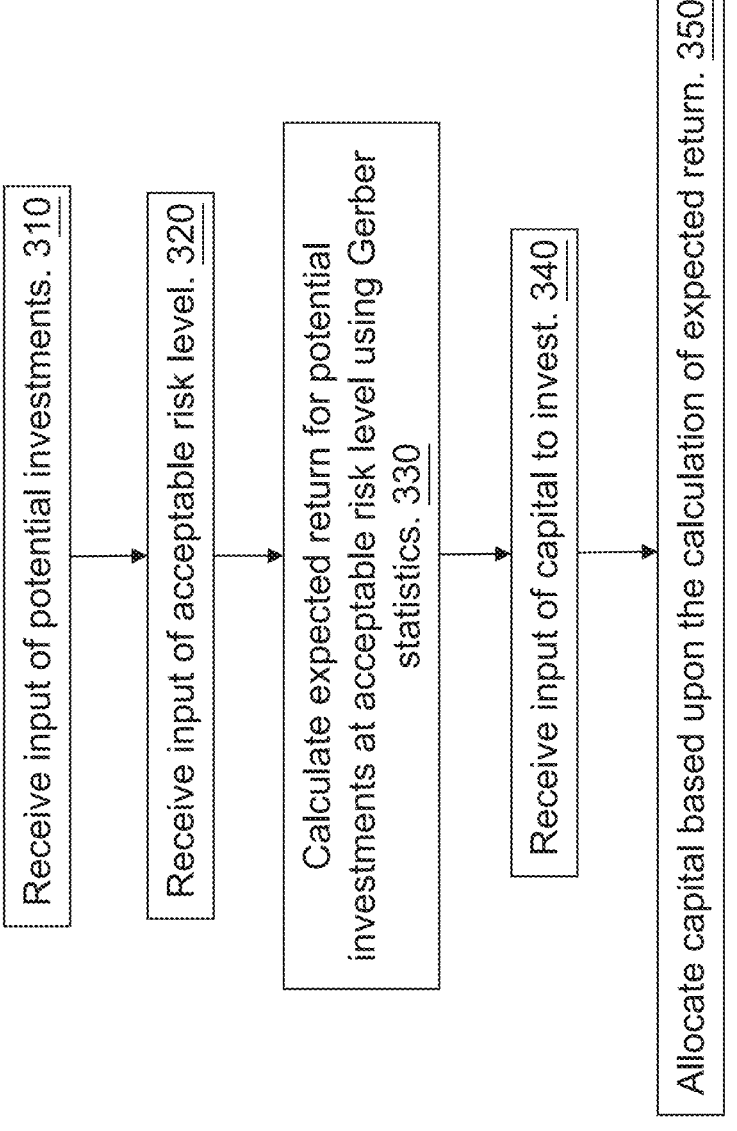
FIG. 3 depicts a method of portfolio construction, according to an embodiment.

In a method of portfolio construction, as shown in FIG. 3, a computer system (e.g., system 100 shown in FIG. 1) can receive an input of potential investments from a user or another computer (e.g., interconnected computers/servers automatically constructing a portfolio), in step 310. The input can include an identification of different asset classes, sectors, markets, investment strategies, or particular investment vehicles. The system can also receive an acceptable level of risk, in step 320. The acceptable level of risk can be determined by the user, or the system may use a default level. Based upon the identified investments and the level of risk, the computer system can calculate an expected return for the potential investments using one or more versions of the Gerber Statistic, in step 330. The system may calculate various weightings of the investments to determine how to allocate capital between these investments to achieve the maximum level of return while satisfying the acceptable rate of risk. The system may evaluate a series of scenarios in which different amount of capital is allocated to different assets to identify which scenario yields the best return. The system may use multiple different expected return assumptions weighted by some probability of each expected return set being realized over the investment horizon. The system may then receive an input of an amount of capital, in step 340. The system can allocate the capital to the inputted investments based upon the calculations, in step 350.

In a non-limiting example, a user accesses an electronic platform (e.g., website) hosted or otherwise functionally controlled by the system. The user may use various input elements to enter a list of investments, assets, deal codes, investment strategies, and/or asset classes (e.g., cash, stocks, and gold). The user may also indicate a risk tolerance (e.g., low, medium, or high risk indicating aggressive investing). The system may use one or more versions of the Gerber Statistic to construct a portfolio for the user. For example, the system may display an explanation that because the user has chosen a conservative (low risk) investment strategy, the system has optimized a unique portfolio for the user that includes 40% cash, 30% S&P investments, 20% gold, and 10% aggressive ETFs. The system may also indicate a percentage of capital allocation for different S&P stocks. For instance, the system may recommend that the user allocates half of the capital to be allocated the S&P stocks (15% of the total investment) into a particular stock and divide the other half into five different stocks.

The electronic platform displaying the recommendations may include interactive elements, such that the user can override/revise the recommendations. Upon detecting a change, the system may re-calculate the projected/simulated return. In some configurations, the system may, upon receiving proper authorization from the user, allocate the user's capital to the recommended investment vehicles by creating an account for the user. This method may be used for anyone who desires to construct a portfolio and maximize returns subject to a specific set of constraints (e.g., given a unit/preference of risk or predetermined investments).

The methods and systems described herein can also be used to dynamically reallocate assets within a portfolio. In this way, the system may optimize passive investment vehicles for users. For instance, the system may use one or more versions of the Gerber Statistic to calculate a relationship between assets within a portfolio. Using the calculated relationships, the system may automatically customize a portfolio in accordance with various criteria. For instance, the system may analyze various assets (stocks) included within an exchange traded fund (ETF), structured product, and/or exchange traded product (ETP) and calculate a Gerber relationship for each asset using the methods discussed herein. The system may then calculate an expected return within a defined timeline for the ETF and determine whether the expected return satisfies a threshold. The threshold may be inputted by a portfolio manager or a system administrator. The threshold may indicate an expected return value or may indicate a risk value associated with the ETF, ETP, and/or structured product. When the system determines that the assets within the ETF do not satisfy the threshold, the system may dynamically revise the assets within the ETF. For instance, the system may iteratively simulate different allocations to different assets within the ETF.

The system may periodically monitor the ETF and dynamically revise its content in accordance with various rules and thresholds in order to adapt to predetermined themes (e.g., ETFs directed towards or isolated from an industry or a sector) or adapt to ongoing market movements and trends. In this way, investors can invest in a dynamic ETF where the system periodically revises the content of the ETF to maximize the return.

Figure 4:
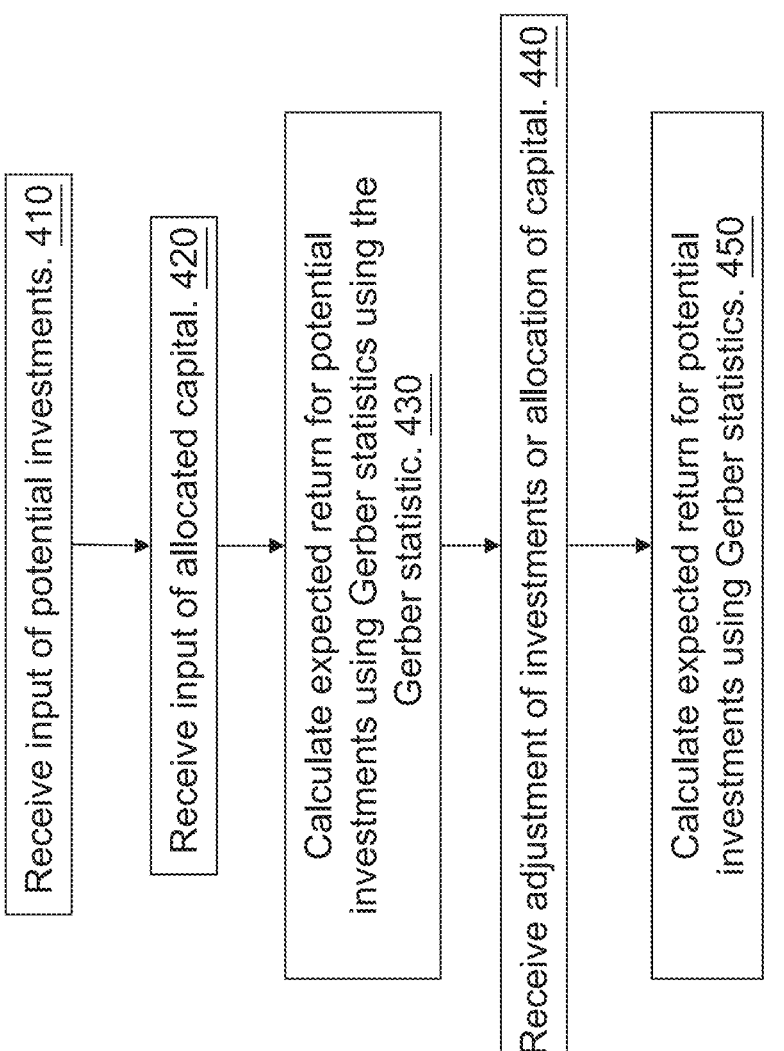
FIG. 4 depicts a method of portfolio construction, according to an embodiment.

In an alternative embodiment, as shown in FIG. 4, a computer system (e.g., system 100 shown in FIG. 2) can determine the risk of a proposed or existing portfolio based upon inputs. The system can receive an input of investments, in step 410. For instance, a user (e.g., investor or a portfolio manager) can enter a list of desired investments (e.g., stocks and ETFs) and the system may display visual aid to describe the risk associated with the portfolio (e.g., FIGS. 6-9).

The system can also receive an amount of capital for each investment, in step 420. For instance, the user can also enter an amount of capital allocated (or desired to be allocated) to each investment. Alternatively, the user can provide a total amount of capital to be allocated to the investments.

The system can then calculate an expected return for the investments using one or more versions of the Gerber Statistic, in step 430. The system can use the methods described herein to calculate a relationship for different inputted investments. For instance, the system may first determine whether the investments inputted have a positive or negative union (co-movement). Based on the identified co-movements, the system may then calculate an expected return for the investments in totality. The expected return may be a time-dependent variable. As a result, the system may either calculate the expected return for the investments for a time period identified by the user. Alternatively, the system may generate an expected return for multiple time periods. For instance, the system may calculate and display a projected expected return in short term (e.g., 6 months or 1 year) and medium/long term (e.g., 5 years and 10 years).

Optionally, the user can adjust the investments or an allocation of capital to the investments, in step 440. In response, the system can re-calculate the expected return using the Gerber relationship, in step 450. As described above, the system may display how the capital is allocated to each investment and a corresponding expected return. The system may provide the user the opportunity to simulate different scenarios by allowing the user to revise the investments and/or the capital allocated to each investment. For instance, the user may add or remove an investment to the list of investments. As a result, the system may re-calculate the expected return and display the results. In another example, the user may revise how the capital is allocated to each investment. As a result, the system may re-calculate the expected return and display the results. The system may provide a simulation platform where users can run different scenarios and identify corresponding results.

Using the methods described herein, the system may also recommend an investment strategy that would yield better results. The system may execute multiple scenarios in which different investment strategies are used. For instance, the system may determine whether a linear or non-linear hedge should be used. The system may also determine the type of hedge that should be used (e.g., put option). In another example, the system may determine which (if any) assets should be included or excluded, such as including various environmental, social, and governance (ESG) investments. The system may then display the results generated by simulating different investment strategies and receive a selection from the user. Alternatively, the system may automatically select a best investment strategy based on predetermined rules and criteria (e.g., select the investment strategy that yields the best return in short term or long term).

The system may use the methods and systems described herein to create customized analysis for different portfolios and portfolio managers. For instance, the system may retrieve data needed to perform the analysis and to calculate the Gerber relationship for various assets managed by a particular portfolio manager. The system may first query a database to identify assets being managed by a particular portfolio manager. The system may then determine one or more indices associated with the portfolio manager. The system may then save the data within the pre-loaded cluster or template. A user may access a graphical user interface hosted or generated by the system to execute the pre-loaded clusters.

Figure 6:
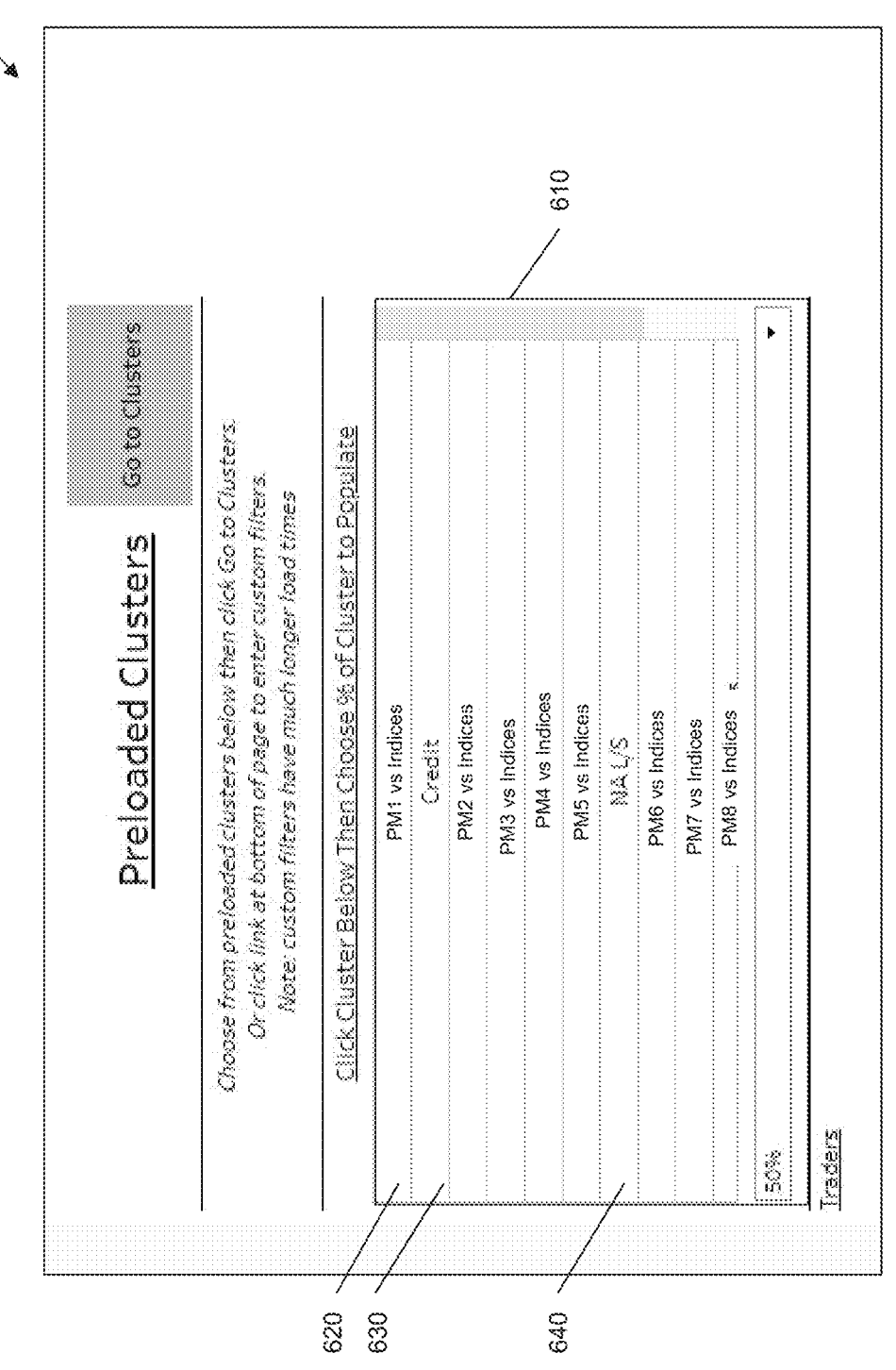

Referring to FIG. 6, when a user accesses a graphical user interface 600, the system displays various preloaded (or pre-generated) clusters and templates to be executed (e.g., clusters represented by a set of graphical components 610). When a user selects a preloaded cluster, the system executes the analytical methods described herein to calculate the Gerber Statistic between the assets identified within the preloaded cluster (or inputted by a user). The system may then display the results, such as by displaying any of the graphical user interfaces discussed herein.

The templates and clusters may account for various predetermined strategies for different investments and portfolios, as depicted by the corresponding graphical component. The cluster represented by "credit" (graphical component 630) corresponds to a strategy used by all (or a portion of) portfolio managers. Using preloaded clusters, a user can view results associated with different hedge fund baskets. For instance, when the user selects graphical component 640 for the preloaded cluster of North American Long and Short (NA L/S), the system will show results for a series of predetermined assets associated with the selected basket of assets.

In another example, the preloaded cluster PM1 vs. Indices (represented by graphical component 620) is customized for a particular portfolio manager, PM1. The system may calculate a set of attributes (e.g., indices) to be analyzed for assets managed by PM1. The preloaded cluster for PM1 may also include the assets being managed by PM1. Additionally or alternatively, the preloaded cluster represented by the graphical component 620 may also include relevant indices that have been selected for PM1 (based on various rules). The system may use various rules and computer models to determine an ideal set of indices for each user (e.g., each portfolio manager). For instance, the system may include S&P indices for PM1. However, because PM1 is a merger arbitrage portfolio manager, the system may also include indices that are specific to merger arbitrage portfolios (e.g., indices that track the performance of mergers) because PM1 manages assets that may have risk regarding different market factors and market measures. Therefore, the preloaded cluster for PM1 may use different indices as the preloaded cluster for other portfolio managers (e.g., PM5).

In another example, the system may evaluate a PM's portfolio of returns both at the portfolio level and 'sub-portfolios' consisting of a subset of investments in the portfolio. The system could then evaluate the list of assets that exhibit the greatest relationships with the portfolio's returns against the investments in the portfolio. In doing so, the system could help identify themes or relationships amongst investments in the portfolio. The system can also identify investments that are contributing to that relationship allowing for better overall allocation of resources. The system may re-use the identified relationships or themes by applying them to other PMs or portfolios and their corresponding assets.

The system may periodically execute the preloaded clusters, such as daily, weekly, or any other frequency determined by a system administrator. The system may have the results available, such that different authorized users can view the results by interacting with the graphical user interface 600.

Figure 7:
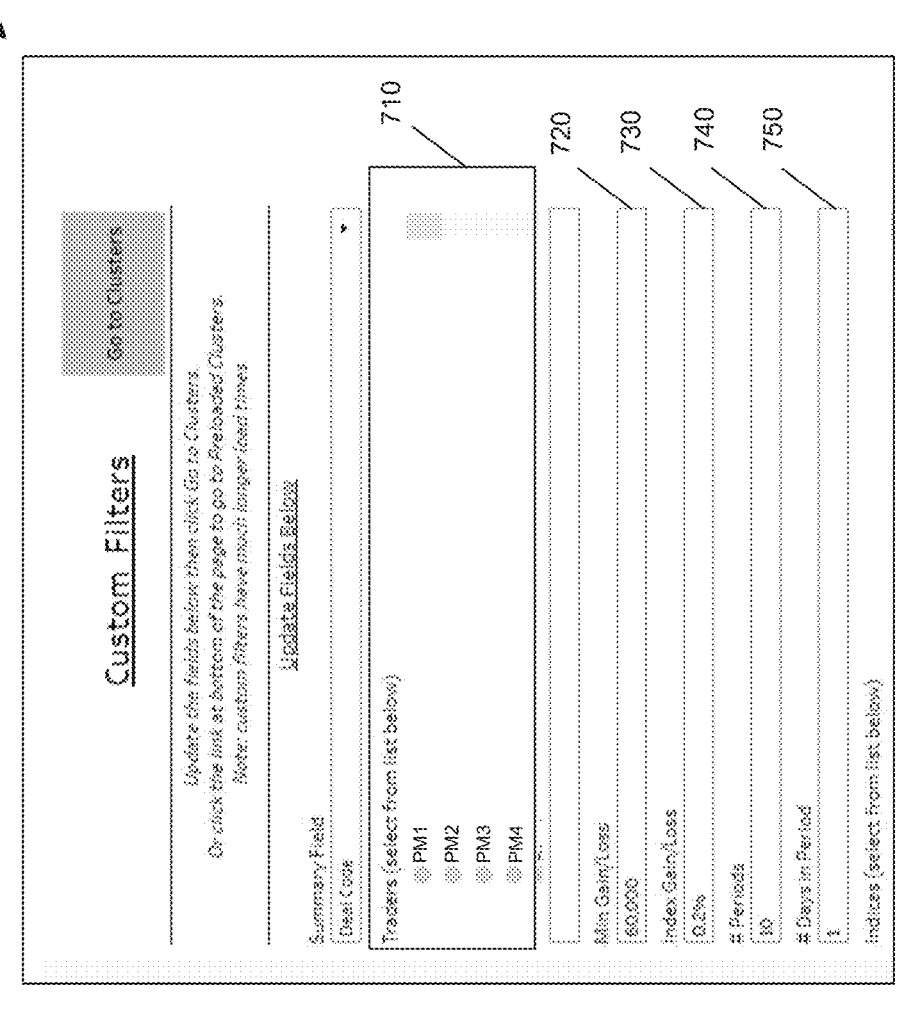

The system may also allow users to generate customized data analysis based on their chosen criteria. As depicted in FIG. 7, the system may allow a user to generate any combination of data to be analyzed per user selections. Using the input elements depicted in the graphical user interface 700, a user may create a customized way of analyzing the data. For instance, the user may select trades from the list of input elements within the set of graphical components 710, select gains/losses using the input element 720, select an index gain/loss using the input element 730, and select the observation period using the input elements 740 and 750. Upon generating a customized cluster, the system may analyze the data and direct the user to FIGS. 8-9.

Referring now to FIG. 8, an example of a graphical user interface displayed by the system is depicted. The system may use the preloaded cluster (FIG. 6) or customized clusters (FIG. 7) to analyze the data. Based on the Gerber relationships between various assets or variables (e.g., deal records), the system can display the extent of a relationship between two or more assets or the relationship of an asset to an index, as depicted in the graphical user interface 800. The relationship can be depicted in a format whereby assets moving in the same direction and having a positive relation may be depicted differently (e.g., via alphanumerical representation (e.g., numbers or classes), different size, color, or shape) than those assets moving in a different direction and having a negative relation. The system may employ an algorithm to highlight those assets that have, for example, exhibited the most significant moves and/or have the most significant relationships.

The grid depicted in FIG. 8 has an x-axis with a separate column for each asset and a y-axis with a separate row for each asset. The intersection between an asset on the x-axis and an asset on the y-axis indicates the Gerber relationship between the two assets. The Gerber relationship can be shown as a number by applying one or more versions of the Gerber Statistic methods on the corresponding data (e.g., performance of each asset in accordance with a particular index within a defined observation period). The system can display an indicator representing the similarity of movements across assets. For example, the system can provide a percentage value representing the number of periods where the two assets moved in the same direction minus the number of periods where the two assets moved in opposite directions, and that number is divided by the total number of periods exceeding the threshold, as shown in box 810 (e.g., 40%). For example, a percentage of 40% may be the result of seven periods where the two deal code records moved in the same direction minus three periods where the deal code records moved in opposite directions, divided by ten periods that exceed the threshold criteria for that date range.

The system may also display the result in another visual format, as depicted in FIG. 9. As depicted, the graphical user interface 900 shows a scatter plot where different assets/variables are represented by different graphical indicators (e.g., data points) separated into different quadrants. The graphical user interface 900 includes four quadrants separated by various predetermined and/or revisable thresholds. For brevity and clarity, the graphical user interface 900 depicts co-movement of two assets (deal records). However, in other embodiments, a user may customize one or more assets, such that more assets are shown. In some configurations, the system may direct the user to the graphical user interface 900 when the user interacts with any of the indicators shown in FIG. 8. For instance, when a user clicks on the box 810, the system directs the user to the graphical user interface 900 where the corresponding two assets are compared using one or more versions of the Gerber Statistic.

In FIG. 9, a first axis 901 represents movements of a first asset (GS-HF-LS) and a second axis 902 represents movements of a second asset (EEM). A threshold value for movement of either asset may be set by the system and/or the user or the system administrator, which is depicted by threshold values 903, 904, 905, and 906. These threshold values create four quadrants: quadrant 910 (Q1) representing both assets moving in a positive direction beyond the threshold, quadrant 920 (Q2) representing the first asset moving in a negative direction beyond the threshold and the second asset moving in a positive direction beyond the threshold, quadrant 930 (Q3) representing both assets moving in a negative direction beyond the threshold, and quadrant 940 (Q4) representing the first asset moving in a positive direction beyond the threshold and the second asset moving in a negative direction beyond the threshold. Quadrants 910, 930 represent the instances of a positive union, whereas quadrants 920, 940 represent the instances of a negative union. The system, by default, may identify and use whatever thresholds were used in the portfolio level analysis. However, these thresholds are not limited to the thresholds used at the portfolio level analysis. For instance, an end user (PM) or a system administrator may revise the thresholds accordingly.

In the depicted embodiment, the grid uses daily measurements over an observation period indicated by the graphical component 960 (e.g., Mar. 22, 2021, to Apr. 5, 2021). The observation period may be revised by the user. For instance, the user may instruct the system to analyze the data for a longer period of time (e.g., 45 days) or analyze the data based on bi-weekly measurements instead of daily measurements. For each day within the observation period indicated within the graphical component 960, a point is positioned on the grid depicted within the graphical user interface 900 corresponding to the movements of the two assets. For instance, points 911-913 and 931-934 represent co-movement of the two assets. In contrast, points 921-923 represent a negative union (e.g., opposite of the co-movement) of the two assets.

The system may also display the graphical component 950 where the calculated relationship for each day is presented. In some configurations, the user may interact with the values depicted within the graphical component 950 and the system may direct the user to another page displaying more detailed data (e.g., positions for each asset or market movement).

Because GS1 and GS2 are less restrictive than GS, the system can analyze more data points without excluding them due to the data points falling below the restrictive thresholds. As a result, the graphical user interface 900 does not include any data points that fall in between the thresholds 903-906.

While the embodiment shown in FIG. 9 relates to measuring movements in monetary value with a threshold specified in dollars, it is understood that any suitable measurement or unit can be used for movement and any suitable measurement or unit can be used as a threshold. For example, the movement measurement or a threshold can be absolute (e.g., a number of units) or relative (e.g., a percentage). In some embodiments, a threshold can be a relative measurement based on past behavior of the assets. The threshold can be based upon a standard deviation of past asset movement, whereby a lower standard deviation can represent a lower threshold more sensitive to asset movement. For example, a threshold may be set to a multiple of the asset's standard deviations based on past behavior. In some embodiments, a threshold may be dynamically adjusted for each measurement based on recent behavior of the asset. In such embodiments, the threshold may automatically change over time as the behavior of the asset evolves.

While the embodiment shown in FIG. 9 applies the same threshold value to both assets, it is understood that a different threshold can be applied to each asset. In some embodiments, each asset can have its own threshold based upon that particular asset's unique characteristics or past performance. For example, the threshold for each asset may be selected so that it corresponds to the movement magnitude, volatility, or other historical behavior of each asset. In one embodiment, a user can adjust the threshold for one or both assets, a feature that may be used to manually adjust for measurement sensitivity. In other examples, the system may consider the performance data in terms of a changing of levels associated with performance of the asset, such as percentage change (not absolute amount), log, simple difference between two assets, deviation from a trend, and the like.

In some configurations, the system may identify different benchmarks and indices to be used in the calculations discussed herein. The system may dynamically monitor performance of a certain sector or index. If the performance satisfies a threshold, the system may generate a recommendation accordingly. For instance, if the system determines that the retail sector has had a sudden spike, the system may recommend calculating a portfolio's exposure against indices corresponding to the retail sector. The system may generate an electronic notification informing the user (e.g., portfolio manager) that the retail sector's performance has had a sudden spike. The notification may then recommend using the retail sector as a benchmark, such that a portfolio's exposure is calculated against new indices. Upon receiving authorization from the user or a system administrator, the system may then re-analyze the data using the updated (or additional) benchmarks.

The system may continuously monitor the market to recommend new benchmarks, such that data is periodically calculated using updated benchmarks that reflect the latest market movements.

The system may also generate a confidence score for the results calculated. For instance, when a positive or negative union is identified, the system may determine whether the data indicating the result is statistically significant using another statistical significance protocol (after making distributional assumptions). Specifically, the system may determine a degree of statistical significance for a positive or a negative union. Statistical significance indicates whether the results generated by applying one or more versions of the Gerber Statistic to the data is likely to occur randomly (by chance) or likely to be attributable to a specific cause. If the Gerber Statistic is applied to a small data sample (e.g., small number of observations), it may not yield results that are statistically significant. Therefore, the system may assign a low confidence score to the result. If the system determines that the results have a low confidence score (e.g., a confidence score that is less than a threshold), the system may recommend increasing the observation period to re-analyze the data using a bigger sample size. For instance, if the user instructs the system to analyze performance data for a week (e.g., via interacting with the input elements of the graphical component 960), the system may display a message that recommends increasing the time to a month (and/or increasing the frequency of observations to hourly) because a week (and/or daily frequency) may not yield results that are statistically significant.

In some configurations, the system may dynamically calculate thresholds that would yield results with high confidence score (e.g., results that are statistically significant). The system may vary the threshold (e.g., thresholds that are visually depicted as lines 903, 904, 905, and 906). For instance, instead of receiving the observation period from a user, the system may automatically analyze the market based on the selected indices and determine thresholds that would yield better results. In this way, the user may only select the assets to be analyzed and the system may automatically determine a suitable time threshold that are customized based on market volatility, availability of data, historical observations, and the like. The thresholds may also be calculated based on the assets to be analyzed.

The system may determine the time threshold based on various attributes of the assets to be analyzed, such as price, trade volume, and the like. For example, a first stock may have more observable data points in a shorter period of time because the first stock has been traded more frequently than a second stock. Therefore, the system may calculate a different observation period for the first stock than the second stock. In another example, the system may impose additional thresholds or may segment the time windows differently based on trading price and/or volume. For instance, the system may only analyze the data when a stock has been traded more than a certain volume. In another example, the system may segment the observable periods of time into bi-daily (and not daily) segments because a particular stock has a high trading volume.

In another example, an asset (e.g., a particular stock) may be continuously traded during market hours. As a result, the system may compare ownership of a stock (pricing every second) in light of the capital invested in a strategy with a lock-up or less frequent observable returns (e.g., hedge fund or private equity).

The system may also use different versions of the Gerber Statistic described herein to show multiple sets of results. While FIG. 9 depicts one set of results, the system may utilize GS, GS2, and/or GS3 to generate different sets of results. In some configurations, the graphical user interface 900 may include an input element (e.g., toggle, drop down menu, or a radio button) that allows the user to instruct the system to use a particular version of the Gerber Statistic to calculate the results. In some configurations, the system may simultaneously display two or three sets of results where each set of results is calculated using a different version of the Gerber Statistic. The system may also display an average of multiple Gerber Statistics as the only set of results.

The system may also analyze the shape of the scatter plot (e.g., arrangement and shape of the data points within each quadrant) to recommend an investment strategy. For instance, the arrangement of the data points may indicate that when the market is in red (e.g., lower than a threshold), assets within a portfolio experience a decreased value. However, the assets are not participating in the market when the market is in green. Therefore, the system may recommend a new investment strategy (e.g., purchasing put options). In another example, if a portfolio manager has invested in stock A and shorted stock B, the portfolio is exposed to a high risk. However, based on the system's recommendation, the portfolio manager may purchase put options instead of shorting stock B. As a result, the portfolio's risk is limited to a fixed amount. In another example, if the system determines that a linear hedge has caused noisy data, the system may recommend a non-linear hedge.

The system may retrieve one or more of the criteria, thresholds, or other data needed to generate the graphical user interface 900 from a template (pre-made cluster) associated with the user viewing the graphical user interface 900 and/or a user associated with the assets analyzed (e.g., portfolio manager). For instance, a user may login to the electronic platform provided by the system and select a generated cluster. Upon instructing the system to execute the generated cluster/template, the system may automatically retrieve the data necessary to generate the graphical user interface 900. For instance, the system may retrieve the customized observation period thresholds, indices, and other data from the cluster/template to calculate the relationships discussed herein.

Referring now to FIG. 10A, a method depicts a method for portfolio construction, analysis, and visualization according to an embodiment. The method may be performed by a server, such as the server within the system 100 (FIG. 1).

At step 1010, the system may retrieve performance data for a plurality of data records within an observation period. The system may query and retrieve performance data associated with one or more assets. The performance data may be filtered in accordance with various criteria, such as observation period thresholds, performance values with respect to particular indices, and the like. In some embodiment, the above-described criteria may be retrieved from pre-generated templates/clusters. For instance, based on a user identifier, the system may retrieve an appropriate template/cluster (e.g., a template/cluster generated for a particular portfolio manager). In other embodiments, the above-described criteria may be inputted by a user (e.g., FIG. 7).

At step 1020, the system may, for at least one pair of data records within the plurality of data records, determining whether a first data record of a pair of data records and a second data record of the pair of data records have a positive union or a negative union based on each instance in which a respective value of the performance data for each data record is above an upper threshold or below a lower threshold for the first data record or the second data record. At step 1030, the system may display on a graphical user interface, a representation of the positive or negative union.

The system may apply various analytical methods discussed herein to identify relationships between data points representing different assets. For instance, the system may use one or more versions of the Gerber Statistic to populate the graphical user interface described in FIG. 8.

At step 1040, the system may, in response to receiving an indication of interaction with the representation of the positive or negative union, dynamically revising, by the server, the graphical user interface by displaying, for the pair of data records, a visual indicator within four regions, wherein: a first region represents positive union with respect to the upper threshold and the lower threshold, a second region represents negative union with respect to the upper threshold and the lower threshold, a third region represents positive union with respect to the lower threshold and negative union with respect to the upper threshold, and a fourth region represents negative union with respect to the lower threshold and positive union with respect to the upper threshold.

When a user interacts with an interactive element displayed (e.g., when a user interacts with the box 810 depicted in FIG. 8), the system may direct the user to a new page or may dynamically revise the graphical user interface. The new page or the revised graphical user interface may present analysis of two or more assets (e.g., a portfolio), such as depicted in FIG. 9.

The methods and systems discussed herein can be used to visualize various data points corresponding to underlying assets where the data points are arranged in a manner to reveal the best investment opportunities. For instance, a series of graphical user interfaces can arrange the data points in different graphs to visually gauge them with respect to the Gerber values discussed herein.

Turning now to FIG. 10B, a method 1000 depicts a method for portfolio construction, analysis, and visualization according to an embodiment. The method 1000 may be performed by a server, such as the server within the system 100 (FIG. 1). Additionally, or alternatively, the method 1000 may be performed and/or executed by one or more processors of one or more electronic devices.

At step 1042, the system may retrieve performance data for a plurality of data records within an observation period. The server may receive one or more inputs indicating thresholds and limits needed to retrieve the data. These thresholds can be inputted by the user or may be retrieved from a system administrator (e.g., default values). In some embodiments, the server may display a graphical user interface having various input elements configured to receive the thresholds/limits needed from the user, such that the server can retrieve the data needed to be visualized.

Figure 11:
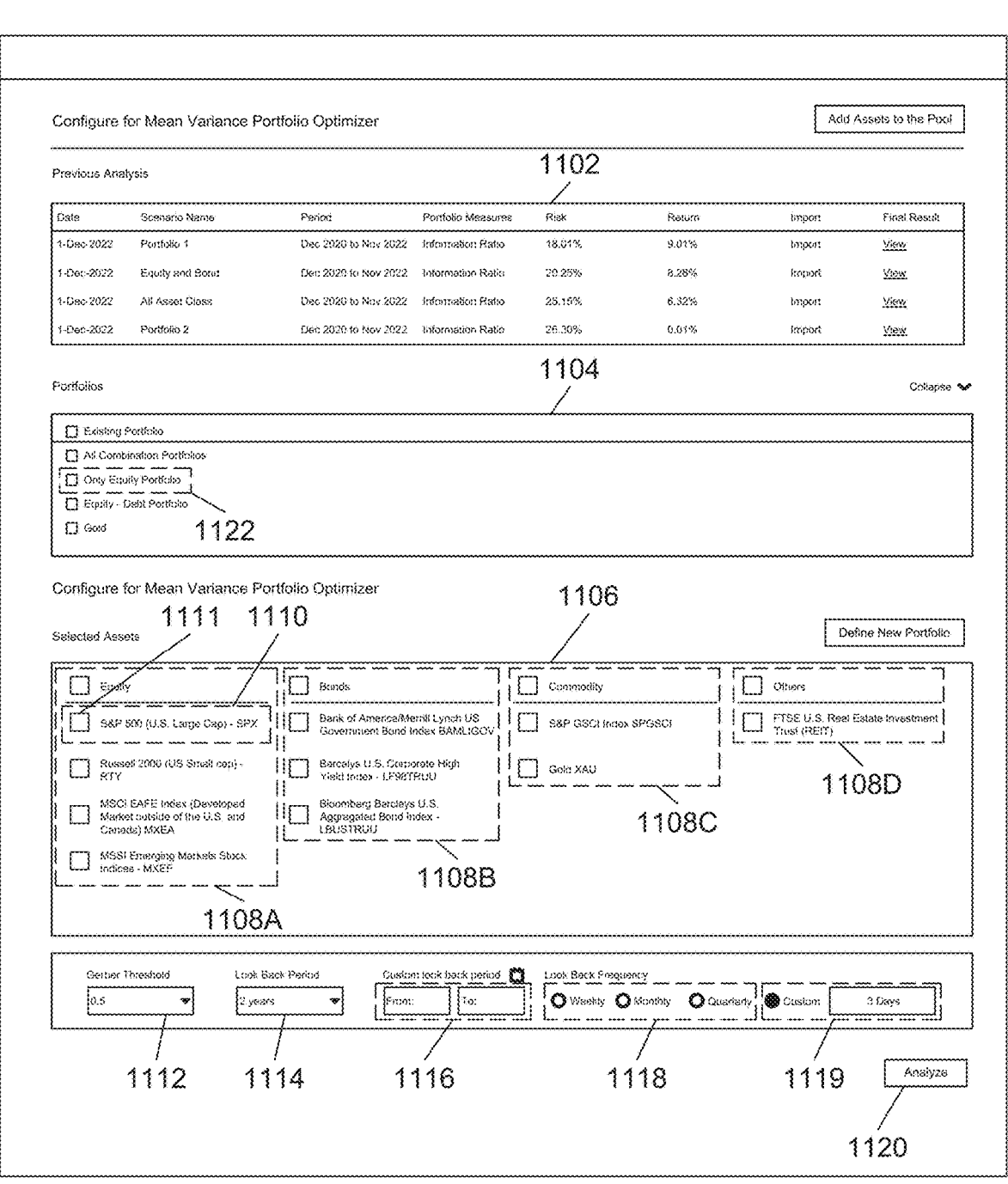
FIGS. 11-17 depict various graphical user interfaces displayed, according to various embodiments.

For example, in some embodiments, the system may receive a selection of one or more portfolios, assets, and/or investments (e.g., data records) from a user interacting with a graphical interface, such as graphical interface 1100 of FIG. 11. Upon receiving this selection, the system may retrieve performance data (e.g., cost, averages, maximums, minimums, etc.) of the one or more selected data records. The system may then query one or more databases (hosted local or remote to the system) to retrieve the data.

Referring to FIG. 11, the graphical user interface 1100 is depicted. In some embodiments, the system is configured to receive inputs needed to determine the Gerber relationship of one or more assets within a portfolio to determine an optimized portfolio balancing of assets based on the Gerber Statistic, as described above. The system may provide (e.g., host or instruct another entity to host) the graphical interface 1100 for the user to select a subset of assets to include in a portfolio to be analyzed. The system may present on the graphical interface 1100 a Previous Analyses Section 1102. The Previous Analyses Section 1102 may list one or more previous analyses and include various relevant data to quickly reintroduce a user of an analysis and the key takeaways associated with the analysis. For example, the Previous Analysis Section 1102 may include a date of the analysis performed, a user-selected (or auto-populated) analysis name, a time period of the analysis, a risk indicator (e.g., a percentage of risk), a return indicator (e.g., a percent return), a list of the assets in the portfolio, percentages of the portfolio balance, etc.

In some embodiments, the graphical interface 1100 may include a Portfolios Section 1104 that displays an interactive list of saved portfolios (e.g., sample portfolio 1122). Upon the system receiving a user's interaction (e.g., clicking, selecting, gesturing) with the sample portfolio 1122, the system may direct the user to a new page or refresh the existing graphical interface 1100 to display various parameters of the sample portfolio 1122. For example, this system may display the various assets of the sample portfolio 1122 and associated percent makeup of the sample portfolio 1122 overall.

The system may also display a Portfolio Customizer Section 1106 wherein the user may specify various assets to be included in a customized portfolio. For example, the user may use an input element 1111 to instruct the server to include a sample equity asset 1110 from equity list 1108A to be included within the analysis. In another example, the system may provide various input elements configured to receive a selection made from a bonds list 1108B, a commodity asset from a commodity asset list 1108C, or other assets from the asset list 1108D. Beyond presenting various assets to include through portfolio customizer 1106, the system may provide means for the user to select a threshold (and/or associated threshold sensitives), for example, with input element 1112. The system may receive from the user a look-back period (e.g., 6 months, 1 year, 2 years, etc.) to use in executing one or more methods (e.g., method 1000 of FIG. 10). For example, the system may present on the graphical interface 1100 an input element 1114 for selecting a predefined look-back period (e.g., 1 month, 1 year, 5 year, etc.), a custom look-back period input 1116 for selecting a start and end date of the look-back period, one or more look-back frequency input elements 1118 for a user to select a predefined frequency (e.g., weekly, monthly, quarterly, etc.), or a custom frequency input 1119 for a user to input a custom look-back period frequency (e.g., every three days). Once the user selects a portfolio for analysis (either from a saved portfolio from the saved Portfolios Section 1104 or by customizing a portfolio in the Portfolio Customizer Section 1106), a threshold from input element 1112, and a look-back period, the user can initiate the computations and analysis of the selected portfolio upon interaction (e.g., touch, click, or other activation) with an interactive component 1120.

Referring back to FIG. 10B, at step 1044, the system presents on a graphical interface the performance data for a first data record and the performance data for a second data record, wherein the performance data of the first data record and the performance data of the second data record is displayed corresponding to a time axis and a valuation axis. The system may use various analytical protocols and calculations described herein to analyze the data (as limited and identified in the step 1042).

For example, in some embodiments, the system may display the retrieved performance data on a graphical interface, such as graphical interface 1230 of FIG. 12A, as described in further detail below.

Figure 12A:
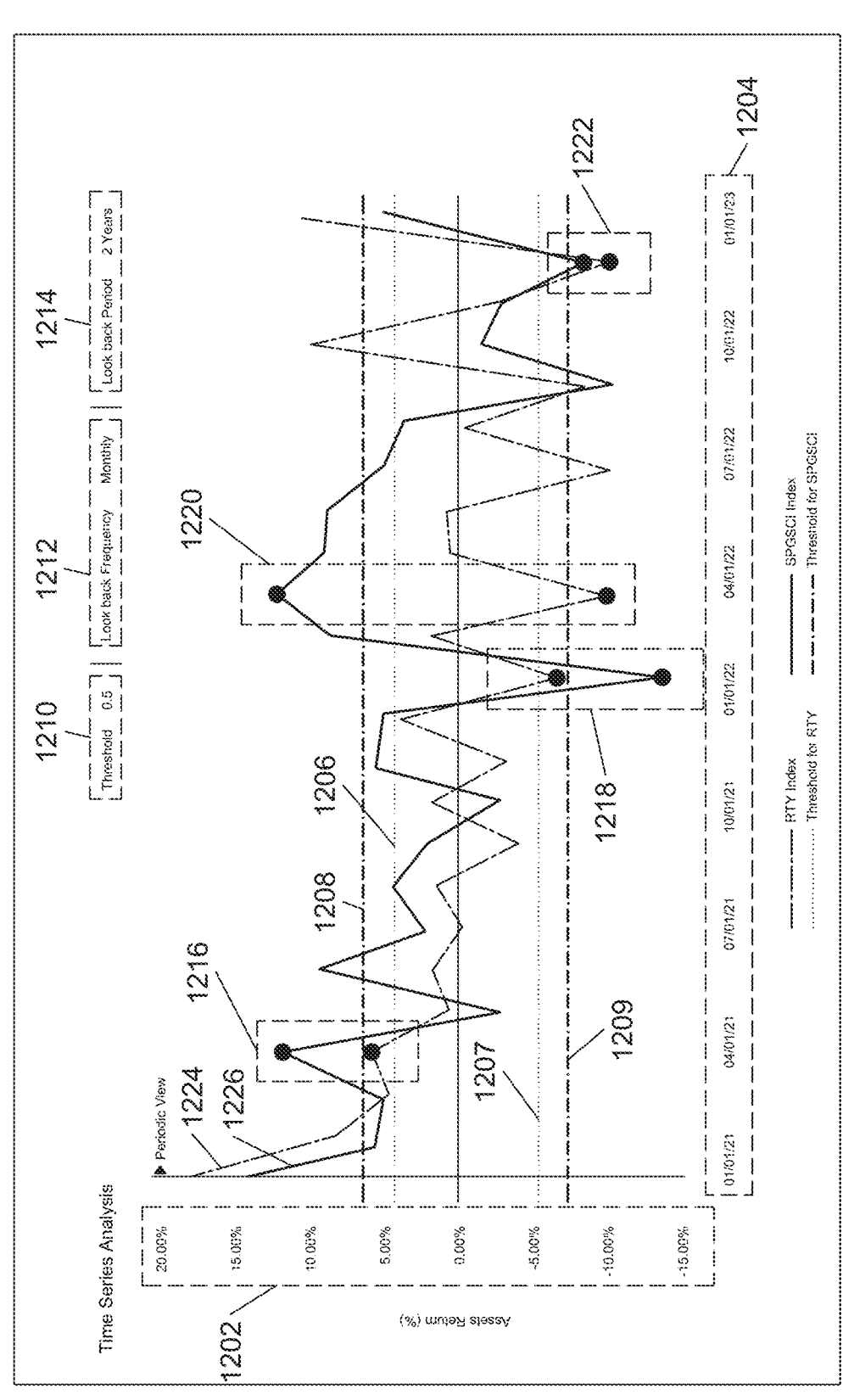

As depicted in FIG. 12A, a graphical interface 1200 is shown. Upon receiving a selection of a portfolio for analysis (e.g., from the graphical interface 1100 of FIG. 11), the system may retrieve historical performance data of the one or more assets included in the selected portfolio(s). As depicted in the graphical interface 1200, the portfolio has at least a first asset 1224 and a second asset 1226. The first asset 1224 and the second asset 1226 may be included in an asset pair. The retrieved historical performance data of the asset pair comprising the first asset 1224 and the second asset 1226 is presented (e.g., as a scatter plot, line graph, bar graph, histogram, etc.) by the system on the graphical interface 1200 over a look-back period as defined by look-back period 1214 (e.g., data starting from Jan. 1, 2021), with a look-back frequency as defined by look-back frequency 1212 (e.g., monthly). This combination of look-back period and frequency may be considered an observation period. The observation period may be selected by a user in FIG. 11 or through the look-back period 1214 and look-back frequency 1212 of FIG. 12A. In one example, the historical performance data is displayed on the graphical interface 1200 on a graph with an x-axis 1204 (e.g., time) and a y-axis 1202 (asset return (%)).

Referring back to FIG. 10B, at step 1046, the system may retrieve a first threshold pair corresponding to the first data record and a second threshold pair corresponding to the second data record, wherein the first threshold pair comprises a first ascending threshold and a first descending threshold, and the second threshold pair comprises a second ascending threshold and a second descending threshold. At step 1048, the system may present on the valuation axis a first graphical indication of the first threshold pair and a second graphical indication of the second threshold pair.

For example, in some embodiments, the system may retrieve an upper threshold (e.g., ascending threshold) and a lower threshold (e.g., descending threshold) for one of the one or more data records. This threshold may be used by the system to determine statistically relevant changes in the performance data of the data record and/or to aid a user or other model in determining one or more parameters of the data record, for example, a Gerber Statistic. The system may retrieve the upper and lower threshold from a user input in the graphical interface 1200 of FIG. 12A, or the system may auto-populate the upper and lower threshold from one or more statical parameters of the one or more data records. In some embodiments, the system may receive the threshold values from a system administrator (e.g., portfolio manager). Then the system may present the retrieved threshold, for example, in graphical interface 1200.

As shown in FIG. 12A, in addition to presenting the historical performance data of the first asset 1224 and the second asset 1226, the system may present an associated threshold pair for each asset superimposed on the graphical interface 1200. The asset threshold pair of the first asset 1224 comprises an ascending threshold 1206 and a descending threshold 1207. The asset threshold pair of the second asset 1226 comprises an ascending threshold 1208 and a descending threshold 1209.

The threshold pairs may be determined by the user through one or more input elements presented by the system on graphical interface 1200 or be auto-populated by the system based on one or more statistical parameters of the assets 1224, 1226. For example, the threshold pairs may be determined by a maximum, a minimum, a mean, a median, a mode, and/or a standard deviation of the historical performance data of the first asset 1224 and/or the second asset 1226. The threshold pairs may be used by the system to reduce noise in determining a Gerber relationship of the assets (e.g., the first asset 1224 and the second asset 1226). The data points exceeding the ascending or descending thresholds (e.g., above the ascending thresholds or below the descending thresholds) may be marked or otherwise indicated by the system on the graphical interface 1200 as statistically relevant data points. The marks or indications may include a symbol (e.g., a star, square, circle, polygon, and/or animation), a color, or other visual attribute. The system further caches (or otherwise stores) the data points and any associated data in a local or remote memory for use in executing the methods described herein.

Referring back to FIG. 10B, at step 1050, the system may then determine whether the first data record and the second data record represent a positive unity or a negative unity for at least one time period within the observation period and present a third graphical indication corresponding to the determined positive unity or negative unity. The system may use various methodologies discussed herein to determine whether two assets are positively or negatively co-moving (or even whether they have a co-movement).

For example, in some embodiments, the system determines if the data records have a positive unity (as described herein), a negative unity (as described herein), or no unity. The system may then display an indication of the determined unity (or lack of unity) on the graphical interface 1200 of FIG. 12A, as described below. This indication allows the user of the graphical interface 1200 to quickly determine the co-variability of the two or more data records and decide whether or not to pursue an investment strategy associated with the two or more data records.

In the embodiment depicted in FIG. 12A, the marked, or otherwise indicated, data points are used by the Gerber Statistic (as executed by the system, a server, a processor(s), etc.) to determine co-movement of the assets 1224, 1226. Data pairs 1216, 1218, 1222 illustrate positive co-moving data sets (e.g., data sets having a positive unity, as described herein). Data pair 1220 illustrates a negative co-moving data set (e.g., a data set having a negative unity, as described herein). In some embodiments, the system calculates a Gerber Statistic of the asset pair over the look-back period 1214 and displays the Gerber Statistic in graphical interface 1200.

Referring now back to FIG. 10B, at step 1052, the system may further determine an efficient frontier of the plurality of data records for the performance data within the observation period based at least on the first threshold pair. At step 1054, the system may transmit instructions to display an indication of the efficient frontier, wherein the indication comprises a Max Sharpe Ratio of the efficient frontier, a representative visual element for one or more of the plurality of data records, a first visual attribute associated with data records with a positive annualized return over the observation period and a second visual attribute associated with data records with a negative annualized return over the observation period.

Figure 12B:
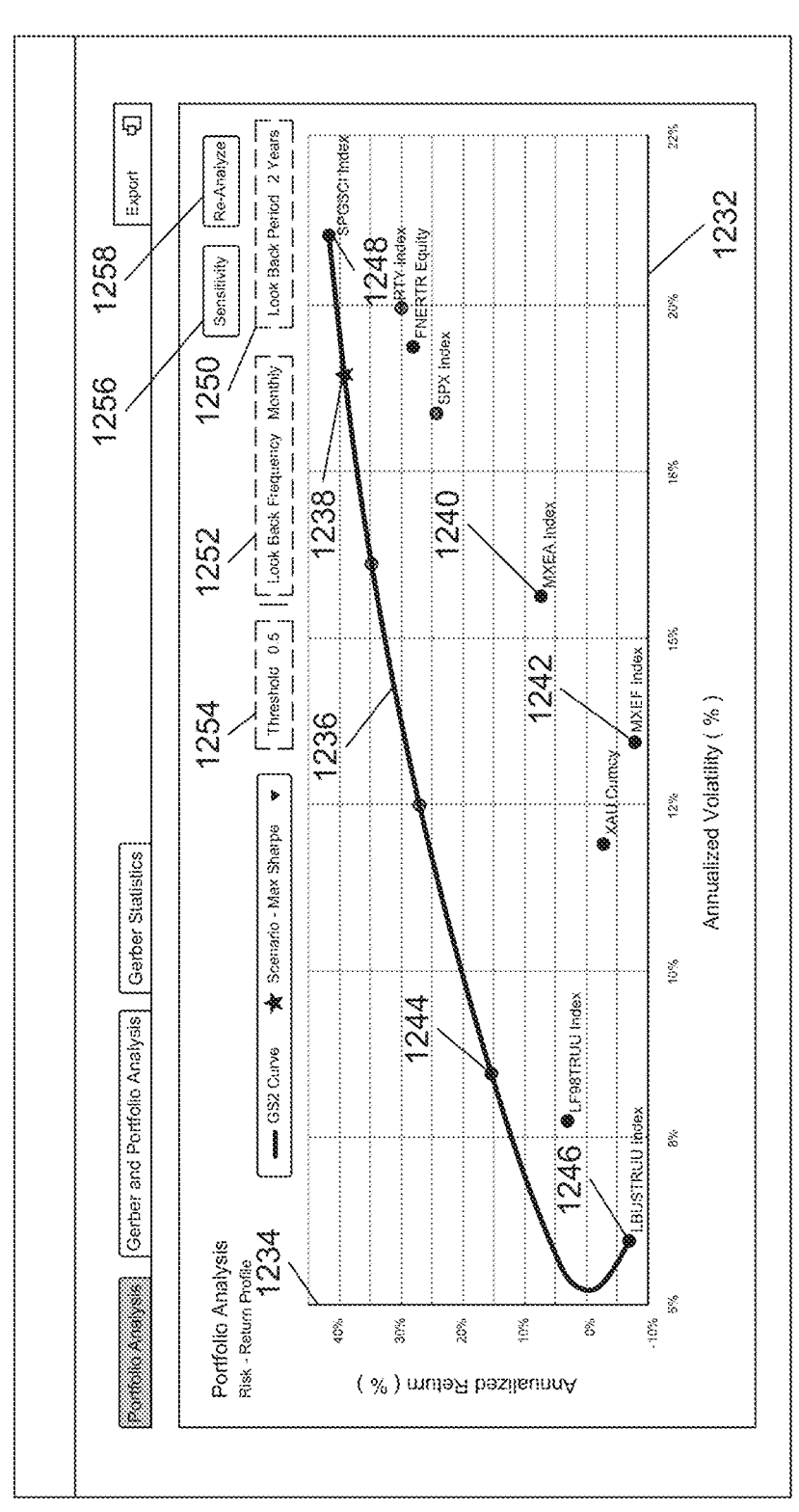

For example, in some embodiments, the system displays the determined efficient frontier and associated metrics (e.g., annualized returns, annualized risks, portfolio makeup, confidence value, etc.) on a graphical interface, such as graphical interface 1230 of FIG. 12B. In some embodiments, the system uses a user-defined Gerber Statistic (or other portfolio parameter) to limit the assets/portfolios analyzed in determining the efficient frontier.

Referring to FIG. 12B, in one embodiment, the system may present a graphical interface 1230, which may include various data and analysis of the selected portfolio and/or data records. According to one embodiment, the graphical interface 1230 may include a graph with an x-axis 1232 and a y-axis 1234. The x-axis 1232 may illustrate the annualized volatility of a portfolio, and the y-axis 1234 may depict the annualized return based on percentage return on investment of the portfolio.

In some embodiments, the system may present the graphical interface 1230 to illustrate an annualized return based on the annualized volatility of various portfolio iterations based on the chosen assets for the portfolio. The system plots the return of each asset individually, in other words, the system graphs the annualized return of a portfolio with a 100% investment in each individual asset. The MXEF index marker 1242 is an example plot of a portfolio with a 100% asset makeup of the MXEF index. An alternative portfolio is illustrated by the MXEA index marker 1240. The MXEA index marker 1240 depicts a portfolio with a 100% makeup of the MXEA index. The system iterates an analysis for each asset and plots the various annualized returns based on the annualized volatility. The system then iterates the return analysis for one or more portfolios with mixed assets and varying asset percentages. For example, the system may analyze a portfolio with 50% MXEF index and 50% MXEA index. The analysis can include any number of assets selected in the portfolio asset setup (e.g., as selected in the graphical interface 1100 of FIG. 11). After the system analyzes several (e.g., hundreds, thousands, millions, etc.) different portfolio iterations, the optimized portfolios (e.g., a portfolio with the highest annualized returns based on the annualized volatility) are graphed as an efficient frontier 1236, as shown in FIG. 12B. The efficient frontier 1236 may be made up of various portfolios, such as portfolio 1244.

In some embodiments, the system calculates the efficient frontier within the confines of certain parameters. For example, the look-back period selected in FIG. 11 and/or FIG. 12A may truncate the amount of data used by the system in calculating the efficient frontier 1236 by limiting the analysis to a specific amount of time at a specific frequency (e.g., the selected look-back period). This look-back period may be edited or displayed at look-back frequency 1252 or look-back period 1250 of FIG. 12B. Additionally, the sensitivity threshold 1254 (which may be similar or different than the threshold 1210 of FIG. 12A) may be used by the system to calculate portfolios satisfying the preselected sensitivity threshold 1254. In some embodiments, various permutations of portfolios are calculated, but only those lying on the efficient frontier 1236 are displayed by the system. In some embodiments, only portfolios satisfying a threshold 1254 (e.g., 0.5) are presented on the graphical interface 1230. In some embodiments, the sensitivity threshold is the Gerber Statistic, as described herein. The sensitivity threshold 1254 may be updated or edited by interacting with the graphical element 1256. Upon receiving an indication of an updated sensitivity threshold 1254, look-back period 1250, and/or look-back frequency 1252, the system may recalculate the efficient frontier 1236 in response to the user submitting the new input parameters through interacting (e.g., selecting) with the graphical element 1258.

The graphical interface 1230 may include various additional data points including a Max Sharpe Ratio 1238, a minimum annualized return 1246, and a maximum annualized return 1248.

The Max Sharpe Ratio 1238 illustrates the most optimized portfolio (based on the input parameters) based at least on a given annualized volatility. For example, the Max Sharpe Ratio 1238 is associated with a portfolio providing the highest annualized return per unit of annualized volatility, when referenced to a risk-free return. In other words, the Max Sharpe Ratio 1238 aids the user in determining whether higher returns are adequately compensating additional risks beyond the risk-free asset (e.g., a U.S. Treasury security). The minimum annualized return 1246 will be a portfolio comprising 100% of the poorest performing asset (e.g., LBUSTRUU Index), and the maximum annualized return 1248 will be a portfolio iteration comprising 100% of the highest performing asset (e.g., SPGSCI Index). In some embodiments, the system may present multiple efficient frontiers based on multiple Gerber Statistic thresholds, such as illustrated in FIG. 12C.

Figure 12C:
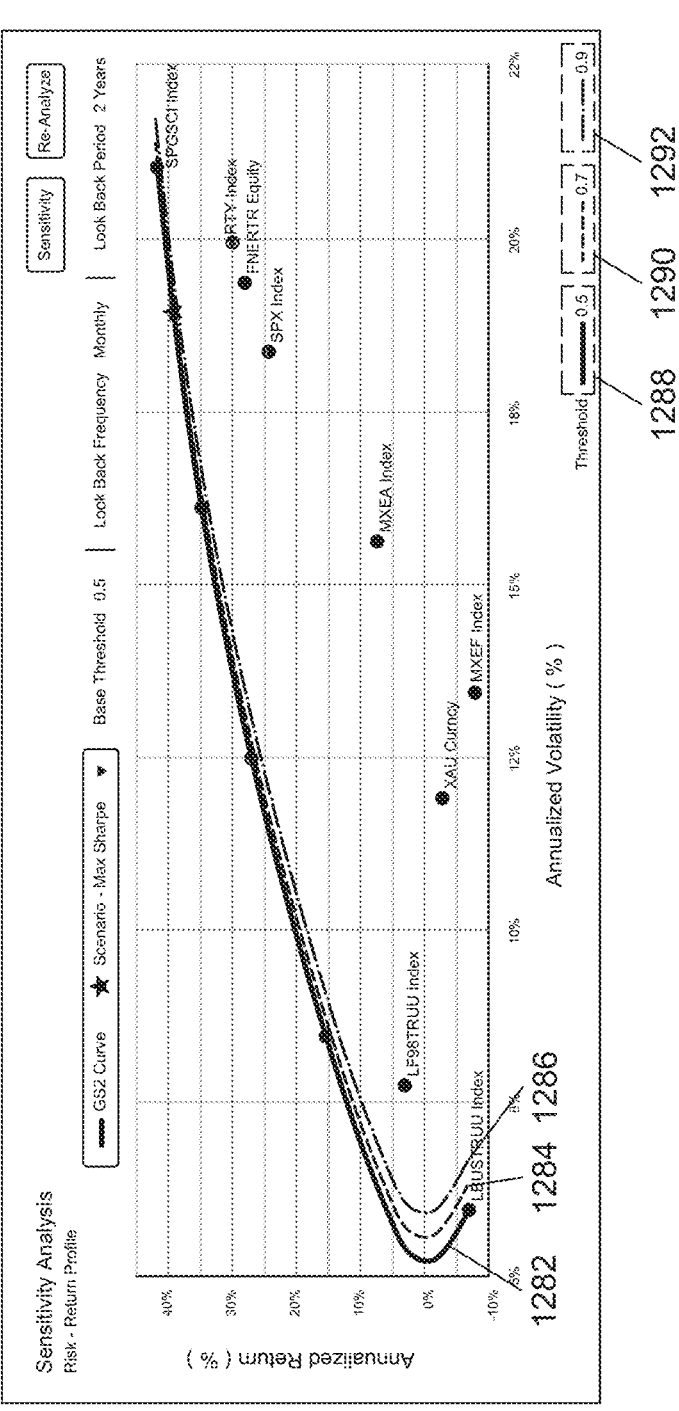

Turning now to FIG. 12C, a graphical interface 1280 is shown with various efficient frontiers shown in a single interface. In this embodiment, the system presents a first efficient frontier 1282, a second efficient frontier 1284, and a third efficient frontier 1284 superimposed on the same graphical interface 1280. In some embodiments, the first efficient frontier 1280, the second efficient frontier 1282, and the third efficient frontier 1284 are displayed on separate graphical interfaces. According to an embodiment, the first efficient frontier 1280 is associated with a first Gerber Statistic threshold 1288, the second efficient frontier 1284 is associated with a second Gerber Statistic threshold 1290, and the third efficient frontier 1286 is associated with a third Gerber Statistic 1292. The system may receive an indication of a user's interaction (e.g., selection and numerical input) with the first Gerber Statistic threshold 1288, the second Gerber Statistic 1290, and/or the third Gerber statistic 1292 to compare various portfolio makeups corresponding to various Gerber Statistics thresholds. In some embodiments, the graphical interface is substantially similar to the graphical interface 1230 of FIG. 12B. In some embodiments, the user of graphical interface 1230 may selectively choose to view one or more efficient frontiers to compare. In such embodiments, upon receiving an indication of a selection to view one or more efficient frontiers, the system may adjust, refresh, or direct to a new page to display the selected, additional efficient frontiers (e.g., graphical interface 1280).

Turning back to FIG. 12B, the system may display the asset makeup of various portfolios on the efficient frontier 1236. For example, turning now to FIG. 13, various portfolio iterations 1302 are presented in a graphical interface 1300 to help the user compare various portfolio options with the pre-selected assets. For example, the Max Sharpe portfolio 1322 (e.g., the portfolio resulting in a portfolio with the maximum Sharpe Ratio) is displayed as well as a current portfolio 1304. In on embodiment, the current portfolio 1304 is the portfolio currently held by a user. In the embodiment shown in FIG. 13, the portfolios are presented based on a target risk, however, the table may be filtered to display portfolios based on a target return, or any other portfolio parameter (e.g., asset percentage, assets used, volatility, Gerber Statistic, etc.). The Max Sharpe portfolio 1322 may be the portfolio illustrated in FIG. 12B (e.g., Max Sharpe Ratio 1238). The Max Sharpe portfolio 1322 may comprise 9.23% 1310 of FNERTR Equity 1308 and 90.77% 1306 of SPCSCI 1306. In other words, based on the annualized returns and risk of each asset selected in FIG. 11, this balance of assets gives the user a portfolio that maximizes the annualized return per unit of annualized volatility. Returning to FIG. 13, in this example, the system's analysis predicts the Max Sharpe portfolio 1322 to have a 32.50% return 1314 with a 20.86% standard deviation 1316.

Figure 13:
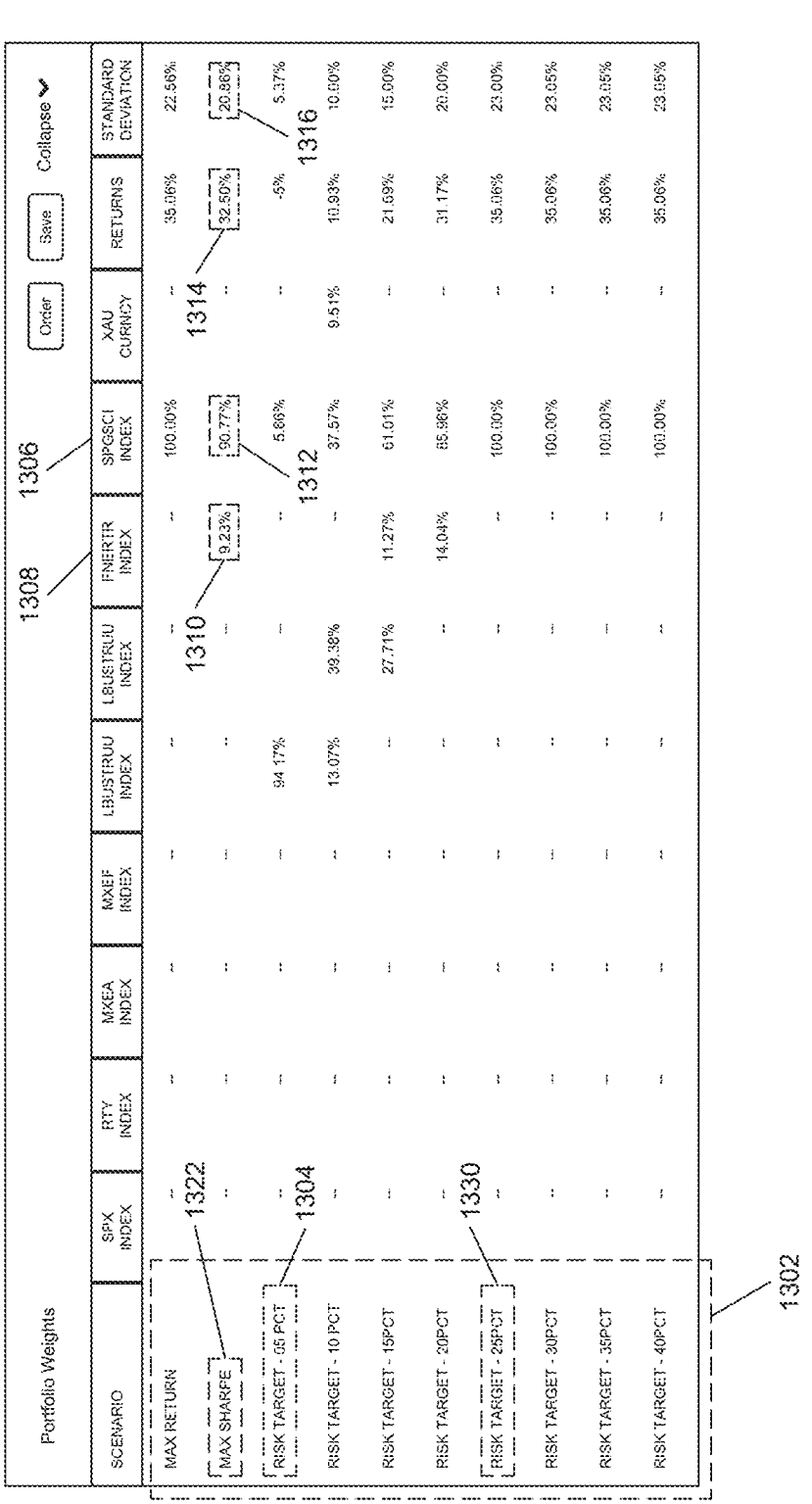
Figure 14:
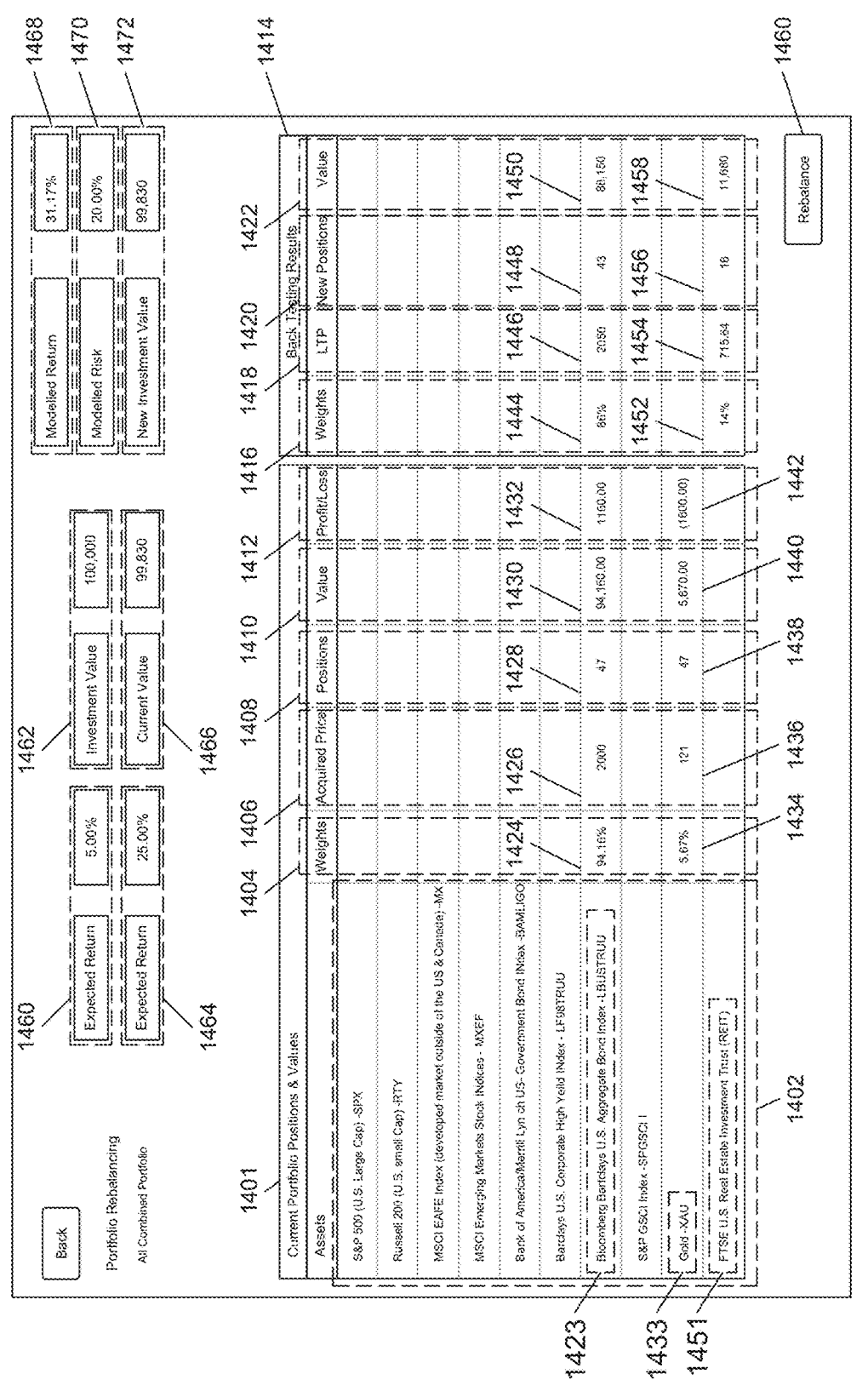

Various graphical interfaces generated by the system are depicted in FIGS. 14-17. In FIG. 14, the system may present graphical interface 1400 to aid the user in rebalancing a current portfolio positions and values 1401 to achieve a rebalanced portfolio. Upon receiving a user selection in FIG. 13 of a listed portfolio from the portfolio iterations 1302, the system may present a graphical interface such as the graphical interface 1400. For example, in the embodiments shown in FIGS. 13-14, a user may select a target portfolio 1330 by interactively selecting the target portfolio 1330 to determine how to alter the current portfolio (e.g., current portfolio 1304) to achieve the selected target portfolio 1330. The system may then calculate the changes (e.g., selling and buying of assets) needed to be executed to the current portfolio 1304 to achieve the selected target portfolio 1330 by comparing the current portfolio 1304 asset makeup with the asset makeup of the target portfolio 1330.

Upon the user selecting the target portfolio 1330 on FIG. 13, the system may refresh the page to present the graphical interface 1400 of FIG. 14. Alternatively, the system may direct the user to a new page to display the graphical interface 1400. The graphical interface 1400 may display various portfolio parameters (both of the current portfolio 1304 and the target portfolio 1330). For example, for the current portfolio 1304 (based on a 5% target risk rate), the graphical interface 1400 may display an expected return 1460, an investment value 1462, an expected risk 1464, and/or a current value 1466. The graphical interface may also include modelled portfolio parameters based on the analysis conducted in the previous steps of the system's analysis, as described in the previous figures. For example, for the selected target portfolio 1330 on FIG. 13, the graphical interface 1400 of FIG. 14 provides instructions on how to modify the current portfolio 1304 to achieve the target portfolio 1330. In addition, the graphical interface 1400 may include a modelled return 1468, a modelled risk 1470, and/or a new investment value 1472.

The system may present the current portfolio positions and values 1401, which may include a list of the assets 1402, weights of the assets 1404 within the portfolio, an acquired price of the asset 1406, a number of positions of the assets 1408, a current value of the assets 1410, and/or a current profit/(loss) of the assets 1412. In the example illustrated in FIG. 14, the current portfolio 1304 of FIG. 13 includes 94.16% 1424 of LBUSTRUU (acquired at $2000/share 1426) and 5.67% 1434 of XAU (acquired at $121/share 1436). The LBUSTRUU is currently valued at $94,160 1430, which has gained the portfolio $1160 1432. The XAU asset is currently at $5,670 1440, netting the portfolio a decrease of $1600 1442. Based on these changes, the current portfolio 1304 has a current value 1466 of $99,830.

The system may provide back testing results 1414 (e.g., portfolio makeup of the target portfolio 1330 based on the system's analysis) to provide the user with information needed to adjust the current portfolio 1304 to the selected target portfolio 1330, including, but not limited to asset weights 1416, asset last traded price ("LTP") 1418, asset position amount 1420, and/or asset estimated value 1422. In this example, the target portfolio 1330 includes 86% LBUS-TRUU 1444 (e.g., 43 positions 1448 with an LTP of $2050 1446) and 14% REIT 1452 (e.g., 16 positions 1456 with an LTP of $715.64 1454). This rebalancing would result in an estimated $88,150 value 1450 in LBUSTRUU and an estimated $11,680 value 1458 in REIT.

If the user approves of the suggested changes to reach the target portfolio 1330, the user may select graphical element 1460 to initiate one or more actions to rebalance the current portfolio 1304. This rebalancing may include buying, selling, and/or trading of assets. These actions may be executed by a broker, a server, or other trading system, and are illustrated in FIG. 15.

Figure 15:
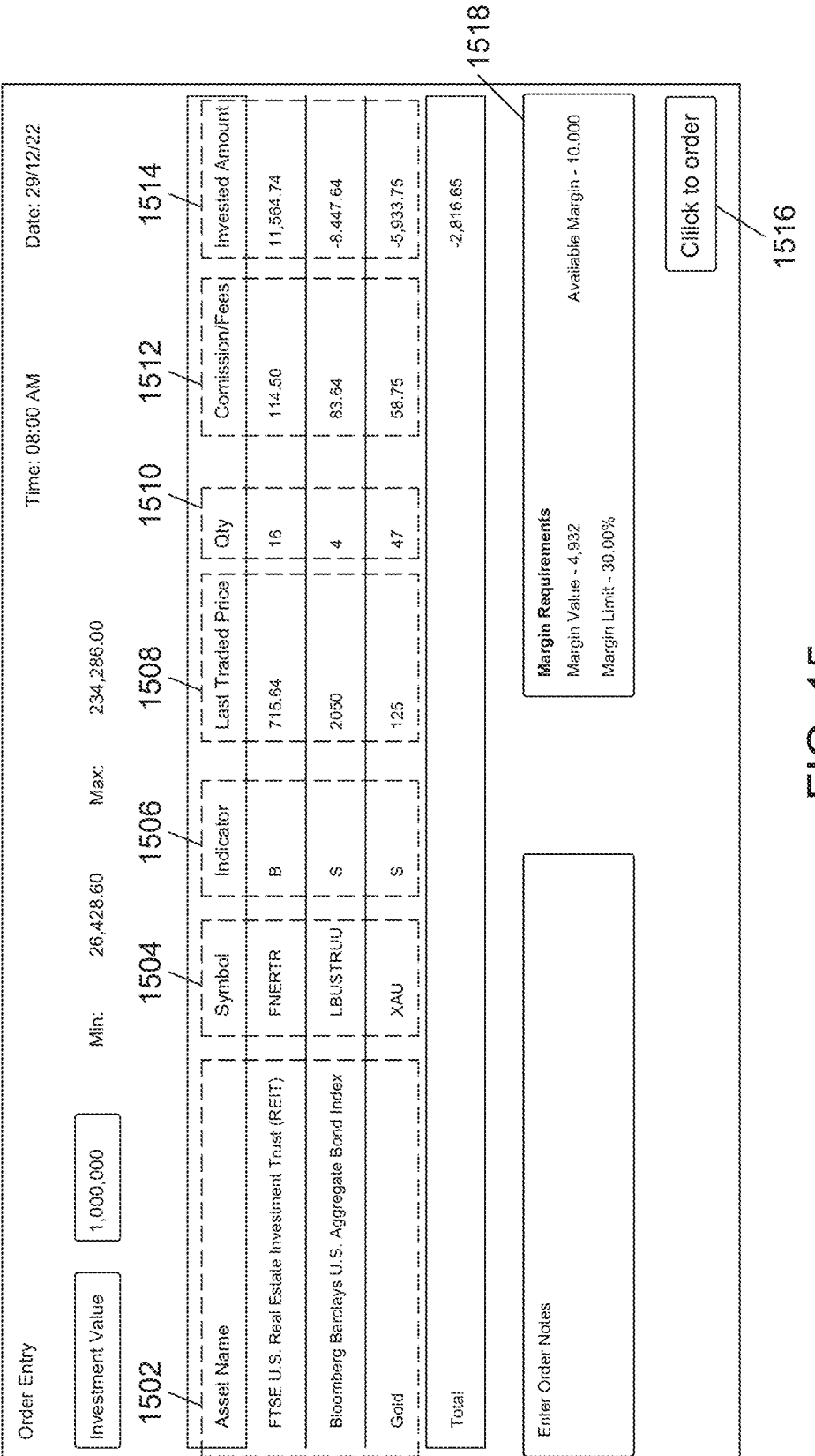

Referring to FIG. 15, a graphical interface 1500 is shown with various rebalancing actions displayed for a user's approval. According to an embodiment, the system may include on the graphical interface 1500 various data to aid the user in determining what actions should be taken to effectuate the desired rebalancing of the portfolio, as selected in FIG. 14. Returning to FIG. 15, such data may include, but is not limited to an asset name 1502, an asset symbol 1504, an action indicator 1506 (e.g., "B" for buy, "S" for sell, etc.), a last traded price 1508 (e.g., the last traded price of the corresponding asset), a quantity 1510 (e.g., the number of units of the corresponding asset to trade), a commission/fee 1512 (e.g., the fees associated with the corresponding action), and/or an invested amount 1514 (e.g., the resulting amount gained/lost from the investment after effectuating the trade). Additionally, the system may present on the graphical interface 1500 one or more Margin Requirements 1518 (e.g., a margin value, a margin limit, and an available margin) of the proposed changes.

Once the user approves of the recommended trades, the user may select graphical element 1516 to execute the one or more trades. In some embodiments, the graphical interface 1500 may include more or less data, or in a different configuration, than that depicted in FIG. 15. Upon receiving an indication of a selectin of the graphical element 1516, the system may affect the selected trades to rebalance the user's current portfolio.

Figure 16:
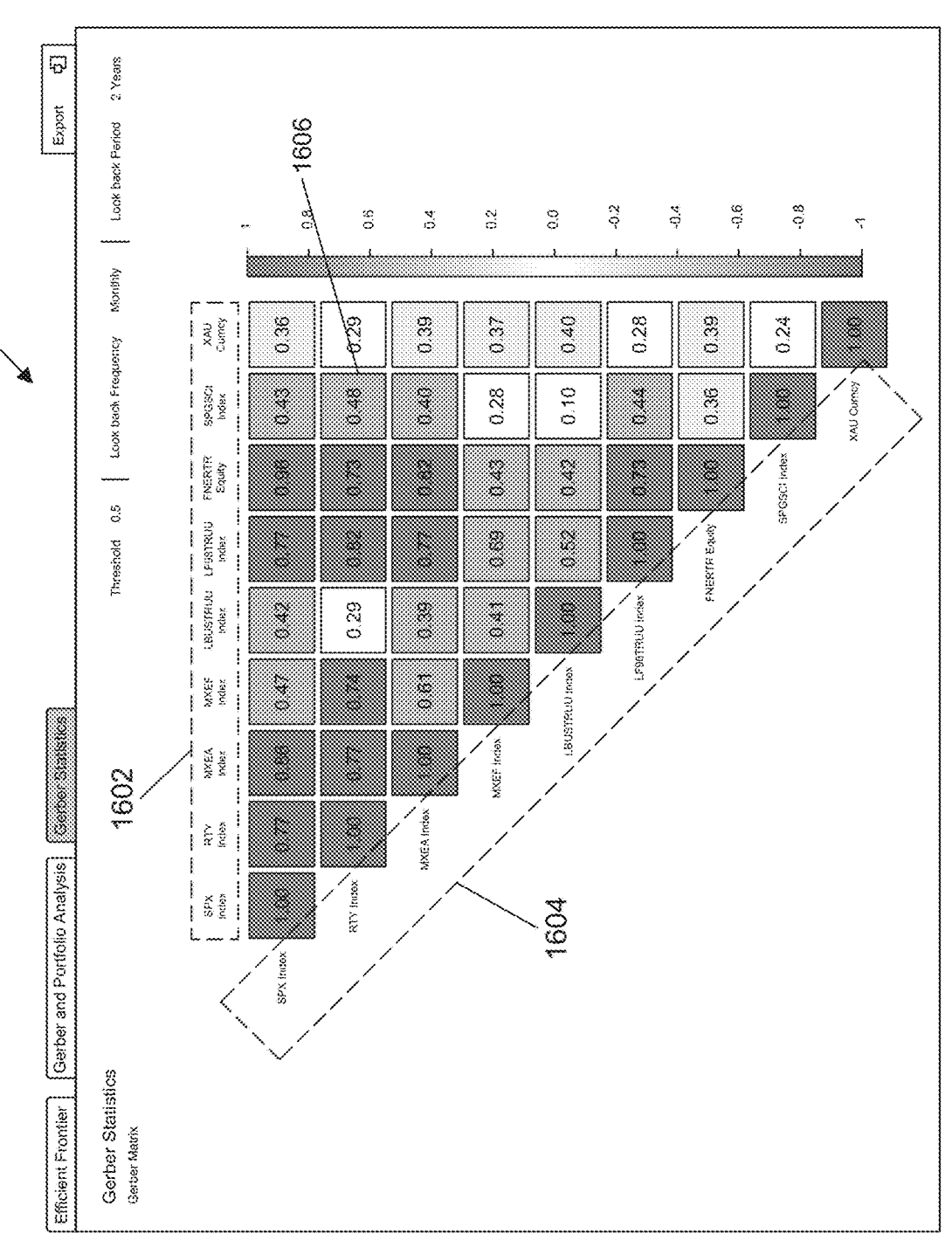

Referring to FIG. 16, the system may also provide the user with graphical interface 1600 to aid the user to visualize and analyze the various portfolio metrics. In one example, the system presents the graphical interface 1600 with a Gerber Statistic 1606 of at least one bi-asset portfolios (chosen from the assets in the asset list 1602 and the asset list 1604), as described above in the present disclosure. In some embodiments, the graphical interface 1600 may calculate various portfolio parameters (e.g., the Gerber Statistic) for portfolios including more than two assets. A user's selection of the Gerber Statistic 1606 may cause the system to display the various data associated with the selected Gerber Statistic 1606, such as, for example, a graphical interface 1700 of FIG. 17.

Figure 17:
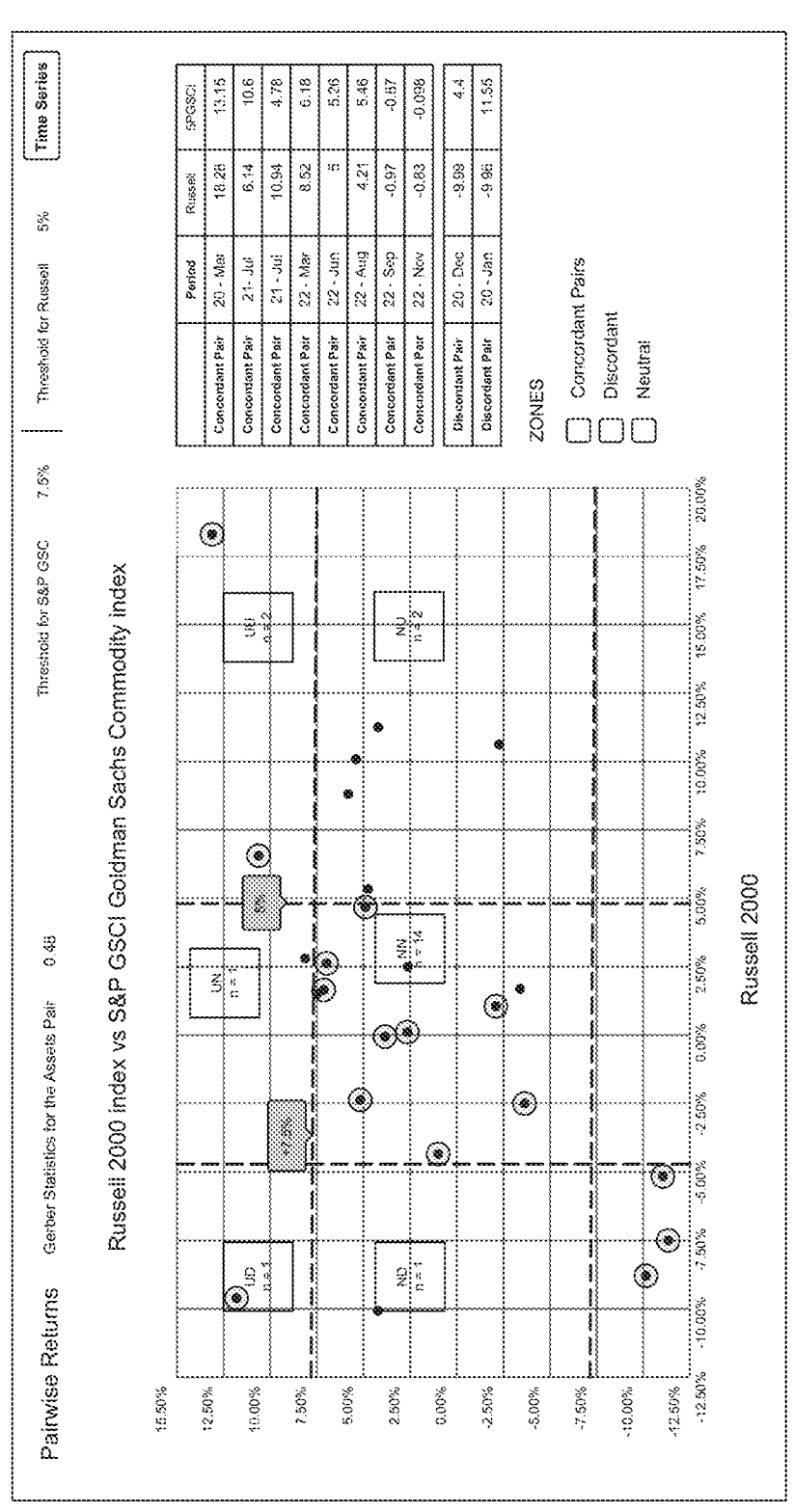

Referring to FIG. 17, the graphical interface 1700 shows a scatter plot where different assets/variables are represented by different graphical indicators (e.g., data points) separated into different quadrants. The graphical interface 1700 includes four quadrants separated by various predetermined and/or revisable thresholds. For brevity and clarity, the graphical interface depicts co-movement of the selected bi-asset pair. However, in other embodiments, a user may customize one or more assets, such that more assets are shown. In some embodiments, the description of graphical interface 1700 may be substantially similar to the description of FIG. 5B and/or FIG. 9.

The graphical interfaces described in FIGS. 11-17 may be displayed on, and interacted with, an electronic device containing one or more processors.

Multi-Model Machine Learning Architecture for a Robo-Advisor

A relationship computer model can be configured to determine Gerber Statistics as described herein. To do so, the relationship computer model may be configured with parameters, such as a time period for a plurality of variables, an alert threshold parameter for the plurality of variables, a lower relationship threshold parameter, and/or an upper relationship threshold parameter. A computing device can execute the relationship computer model configured by such parameters to cause the relationship computer model to generate relationships for pairs of variables determined based on a count of negative unions of the pair of variables and/or a count of positive unions of the pair of variables.

A technical problem that arises with implementing the relationship computer model can be that the accuracy or capabilities of the relationship computer model can depend on the current state and a moving time window of data regarding variable indices. Accordingly, the configuration parameters for the relationship computer model to accurately generate relationship values between pairs of variables may change over time as the values of the different variables change, in many cases at a rapid pace from one moment to the next. These rapid changes in values of the variables cause technical problems with the relationship computer model, because the relationship computer model may have a static configuration with pre-defined parameters that are manually programmed into the relationship computing model. To change the parameters of the relationship computer model, a user may access a computing device and manually change the parameters by changing the programming of the computer model. However, while the user may perform these functions in some instances, the rapid fluctuation in values between variables can correspond to rapid changes in the correct parameters to use to configure the relationship computer model for relationship generation. Manually programming or reprogramming the relationship computing model to change or adjust the relationship computing model's configuration or parameters for each instance of execution is time-consuming and impractical for real-time analysis. In some cases, by the time the user determines the correct parameters for the relationship computer model and configures the relationship computer model accordingly, the values of the variables may have changed and correspond to different correct parameters for relationship generation.

Additionally, determining appropriate threshold parameters and time windows for relationship detection requires complex calculations and domain expertise, making it infeasible to adjust these parameters on the fly as data characteristics evolve. This leads to reduced model accuracy and missed opportunities to identify important relationships that emerge over time. Furthermore, real-time configuration becomes exponentially more complex when dealing with multiple variables, as the number of potential relationships and parameter combinations grows significantly, making real-time manual or static configuration approaches computationally inefficient and prone to errors.

A computing device implementing the systems and methods described herein can overcome these technical deficiencies by autonomously adjusting the configuration parameters of the relationship computer model with parameters generated by a parameter generation machine learning model. For example, the computing device can identify variables of interest, as well as historical data records that correspond to the identified variables of interest. The historical data records can include a timeseries of values of the variables of interest. The computing device can execute the parameter generation machine learning model using the historical data as input to automatically determine or output optimal parameters for configuring the relationship computer model for relationship generation for the identified variables of interest. The parameters can include a time period for analysis, positive and/or negative alert thresholds, and/or upper and/or lower relationship thresholds for each variable. The computing device can automatically configure the relationship computing model with the output parameters. The computing device can execute the relationship computing model to analyze pairs of the variables within the time window output by the parameter generation machine learning model. In doing so, the relationship computing model can determine relationships between the respective pairs of variables by analyzing positive and negative unions between the pairs, where unions are identified based on whether values exceed or fall below the thresholds output by the parameter generation machine learning model. The relationship computing model can determine the strength or values of the relationships based on the counts of these unions, and the system automatically alerts users when relationship values exceed the alert thresholds. The computing device can repeat this process over time, either automatically (e.g., at set time intervals) or responsive to requests. By operating in this manner, the computing device can determine relationships for variables by autonomously configuring the relationship computing model based on outputs from the parameter generation machine learning model, eliminating the need for manual parameter tuning and enabling the computing device to dynamically configure the relationship computing model as the values of variables quickly change over time.

Autonomously configuring the relationship computing model can provide the computing device with several technical benefits. For example, doing so can automate the process of parameter selection by using a machine learning model, reducing the need for manual configuration or programming and domain expertise. In another example, the computing device can efficiently process large datasets with multiple variables faster, with less latency, and using fewer processing resources than conventional systems by focusing analysis on specific time windows and using learned thresholds to identify meaningful relationships. Thus, the method can enable more accurate, efficient, and automated identification of important relationships between variables in complex datasets using a multi-computing model architecture.

In some cases, a computing system may use a machine learning language processing model (e.g., a large language model, a small language model, a transformer, etc.) to generate relationship values between pairs of variables in a variable index. In doing so the machine learning language processing model may receive as an input prompt variable indices and corresponding historical values of the variable indices with instructions to generate a recommendation for a set of variables for the user. The computing device can execute the machine learning language processing model based on the input to cause the machine learning language model to apply learned weights and/or parameters to the variable indices. Based on the execution, the machine learning language processing model may generate a predicted set of variables for the user. However, such predictions are prone to hallucinations in many cases because the input can include a large number of identifications of variables and/or other data regarding the variables. Machine learning language processing models are prone to generate hallucinations (e.g., make up data or generate incorrect results) the more data that is input into the machine learning language processing model. Machine learning language processing models are also prone to hallucinations when generating a response involves performing arithmetic because they do not perform mathematical operations, but they instead predict text sequences. Thus, the machine learning language processing model may not be able to accurately identify or generate a set of variables from the input variable indices as the input becomes larger and/or involves performing mathematical operations, such as determining and/or using Gerber Statistics. In some cases, the machine learning language processing model may even or including variables in a generated set that do not exist or that were not included as options from the input in the response.

A computing device implementing the systems and methods described herein can overcome these technical deficiencies of using a machine learning language processing model for large data processing by executing a sequence of models to generate the set of variables instead of directly applying learned weights and parameters to the variable indices. For example, the computing device can receive a natural language query or a text request for a recommendation for a combination of variables (e.g., a recommended set of variables) that causes a variable index to have one or more index characteristics, such as that satisfy criteria for a relationship value (e.g., an average relationship value) to include in or otherwise characterize a variable index. The natural language query or text request may have been input into to a chat interface of a user interface. In response to the natural language query or text request, the computing device can input the text request into a machine learning language processing model and execute the machine learning language processing model. The execution can cause the machine learning language processing model to autonomously execute a relationship computer model, as described herein, to generate relationship values for different pairs of the variables. The machine learning language processing model can use the output relationship values from the relationship computer model to iteratively determine and adjust a set of variables until the machine learning language processing model determines or identifies a set of variables that satisfies the criteria (e.g., based on the relationship values of the set of variables) identified in the text request. The machine learning language processing model can generate a data structure from the identified set of variables that satisfies the criteria. The machine learning language processing model can generate a visual representation of the data structure (e.g., a visual representation in the form requested in the text request, such as in a list, graph, scatter plot, diagram, paragraph, etc.). The computing device can generate the visual representation for display on the user interface through which the user input the natural language query or text request. In this way, the computing device can iteratively execute the machine learning language processing model to operate as a task agent to generate responses to requests. The machine learning language processing models can use other computing models or applications to do so to reduce hallucinations in the generated responses that may otherwise arise given the large amount of data involved in the processing and/or the that arithmetic operations may be required to generate the response.

For example, the computing device can identify variables of interest, as well as historical data records that correspond to the identified variables of interest. The historical data records can include a timeseries of values of the variables of interest. The computing device can execute the parameter generation machine learning model using the historical data as input to automatically determine or output optimal parameters for configuring the relationship computer model for relationship generation for the identified variables of interest. The parameters can include a time period for analysis, positive and/or negative alert thresholds, and/or upper and/or lower relationship thresholds for each variable. The computing device can automatically configure the relationship computing model with the output parameters. The computing device can execute the relationship computing model to analyze pairs of the variables within the time window output by the parameter generation machine learning model. In doing so, the relationship computing model can determine relationships between the respective pairs of variables by analyzing positive and negative unions between the pairs, where unions are identified based on whether values exceed or fall below the thresholds output by the parameter generation machine learning model. The relationship computing model can determine the strength or values of the relationships based on the counts of these unions, and the system automatically alerts users when relationship values exceed the alert thresholds. The computing device can repeat this process over time, either automatically (e.g., at set time intervals) or responsive to requests. By operating in this manner, the computing device can determine relationships for variables by autonomously configuring the relationship computing model based on outputs from the parameter generation machine learning model, eliminating the need for manual parameter tuning and enabling the computing device to dynamically configure the relationship computing model as the values of variables quickly change over time.

In an example, the computing device can use a machine learning language processing model to respond to a request for variables to include in a particular variable index. The computing device can execute the machine learning language processing model with the request as input and the machine learning language processing model can identify an application to retrieve data records for variables and the relationship computer model. The machine learning language processing model can execute the two models in sequence to generate relationship values for pairs of variables and use the relationship values to identify a set of variables to recommend including in the variable index by ensuring the relationship values satisfy one or more criteria included in the request or that the machine learning language processing model otherwise determines based on characteristics of the user making the request. The machine learning language processing model can generate a recommendation including the set of variables in the variable index for display on the user interface through which the user submitted the request.

Figure 18:
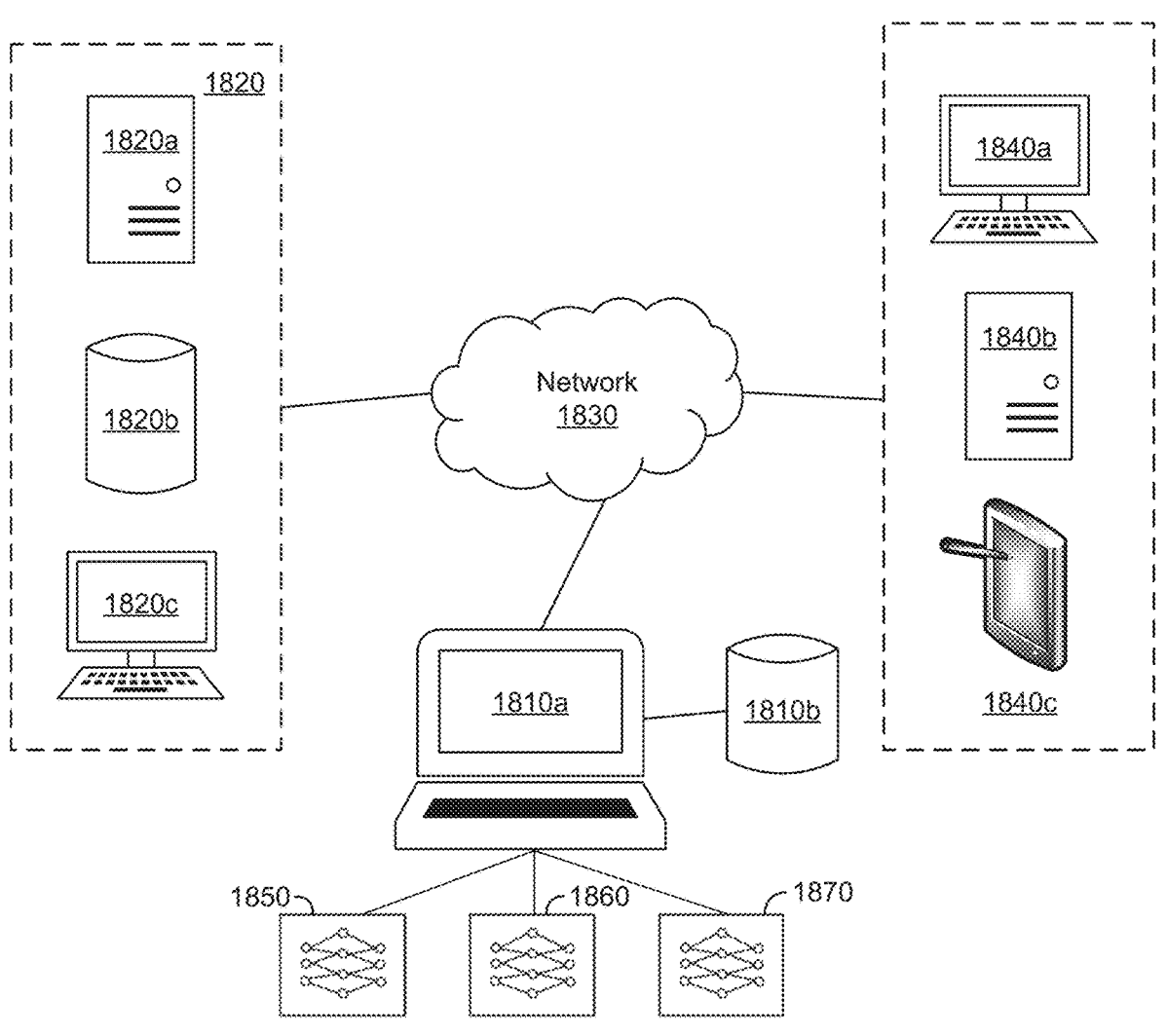
FIG. 18 depicts a multi-model system architecture for generating a variable index based on relationships between variables, according to an embodiment.

FIG. 18 depicts an example environment that includes example components of a system that includes the computing devices of the institutions and the computing system. Various other system architectures may include more or fewer features and/or may utilize the techniques described herein to achieve the results and outputs described herein. Therefore, the system depicted in FIG. 18 is a non-limiting example.

FIG. 18 depicts a multi-model system architecture of a system 1800 for generating a variable index based on relationships between variables, according to an embodiment. FIG. 18 includes a non-limiting example of components of the system 1800 in which a server 1810*a* operates. In some examples, other servers such as third-party servers or other system servers may work with the server 1810*a* to process requests. The server 1810*a* may utilize features described in FIG. 1 to retrieve data and generate/display results, such as via a platform displayed on various devices. The server 1810*a* may be communicatively coupled to a system database 1810*b*, electronic data sources 1820*a-d* (collectively electronic data sources 120), and user devices 1840*a-c* (collectively user devices 1840). The server 1810*a* can receive requests (e.g., variable index requests) from the user devices 140. The requests can be requests for relationships between different variables, requests for recommendations for changes to a variable index, requests for recommendations of variables to monitor, etc. The server 1810*a* can execute computer models 1850, 1860, and/or 1870 to automatically generate responses to the requests. The system 1800 is not confined to the components described herein and may include additional or other components not shown for brevity, which are to be considered within the scope of the embodiments described herein.

The above-mentioned components may be connected to each other through a network 1830. Examples of the network 1830 may include, but are not limited to, private or public LAN, WLAN, MAN, WAN, and the Internet. The network 1830 may include both wired and wireless communications according to one or more standards and/or via one or more transport mediums.

Communication over the network 1830 may be performed in accordance with various communication protocols such as Transmission Control Protocol and Internet Protocol (TCP/IP), User Datagram Protocol (UDP), and IEEE communication protocols. In one example, the network 1830 may include wireless communications according to Bluetooth specification sets or another standard or proprietary wireless communication protocol. In another example, the network 1830 may also include communications over a cellular network, including, e.g., a GSM (Global System for Mobile Communications), CDMA (Code Division Multiple Access), and/or EDGE (Enhanced Data for Global Evolution) network.

The server 1810*a* may generate and display an electronic platform (e.g., a variable index management platform that is sometimes referred to as a platform herein) on any device discussed herein. The platform may be configured to receive requests for relationships between variables and/or recommendations for changes to variable indices of different users, and/or any other type of request and automatically generate responses to such requests. For instance, the electronic platform may include one or more graphical user interfaces (GUIs) displayed on the user device 1840. An example of the platform generated and hosted by the server 1810*a* may be a web-based application or a website configured to be displayed on various electronic devices, such as mobile devices, tablets, personal computers, and the like. The platform may include various input elements configured to receive requests from any of the users and display results in response to such requests during execution of the methods discussed herein. The server 1810*a* may iteratively execute the computer models 1850, 1860, and/or 1870 to process and generate responses to the requests.

The system database 1810*b* can be a relational or graphical database that is configured to store data for different profiles of the platform. For example, the system database 1810*b* can include data structures for individual profiles that include identifications of variables of variable indices for the respective profiles. The data structures for the profiles may additionally include historical data regarding changes in variables of the variable indices and/or demographic data (e.g., age, gender, time started investing, etc.) regarding the users associated with the profiles. The profiles may include identifiers or identifications that are unique to each profile such that the system database 1810*b* can be queried for identifications of the variables of the variable indices of the respective profiles.

The electronic data sources 1820 can be or include databases and/or other data storage devices or media configured for storing data records for different variables. The electronic data sources 1820 can be hosted on third party or external systems configured for generating and/or storing data records for variables over time. The data records can include performance data for the variables for different time windows. For example, a data record can include a starting value of a variable at the beginning of a time window, an ending value at the end of the time window, and/or a total change in value for the time window. The data records can include timestamps indicating times and/or dates of the time windows. The electronic data sources 1820 can store such data records for any number of variables. In some cases, different electronic data sources 1820 can store such data records for different sets or subsets of variables.

The server 1810*a* may be any computing device comprising a processor and non-transitory, machine-readable storage medium capable of executing the various tasks and processes described herein. The server 1810*a* may employ various processors such as a central processing unit (CPU) and graphics processing unit (GPU), among others. Non-limiting examples of such computing devices may include workstation computers, laptop computers, server computers, and the like. While the system 1800 is shown to include a single server 1810*a*, the server 1810*a* may include any number of computing devices operating in a distributed computing environment, such as a cloud environment.

User devices 1840 may be any computing device comprising a processor and a non-transitory, machine-readable storage medium capable of performing the various tasks and processes described herein. User devices may be referred to as client devices or client computing devices herein. Non-limiting examples of a user device 1840 may be a workstation computer, laptop computer, phone, tablet computer, or server computer. During operation, various users may use one or more of the user devices 1840 to access the platform operationally managed by the server 1810*a*. Even though referred to herein as "user" devices, these devices may not always be operated by users. A user device 1840 may be another computing system that automatically transmits requests to the server without any user input.

Through the platform, the server 1810*a* can receive a request regarding a selection of one or more variables and/or a particular variable index (e.g., one or more variables associated with a particular user profile). The server 1810*a* can receive the request from a user interface that is being displayed at a user device 1840. The request can include text, images, audio, speech, etc. In some cases, the server 1810*a* can receive the request from a chat component displayed on the user interface. The server 1810*a* can receive the request and, depending on the request, execute one or more of the models 1850, 1860, and/or 1870 based on the content of the request to generate a response to the request. The server 1810*a* can display the response to the request on the user interface of the requesting user device 1840.

The model 1850 can be a parameter machine learning model (e.g., a support vector machine, a random forest, a neural network, etc.) that has been configured or trained to generate or output parameters for configuring the model 1860 (e.g., operating parameters for the model 1860). In some cases, the model 1850 can be or include a large language model or another type of machine learning language processing model. The model 1850 may be trained or configured to generate or output such parameters based on data records that contain or include historical data (e.g., historical performance data) associated with different variables. The model 1850 can be configured to generate parameters such as, for example, a time period for a plurality of variables for which the model 1860 retrieves historical data, an alert threshold parameter indicating a threshold to use to identify variables to monitor from the plurality of variables, an upper relationship threshold parameter for each individual variable of the plurality of variables and/or for all of the plurality of variables, and/or a lower relationship threshold parameter for each individual variable of the plurality of variables and/or for all of the plurality of variables. In some cases, the model 1850 can generate upper and/or lower relationship threshold parameters that the model 1860 can apply to each of the plurality of variables. The model 1850 can be trained to generate or output such parameters using learned weights and/or parameters of the model 1850.

The model 1860 can be or include a relationship computer model that is configured to generate (e.g., automatically generate) relationships for individual pairs of variables based on historical data records of the variables. The model 1860 can be configured to generate or output relationships between individual pairs of variables using the systems and methods described herein. For example, the model 1860 can be a Gerber Statistic model that is configured to analyze data points of historical data records for two variables of a pair of variables to determine positive and/or negative unions between the two variables for corresponding data records (e.g., data records of data for the same time period). The model 1860 can identify a positive union when two corresponding data records indicate a positive change in value for a time period of the data records by an amount above a threshold (e.g., an upper threshold parameter) and/or by amounts above the thresholds for the respective two variables. The model 1860 can similarly identify a negative union when one data record indicates a positive change in value for a time period by an amount that exceeds a threshold and another data record for the same time period indicates a negative change in value for the time period by an amount this below another threshold (e.g., a lower threshold parameter). The model 1860 can retrieve data records for variables for a defined time period and determine such unions for any number of data records within the time period. The model 1860 can maintain and increment a positive counter for each positive union for a pair of variables and a negative counter for each negative union for the pair of variables for any number of pairs of variables.

The model 1860 can determine relationship values for individual pairs of variables. A relationship value can indicate or represent positive or negative co-movement (e.g., a Gerber relationship) between the two variables of a pair of variables. The relationship can be a Gerber Statistic for the two variables, as described herein. The model 1860 can determine the relationship values based on the counts of the counters of positive and/or negative unions that the model 1860 determines for the individual pairs of variables. For example, for a pair of variables, the model 1860 can determine the relationship values as a function of a count of positive unions for the pair of variables and a count of negative unions for the pair of variables, as described herein. A positive relationship value can indicate positive co-movement between the two variables and a negative relationship value can indicate negative co-movement between the two variables.

The model 1860 can be configured to identify pairs of variables that satisfy a criterion. For example, the model 1860 can be configured to identify pairs of variables with relationship values that exceed an alert threshold parameter (e.g., a positive threshold and/or a positive alert threshold) and/or a relationship value that is less than an alert threshold parameter (e.g., a negative threshold or a negative alert threshold). The model 1860 can be configured with the alert threshold parameter and compare determined relationship values for individual pairs of variables with the alert threshold parameter. Based on the comparison, the model 1860 can identify pairs of variables with relationship values that exceed the alert threshold parameter (e.g., exceed the positive alert threshold parameter) and/or that are less than the alert threshold parameter (e.g., are less than the negative alert threshold parameter).

The model 1870 can be a machine learning model (e.g., a support vector machine, a random forest, a neural network, etc.) that has been configured or trained to generate or output text responses to requests (e.g., requests in text, images, audio, speech, etc.) that the model 1870 receives as input. In some cases, the model 1870 can be or include a large language model (e.g., a neural network or a transformer) or another type of machine learning language processing model. The model 1870 may be or include an agent that is configured to execute other models and/or applications (e.g., the models 1860 and/or 1850 or any other computer models and/or applications of the server 1810a). In one example, the model 1870 can be or include a ReactAgent that is configured to automatically determine different applications, agents, and/or models to use or execute to generate responses to different requests. The model 1870 can be configured to receive the input request from the user interface of the user device 1840, and the server 1810a can execute the model 1870 based on the request. Based on the execution, the model 1870 can determine which models to use to generate a response (e.g., by executing a large language model of the model 1870), execute the respective models, and/or generate an output response (e.g., an output text response) to the request. The model 1870 can enable the server 1810a to interact with different users to automatically generate recommendations and/or alerts for the users in response to requests from the users.

In one example, the server 1810a can receive a request that includes text asking for a recommendation for variables to monitor (e.g., based on the variables having a high co-movement relationship with at least one other variable). The request can include a selection of a plurality (e.g., multiple) of variables that the user typed into the user interface using a keyboard and/or selected from the user interface using a selection device, such as a mouse, touch-screen, or touch pad. The server 1810a can execute the model 1870 using the request as input. Based on the execution, the model 1870 can determine to use the model 1850 and 1860 to generate a response. The model 1870 can input identifications of the selection of variables into the model 1850 (e.g., the parameter machine learning model) and execute the model 1850. The model 1870 can do so, for example, by generating a feature vector including the identifications of the selection of variables in different index values of the feature vector and inputting the feature vector into the model 1850. Based on the execution, the model 1850 can output at least a time period for the plurality of variables, an alert threshold parameter for the plurality of variables, a lower relationship threshold parameter for each of the plurality of variables, and an upper relationship threshold parameter for each of the plurality of variables for the model 1860.

In some cases, instead of or in addition to inputting the identifications of the selection of variables into the model 1850, the model 1870 can retrieve data records for the selection of variables. The data records can contain or include historical data associated with the selection of variables. For example, the historical data can include performance data (e.g., changes in value or performance) of the selection of variable for individual time windows (e.g., days, weeks, months, etc.). The model 1870 can retrieve all of the data records that are available for each of the selection of variables and/or retrieve all of the data records that include or correspond to timestamps within a defined time period (e.g., a defined time period in relation to the current time). The model 1870 can retrieve such data records from a local database (e.g., the database 1810b) and/or from one of the electronic data sources 1820, such as by transmitting a query containing identifications of the selection of variables to one or more of the electronic data sources 1820. In some cases, the model 1870 can be configured to scrape the Internet to retrieve the data records from different web pages. The model 1870 can retrieve the data records and input the data records and/or data from the data records into the model 1850 to cause the model 1850 to output or generate the one or more parameters for configuring the model 1860. The model 1870 can do so, for example, by generating a feature vector including the identifications of the selection of variables and the values of the respective data records (e.g., configured in a timeseries) in different index values of the feature vector and inputting the feature vector into the model 1850.

Responsive to the output or responsive to executing the model 1850 to generate the output, the server 1810a can configure the model 1860 (e.g., the relationship computer model) using the output one or more parameters. In some cases, the server 1810a can configure the model 1860 using the model 1870. For example, the server 1810a can execute the model 1870 to cause the model 1870 to configure the model 1860 with the parameters output by the model 1850. The model 1870 can do so by replacing placeholder parameters or previously configured parameters of the same type of the model 1860 with the parameters that are output by the model 1850. In doing so, the model 1870 can configure the model 1860 specifically to generate relationships or relationship values for the selection of variables that were input into the user interface of the user device 1840 by the user.

The server 1810a can execute the model 1860. In some cases, the server 1810a can execute the model 1860 using the model 1870. For example, the server 1810a can execute the model 1870 to cause the model 1870 to execute the model 1860 configured with the parameters output by the model 1850. By executing the model 1860, the model 1870 can cause the model 1860 to generate a relationship (e.g., a relationship value) for each of one or more pairs of the plurality of variables that the user selected or input into the user interface of the user device 1840. The model 1860 can generate such relationships for each combination of pairs of the plurality of variables when generating the relationships. The model 1860 can generate the relationships using the systems and methods described herein.

For example, responsive to the execution of the model 1860, the model 1860 can select a set of data records from data records that the model 1870 retrieved for the selection of variables. The model 1860 can select the set of data records based on the time period with which the model 1870 configured the model 1860 and/or the timestamps of the individual data records. The timestamps can each indicate a time, day, or time period to which the data record corresponds (e.g., the timestamp may indicate Monday, Jun. 15, 2024). The model 1860 can identify the timestamps of the individual data records and compare the identified timestamps with the time period parameter with which the model 1860 is configured. The model 1860 can discard (e.g., remove from memory) the data records with timestamps outside of the time period and/or identify or select data records with timestamps within the time period to use to determine relationships for pairs of variables.

Responsive to selecting the data records having timestamps within the time period, the model 1860 can determine relationships for different pairs of the variables. The model 1860 can determine the relationship for the different pairs of variables using the selected data records for the selection of variables. For example, for each pair of variables (e.g., each possible combination of two variables of the variables) the model 1860 can determine whether a first data record of a first variable of the pair of variables and a second data record of second variable of the same pair of variables has a positive union or a negative union. The model 1860 can do so using the upper and/or lower threshold parameters for the first and second variables with which the model 1860 was configured. The model 1860 can compare a performance value (e.g., a respective value) of the first data record with the upper threshold parameter and/or the lower threshold parameter for the first variable. The model 1860 can also compare a performance value (e.g., a respective value) of the second data record with the upper threshold parameter and/or the lower threshold parameter for the second variable. Based on the comparisons, the model 1860 can determine a positive union for the data records of the pair of variables if the performance value of each data record exceeds the positive threshold parameter to which the performance value was compared. The model 1860 can determine a negative union for the data records of the pair of variables if one performance value exceeds the positive threshold parameter to which the performance value was compared and the other performance value is less than the negative threshold parameter to which the performance value was compared. If at least one of the performance values does not exceed the positive threshold parameter and is not less than the negative performance value threshold, the model 1860 may not determine any union for the two data records. The model 1860 can determine unions for data records of the pair of variables that correspond to the same timestamp or time window (e.g., same day, same week, same month, etc.). The model 1860 can do so for any number of data records for the pair of variables. The model 1860 can maintain and increment a counter for each positive union and/or a counter for each negative union for the pair of variables. The model 1860 can similarly determine and/or maintain counts for each pair of variables of the selection of variables.

The model 1860 can determine relationship values (e.g., Gerber Statistics) for the pairs of variables for the time period output by the model 1850. The relationship values can indicate co-movement between the variables of the pairs of variables. The model 1860 can determine the relationship values based on the counts of the positive unions and the negative unions for each pair of variables. The model 1860 can determine the relationship values as a function of the two counts for each pair of variables, such as by using the systems and methods described herein. The relationship values can each range from −1 to 1 (or any other range), where a negative number may indicate a negative co-movement relationship and a positive number may indicate a positive co-movement relationship.

The model 1860 can identify a set of pairs of variables that correspond to a relationship value exceeding the alert threshold parameter. The model 1860 can identify the set of pairs of variables by comparing the relationship values of the pairs of variables with the alert threshold parameter with which the model 1860 is configured. The model 1860 can identify any pairs of variables with a relationship value exceeding the alert threshold parameter or with a magnitude exceeding the alert threshold parameter. The model 1860 can include any identified pair of variables in the set of pairs of variables.

The server 1810*a* can generate an alert responsive to the model 1860 identifying the set of pairs of variables with relationship values exceeding the alert threshold parameter. The server 1810*a* can generate the alert using the model 1870. For example, the model 1860 can pass identifications (e.g., identifiers of the individual variables of the set of pairs of variables) of the set of pairs of variables to the model 1870. The server 1810*a* can execute the model 1870 to cause the model 1870 to output (e.g., by executing the machine learning language processing model of the model 1870) text including the identifications of the pairs of variables of the set. In some cases, the server 1810*a* can display the identifications of the set of pairs of variables without passing the identifications to the model 1870. The server 1810*a* can cause presentation of the set of variables in an alert or otherwise on the user interface of the user device 1840 through which the user initially requested for a recommendation for variables to monitor.

In another example, the server 1810*a* can receive a request (e.g., a text request) for a recommendation for a combination of variables for a variable index. The server 1810*a* can receive the request from a user interface that is being displayed at a user device 1840. The request can include text, images, audio, speech, etc. In some cases, the server 1810*a* can receive the request from a chat component displayed on the user interface. The server 1810*a* can receive the request via an application programming interface (API) executing on the server 1810*a*. The request can include a text string that includes an identification of a profile stored in the database 1810*b* that corresponds to or with a variable index (e.g., one or more variables associated with the profile and allocations for the one or more variables). The server 1810*a* can execute the model 1870 using the request as input. Based on the execution, the model 1870 can determine (e.g., by executing the language learning model of the model 1870) to use the model 1860 to generate a response. The model 1870 can retrieve identifications of variables of the variable index for the profile from the database 1810*b*.

The model 1870 can retrieve data records for the variables of the variable index for the profile as well as one or more other variables not in the variable index. The data records can contain or include historical data associated with the variables. The model 1870 can retrieve all of the data records that are available for each of the variables and/or retrieve all of the data records that include or correspond to timestamps within a defined time period (e.g., a defined time period in relation to the current time). The model 1870 can retrieve such data records from a local database (e.g., the database 1810*b*) and/or from one of the electronic data sources 1820, such as by transmitting a query containing the identifications of the variables to one or more of the electronic data sources 1820.

The model 1870 can input the data records and/or data from the data records into the model 1860 and execute the model 1860. The execution can cause the model 1860 to output or generate a relationship (e.g., a relationship value) for each of one or more pairs of the variables, as described herein. For example, the model 1870 can execute the model 1860 to determine relationships for the one or more pairs of variables based on or as a function of counts of positive and/or negative unions of data records between the respective pairs of variables. The model 1860 can generate such relationships for each combination of pairs of the plurality of variables when generating the relationships.

The model 1870 can determine a set of variables to recommend that causes the variable index to have one or more index characteristics. The one or more index characteristics can be characteristics for the variable index and can be or include an index risk threshold or range, types of variables (e.g., stocks, index funds, mutual funds, bonds, etc.) to include and/or exclude from the variable index, a ratio of types of variables to include in the variable index, characteristics of variables (e.g., variables related to green energy, guns, etc.) to include and/or exclude from the variable index, etc.

The model 1870 can determine the set of variables using an iterative process. For example, the model 1870 can identify a potential set of variables and the relationships (e.g., the relationship values) for pairs of the potential set of variables and/or the variables of the variable index. The potential set of variables can include (e.g., only include) one or more variables that are not currently in the variable index. The model 1870 can identify the potential set of variables by randomly or pseudo-randomly selecting the variables of the potential set of variables or using any other selection method. The model 1870 can add the potential set of variables to the variable index to generate a potential variable index, such as by including each of the potential set of variables in the variable index, replacing one or more variables of the variable index with one or more variables of the potential set of variables, or by using each variable of the potential set of variables to replace a different variable of the variable index. The model 1870 can determine whether the potential variable index with the added potential set of variables satisfies the one or more index characteristics to determine whether the potential set of variables causes the variable index to have the one or more index characteristics.

Responsive to determining the potential set of variables does not cause the variable index to have the one or more index characteristics, the model 1870 can adjust the variables that are included in the potential set of variables. The model 1870 can do so by adding one or more variables to the potential set of variables and/or removing one or more variables from the potential set of variables, and therefore making the same changes to the potential variable index. The model 1870 can make such adjustments randomly or pseudo-randomly or responsive to determining the adjustments cause the variable index to have at least one of the one or more index characteristics (e.g., satisfy a type ratio, have an average or median relationship value exceeding an index risk threshold or within an index risk range, or any other restrictions of the one or more index characteristics). The model 1870 can again determine whether the adjusted potential set of variables causes the variable index to have the one or more index characteristics. The model 1870 can repeat this process any number of times until determining a potential set of variables that causes the variable index to have the one or more index characteristics.

Responsive to the model 1870 determining the potential set of variables that causes the variable index to have the one or more index characteristics, the server 1810*a* can cause presentation of the potential set of variables on the user interface of the user device 1840 that transmitted the initial request to the server 1810*a*. The server 1810*a* can do so using the model 1870. For example, the server 1810*a* can execute the model 1870 using identifications of the set of variables to cause the model 1870 to output (e.g., by executing the machine learning language processing model of the model 1870) text including the identifications of the set of variables of the set. In some cases, the server 1810*a* can display the identifications of the set of variables without passing the identifications to the model 1870. The server 1810*a* can cause presentation of the set of variables on the user interface of the user device 1840 through which the user initially requested a recommendation for a combination of variables to include in the variable index.

Automatic Variable Monitoring Alert Generator

FIG. 19 depicts a method 1900 for generating a variable index based on relationships between variables, according to an embodiment. The method 1900 includes steps 1902-1918. However, other embodiments may include additional or alternative execution steps, or may omit one or more steps altogether. The method 1900 is described as being executed by a server, similar to the server described in FIG. 1 and/or FIG. 18. However, one or more steps of method 1900 may also be executed by any number of computing devices operating in the distributed computing system described in FIG. 1 and/or FIG. 18. For instance, one or more computing devices (e.g., user devices) may locally perform part or all of the steps described in FIG. 19. Moreover, one or more of the steps of the method 1900 can be performed via any processor of the system, such as any processor the system 100 and/or the system 1800.

Various actions here are described in terms of being executed by the server and/or different machine learning models and/or agents. However, these actions can be executed by any of the features discussed herein and/or depicted within FIG. 1 and/or FIG. 18. For instance, in one embodiment an action can be performed by a machine learning language processing model. However, additionally or alternatively, the same action can be performed (in other embodiments) by the server.

Using the methods and systems described herein, such as the method 1900, the server may use a machine learning architecture to automatically configure a relationship computer model to generate relationships for pairs of variables to generate an alert for monitoring one or more pairs of variables. The server can do so using a chain of machine learning models. For instance, the server can execute a machine learning language processing model to process a request for variables to monitor from a selection of variables. Based on the execution, the machine learning language processing model can identify a machine learning model that is trained or configured to generate parameters for a relationship computer model and identify the relationship computer model itself. The machine learning language processing model can retrieve data records for the selection of variables and input the data records into the machine learning model. The machine learning language processing model can execute the machine learning model based on the input to cause the machine learning model to output parameters for the relationship computer model. The machine learning language processing model can configure the relationship computer model with the output parameters. The machine learning language processing model can execute the configured relationship computer model to cause the relationship computer model to output relationship values for pairs of the selection of variables as well as identify a set of pairs of the selection of variables to monitor based on the relationship values. The machine learning language processing model can generate an alert with identifications of the pairs of variables of the set of variables. The server can cause presentation of the alert on a user interface of a user device.

At step 1902, the server can receive an input indicating a plurality of variables. The server can receive the input in a request for a recommendation for variables to monitor from the plurality of variables. The server can receive the input via a user interface. The user interface may be presented on a client device being accessed by a user. For example, the server can receive the request from a graphical or text input (e.g., chat) or audio input (e.g., microphone) component of the user interface in which a user selected or input identifications of the plurality of variables. The request can be a request for processing data (e.g., performance data) regarding the selection of variables from one or more data sources via at least one machine learning model (e.g., a machine learning language processing model, such as a large language model, of the server). The server can receive the request for a recommendation as text, audio, speech, images, or any combination of such types of content. In some examples, the server can receive the request via an application programming interface (API) rather than through a user interface. In some examples, the API may be called by another application to provide the request. In one example, the request can be for a recommendation of variables that have positive and/or negative co-movement with each other above or below a threshold or defined value. The server can receive the request and input the request into a machine learning language processing model for processing.

The server can execute the machine learning language processing model using the request or the content of the request as input. Based on the execution, the machine learning language processing model can output identifications of different applications and/or other machine learning models to use to generate a response to the request. For instance, the machine learning language processing model can output an identification of an application or machine learning model that is configured to query local and/or remote databases, an identification of a machine learning model that is configured to generate parameters (e.g., configuration parameters) for a relationship computer model as well as an identification of the relationship computer model itself. The machine learning language processing model can use the identified applications and/or other machine learning models to generate a response to the request.

The server can retrieve a plurality of data records regarding the plurality of variables. The plurality of data records can include historical data (e.g., historical performance data) associated with the plurality of variables. The server can retrieve the plurality of data records from one or more data sources, such as from a database stored in memory of the server or a database stored in a computing device remote from the server. The server can retrieve the plurality of data records using the machine learning language processing model. For example, the machine learning language processing model can identify a querying machine learning language processing model (e.g., a querying agent) that is configured or trained to generate and use queries to retrieve data based on input identifications of variables. The machine learning language processing model can input the identifications of the plurality of variables into the querying machine learning language processing model and execute the querying machine learning language processing model. Based on the execution, the querying machine learning language processing model can generate one or more queries (e.g., structured query language (SQL) queries) for data records for the plurality of variables.

The querying machine learning language processing model can query a local database and/or one or more remote databases that store historical data for the plurality of variables using the generated query and/or the execution by the machine learning language processing model. The querying machine learning language processing model can query the databases for all of the data records that are available for the selection of variables and/or for all of the data records that correspond to a defined time period (e.g., a time period input by an administrator when configuring the server to perform the systems and methods described herein). Based on the query, the machine learning language processing model can retrieve a plurality of data records that include historical data associated with the plurality of variables. The querying machine learning language processing model can pass or transmit the retrieved data records to the machine learning language processing model or to the parameter machine learning model for further processing.

At step 1904, the server can execute the parameter machine learning model. The parameter machine learning model can be or include a neural network, a support vector machine, a random forest, etc. The parameter machine learning model can be trained or configured to generate parameters for configuring the relationship computer model based on performance data in data records of one or more variables. The server can execute the parameter machine learning model using the machine learning language processing model. For example, the machine learning language processing model can execute the parameter machine learning model using the data records retrieved by the querying machine learning language processing model as input. Based on the execution, the parameter machine learning model can apply learned or trained weights and/or parameters to the performance data of the data records. The parameter machine learning model can generate or output one or more parameters based on the execution.

The parameters can be parameters for configuring the relationship computer model configured to automatically generate relationships for pairs variables based on performance data in data records for the pairs of variables. For example, the parameter machine learning model can generate or output one or more parameters comprising at least a time period for the plurality of variables, an alert threshold parameter for the plurality of variables, a lower relationship threshold parameter for each of the plurality of variables, and/or an upper relationship threshold parameter for each of the plurality of variables. The parameter machine learning model can generate or output a different lower relationship threshold parameter for each of the variables and a different upper relationship threshold parameter for each of the plurality of variables, in some cases, to account for differences in magnitude and/or volatility of values associated with the variables.

Responsive to the output parameters and/or responsive to the execution of the parameter machine learning model, at step 1906, the server can configure the relationship computer model. The server can configure the relationship computer model according to the parameters output by the parameter machine learning model. The server can configure the relationship computer model using the machine learning language processing model. For example, the machine learning language processing model can retrieve the output parameters from the parameter machine learning model. The machine learning language processing model can identify the relationship computer model as the next computer model to use to generate the response to the request from the identifications that the machine learning language processing model initially generated based on the request. Responsive to identifying the relationship computer model, the machine learning language processing model can identify the current parameters of the relationship computer model and/or the placeholders or locations in memory that correspond to the parameters. The machine learning language processing model can replace the current parameters of the same type or otherwise insert the parameters output from the parameter machine learning model into the corresponding identified locations in memory of the relationship computer model to configure the relationship computer model.

At step 1908, the server can execute the configured relationship computer model. The server can execute the configured relationship computer model using the machine learning language processing model. The execution can cause the relationship computer model to generate a relationship (e.g., a relationship value) for each of one or more pairs of the plurality of variables. For example, at step 1910, the machine learning language processing model can execute the relationship computer model after configuring the relationship computer model. The execution can cause the relationship computer model to select a set of data records from the plurality of data records. The relationship computer model can select the set of data records based on each data record of the set of data records corresponding to (e.g., containing) a timestamp within the time period with which the relationship computer model was configured. For instance, the relationship computer model can identify the timestamps of the plurality of data records and compare the timestamps with the time period. The relationship computer model can identify the data records that correspond with timestamps within the time period based on the comparisons. Accordingly, the relationship computer model can identify a set of data records according to the output time period by the parameter machine learning model.

At step 1912, the relationship computer model can determine positive unions and/or negative unions for one or more pairs of the plurality of variables. The relationship computer model can determine the positive unions and/or the negative unions based on the selected set of data records containing performance data for the plurality of data records within the time period output by the parameter machine learning model. The relationship computer model can determine positive unions and/or negative unions for each possible combination of pairs of the plurality of variables based on the data records for the plurality of variables.

For example, to determine a union for a pair of variables, the relationship computer model can identify a first data record for a first variable of the pair of variables and a second data record for a second variable of the same pair of variables. The relationship computer model can identify the two data records responsive to determining the two data records correspond to the same time window (e.g., the same day, week, or month). The relationship computer model can identify a first performance value (e.g., a change in value) from the first record for the first variable and a second performance value (e.g., a change in value) from the second record for the second variable. The relationship computer model can compare the first performance value with an upper threshold parameter for the first variable and a lower threshold parameter for the first variable and compare the second performance value with an upper threshold parameter for the second variable and a lower threshold parameter for the second variable. The relationship computer model can determine the two data records correspond to a positive union if both performance values exceed the respective upper threshold parameters based on the comparison. The relationship computer model can determine the two data records correspond to a negative union if one performance value exceeds the upper threshold parameter to which the performance value was compared and the other performance value is less than the lower threshold parameter to which the performance value was compared. The relationship computer model can determine there is not a union between the two data records responsive to determining at least one of the two performance values neither exceeds the upper threshold parameter to which the performance value was compared nor is less than the lower threshold parameter to which the performance value was compared. The relationship computer model can determine any number of unions for any number of corresponding data records for the pair of data records from the set of data records. The relationship computer model can determine such unions for one or more (e.g., all) of the possible combinations of variables of the plurality of variables.

The relationship computer model can maintain and increment counters for each pair of variables for the positive and/or negative unions that the relationship computer model determines for the pairs of variables. For example, the relationship computer model can instantiate and/or maintain a positive counter for positive unions for a pair of variables and a negative counter for negative unions for the same pair of variables. The relationship computer model can increment the positive counter for the pair of variables for each positive union that the relationship computer model determines for the pair of variables from the set of data records. The relationship computer model can increment the negative counter for the pair of variables for each negative union that the relationship computer determines for the pair of variables from the set of data records. The relationship computer model can similarly instantiate, maintain, and increment positive and negative counters for each pair of variables for which the relationship computer model determines unions.

At step 1914, the relationship computer model can determine relationship values (e.g., Gerber Statistics) of relationships for the one or more pairs of variables. The relationship computer model can determine a relationship value for each pair of variables based on or as a function of the counts of the counters the relationship computer model generated for the respective pairs of variables. For example, the relationship computer model can determine the relationship values based on the counts using the same methods as described herein to determine Gerber Statistics for the pairs of variables. The relationship computer model can determine such relationship values for each combination of pairs of variables of the plurality of variables.

At step 1916, the relationship computer model can identify a set of pairs of variables. The relationship computer model can identify the set of pairs of variables by identifying the pairs of variables with relationship values that exceed the alert threshold parameter output by the parameter machine learning model and with which the relationship computer model was configured. For example, the relationship computer model can compare the relationship values that the relationship computer model determines for the pairs of variables of the plurality of variables with the alert threshold parameter. Based on the comparison, the relationship computer model can identify each pair of variables with relationship values that exceed the alert threshold parameter. In this way, the relationship computer model can identify a set of pairs of variables to recommend for monitoring as having a high co-movement value with each other.

At step 1918, the server can generate an alert. The server can generate the alert to indicate the set of pairs of variables identified by the relationship computer model as well as the relationship values for the set of pairs of variables. The server can generate the alert using the machine learning language processing model. For example, the machine learning language processing model can retrieve the output set of variables and corresponding relationship values from the relationship computer model and execute to generate a text output indicating the set of variables and corresponding relationship values. The server can cause presentation of the text output at the user device to indicate variables to monitor for having a high co-movement relationship to the user. The user may view the variables and determine whether add the variables to the user's variable index and/or otherwise select an option on the platform to monitor the variables over time. In some cases, the server can automatically monitor the recommended variables based on the recommendation.

In some embodiments, the server can include recommendations for allocations for variables in response to requests for such allocations. The server can generate or determine the allocations using the machine learning language processing model. For example, in the request for an alert indicating variables to monitor from a selection of a plurality of variables, the user can include text (e.g., a text string) requesting for allocations for the plurality of variables. The machine learning language processing model can identify the request for allocations and identify an allocation machine learning model (e.g., a second machine learning language processing model, a neural network, a support vector machine, etc.) configured to generate allocations (e.g., numerical values indicating an amount of emphasis or currency to place on the variables) for variables based on identifications of variables for which the machine learning model is generating or outputting the allocations and/or relationship values for pairs of the plurality of variables. The machine learning language processing model can input the identifications of the variables as well as the relationship values for the pairs of variables generated in response to receiving the request at step 1902 into the allocation machine learning model to cause the allocation machine learning model to output allocations for the plurality of variables. The machine learning language processing model can retrieve the output allocations, assign the allocations to the respective variables (e.g., associate the allocations with the respective variables), and include the allocations in the alert (e.g., in the output text string) indicating that is presented on the user interface of the requesting client device. In some cases, the machine learning language processing model may generate allocations for variables in response to requests specifically for the allocations (e.g., requests that do not involve requests for variables to monitor), such as in response to requests for allocations of a variable index or requests for allocations in combination with recommendations for variables to include in a variable index. In some cases, the machine learning language processing model may automatically adjust the allocations for the variables based on the generated allocations.

In some cases, the machine learning language processing model may filter out variables from being assigned allocations. For example, the machine learning language processing model can identify variables that only have relationship values with other variables of the plurality of variables below an upper threshold (e.g., an upper threshold parameter for the respective variable) and/or above a lower threshold (e.g., a lower threshold parameter for the respective variable). The machine learning language processing model may not input identifications and/or relationships of such variables into the allocation machine learning model for processing when determining the allocations. The machine learning language processing model may perform such filtering techniques or any other type of filtering based on text included in the request for allocations, for example.

The parameter machine learning model can be trained based on historical performance data of different variables. For example, the server can retrieve a training data set comprising a training data set of data records (e.g., a second set of data records) that include historical data (e.g., second historical data) associated with a plurality of variables (e.g., a second plurality of variables). The server can execute the parameter machine learning model using the training data set to cause the parameter machine learning model to output one or more parameters (e.g., second one or more parameters) for the relationship computer model. Responsive to the output, the server can configure the relationship computer model according to the one or more configuration parameters output by the machine learning model based on the training data set. The server can execute the relationship computer model configured according to the one or more configuration parameters using the training data set to generate one or more relationships (e.g., second one or more relationships) within each of one or more pairs (e.g., second one or more pairs) of the plurality of variables (e.g., second plurality of variables). The server can execute an allocation machine learning model using identifications of the plurality of variables and the relationships as input to assign allocations (e.g., values) to the plurality of variables. After a period of time (e.g., a predetermined period of time, as may configured by an administrator), the server can retrieve performance data for the plurality of variables from a database stored on a remote computing device. The server can retrieve such performance data in data records from the same data sources that the server uses to retrieve data records to generate relationships between variables.

The server can determine a performance score for the collected data records as a function of the respective allocations for the variables and/or the changes in the performance data of the data records corresponding to the variables. For example, the server can determine a weighted average for the data records by weighting the changes according to the allocations of the variables associated with the data records. The server can determine the performance score using any function. The server can then use backpropagation techniques based on the performance score to train the parameter machine learning model by adjusting the internal weights and/or parameters of the parameter machine learning model, where a higher performance score can indicate a degree to which the prediction from the parameter machine learning model was correct while a lower performance score can indicate a degree to which the prediction from the parameter machine learning model was incorrect. The server can repeat this process any number of times. In some embodiments, the server can perform this process to train the machine learning model in real time as users request recommendations regarding variable indices (e.g., recommendations for variables to monitor and/or to include in a variable index) and the parameter machine learning model generates or outputs parameters for configuring the relationship computer model based on the requests. A computing device can use the systems and methods of determining Gerber Statistics as described herein to aid a machine learning language processing model to operate as a robo-advisor and generate recommendations and/or alerts for variable indices.

The server can perform the method 1900 and/or generate alerts based on different triggers. For example, the server can repeat the method 1900 over time for a plurality of variables. In doing so, the server can initiate and repeat the method 1900 at set time intervals (e.g., responsive to detecting a time interval has ended). Upon initiation, the server can retrieve historical data records for each of the plurality of variables. The server can retrieve the historical data records that include data or values (e.g., a timeseries of values) of the variables from within a defined time period or from a defined duration prior to the current time (e.g., the time of the retrieval). The server can use the retrieved historical data records as input into the parameter machine learning model and execute the parameter machine learning model to cause the parameter machine learning model to generate one or more parameters (e.g., a time period, an alert threshold parameter, a lower relationship threshold parameter for each of the plurality of variables, and an upper relationship threshold parameter for each of the plurality of variables). The server can use (e.g., automatically use) the parameters to configure the relationship computer model. The server can then execute the relationship computer model to identify one or more pairs of variables from the plurality of variables that correspond to a relationship value exceeding the alert threshold generated by the parameter machine learning model (e.g., pairs of variables that have a high rate of co-movement). The server can generate an alert for a computing device identifying the identified pairs of variables and/or the relationship values of the respective pairs of variables. The server can repeat this process at each time interval such that the server can determine changes in relationships between pairs of variables in real time and output new identifications of new pairs of variables in real time, taking into account fluctuations in the variables of the variable index. This real-time monitoring may be facilitated or enabled by the automatic configuration of the relationship computer model such that the server may autonomously account for changes in relationships between variables on the fly using the parameter machine learning model without requiring a user to reprogram the relationship computer model in each execution instance.

By monitoring the variables of the variable index over time, the server can autonomously identify pairs of variables that develop co-moving relationships. For example, as the server monitors a plurality of variables of a variable index by iteratively repeating the method 1900 at set time intervals, the server can generate a relationship value for a pair of the variables for each iteration. The initial few relationship values may not exceed an alert threshold. However, at a later time, the server may determine a relationship value for the pair of variables exceeds an alert threshold, indicating that the pair of variables has developed a co-moving relationship. In response to determining the relationship value for the pair of variables exceeds the alert threshold, the server can generate an alert for a computing device identifying the identified pair of variables and/or the relationship value of the respective pair of variables that exceeds the alert threshold. The server can include a button in the alert that a user of the computing device can select to remove the pair of variables from the variable index or otherwise adjust the pair of variables (e.g., adjust the allocations of the pair of variables). Accordingly, by implementing the systems and methods described herein, the server can autonomously identify new co-moving relationships for pairs of variables that historically were not co-moving and provide users with the ability to adjust the variable index based on alerts identifying the new co-moving relationships.

In another example, the server can automatically perform the method 1900 in response to a user selecting a new variable from a user interface and/or adding the new variable to the user's variable index. For instance, the server can store a variable index for a user in the user's account. The variable index can include a plurality of variables. The user can access the user's account at a client device and select a new variable to potentially add, or to add, to the user's variable index. The server can generate for display on a computing device a user interface including a button that provides the user with the option to add the new variable to the user's variable index. Responsive to selecting the new variable and/or responsive to selecting the button on the user interface to complete the addition of the new variable to the variable index, the server can perform the method 1900 by retrieving historical data records from the plurality of variables previously stored for the user's account and/or historical data records for the new variable. The server can retrieve the historical data records that include data or values (e.g., a timeseries of values) of the variables from within a defined time period or from a defined duration prior to the current time (e.g., the time of the retrieval). The server can use the retrieved historical data records as input into the parameter machine learning model to generate parameters for the relationship computer model. The server can configure (e.g., automatically configure) the relationship computer model. The server can then execute the relationship computer model based on the plurality of records from the account and the selected new variable to identify one or more pairs of variables from the plurality of variables and selected new variable that correspond to a relationship value exceeding the alert threshold generated by the parameter machine learning model (e.g., pairs of variables that have a high rate of co-movement).

The server can generate an alert at the client device accessed by the user identifying the identified pairs of variables and/or the relationship values of the respective pairs of variables. By doing so, the server can automatically illustrate to a user the impact of including the new variable in the user's variable index. The user can view the alert and determine whether to complete the addition of the variable to the variable index. In some cases, the user can select the button to cause the server to add the selected variable to the plurality of variables and/or select the button to stop or restrict the server from adding the new variable to the plurality of variables. The server can complete this request for any number of users in real time, taking into account each user's variable index and the time period prior to the current time. Because the server uses the parameter machine learning model to configure the relationship computer model for each execution, the server may be able to generate contextually relevant (e.g., timely) relationships between pairs of variables taking into account any recent changes in the relationships between the variables. The server can do so without requiring a user to reconfigure the relationship computer model for each execution, which can both facilitate the server generating the alerts based on real-time data and doing so in response to a large number of requests received within a short time frame, which could not be done if each request required a manual reconfiguration of the relationship computer model.

In a non-limiting example, a computing device can store a machine learning language processing model that has been trained or configured to generate responses to requests for recommendations and/or alerts regarding variable indices of different users. The computing device can receive a request for variables to monitor (e.g., based on the variables having a high co-movement relationship with at least one other variable) of a selection of variables from a client device. The computing device can execute the machine learning language processing model using the request as input. Based on the execution, the machine learning language processing model can dynamically identify a machine learning language processing model or application to use to query for data records containing historical performance data for the selection of variables, a parameter machine learning model to generate parameters for configuring a relationship computing model to generate relationships for the selection of variables, and the relationship computing model. The relationship computing model can be configured to determine positive and/or negative unions for pairs of variables and/or relationship values (e.g., Gerber Statistic) for the pairs of variables based on the unions. The machine learning language processing model can execute the models in sequence to identify a set of pairs of variables that have a high co-movement relationship (e.g., a high relationship value) and generate an alert to the computing device including the set of pairs of variables.

In a non-limiting example, the data processing system can receive an input via a graphical user interface identifying three variables, a broad market index (Variable A), a high-volatility growth stock (Variable B), and a sector-specific exchange traded fund (Variable C). The data processing system can execute the machine learning language processing model using the input into the graphical user interface as a prompt. Based on the execution, the machine learning language processing model can dynamically identify the appropriate models needed for analysis: a querying agent to retrieve historical data, a parameter machine learning model for generating configuration parameters, and the relationship computer model.

The querying agent can retrieve historical price data of the three variables at 5-minute intervals over the previous 60 days from the data processing system's databases or by querying a remote database. The data processing system can execute the parameter machine learning model using the historical price data as input to automatically determine configuration parameters for the relationship computer model of a two-day time window, an alert threshold of 0.80, and price movement thresholds for each variable (e.g., a threshold of 0.5% for the market index, 2% for the growths stock variable, and 1% for the sector ETF variable).

The data processing system can automatically configure the relationship computer model with the parameters generated by the parameter machine learning model. The data processing system can then input records for the variables including pricing data generated within the and begins its analysis by selecting data records within the specified two-day time window output by the parameter machine learning model. For each pair of instruments, the relationship computer model can identify records with matching timestamps to identify unions. For example, the data processing system can detect a positive union between the market index and the sector ETF when both variables exceed their respective upper thresholds and/or a negative union when both variables are less than their respective lower thresholds. The relationship computer model can maintain separate counters for positive and negative unions for each pair of variables (e.g., a positive counter and a negative counter for Variable A and Variable B, a positive counter and a negative counter for Variable B and Variable C, etc.).

The data processing system can use the counts of the counters to calculate relationship values using the method for generating relationship described herein. In doing so, the data processing system can generate a score or value of 0.85 for the market index and sector ETF pair, 0.82 for the growth stock and sector ETF pair, and 0.65 for the market index and growth stock pair. The data processing system can determine two of the pairs correspond to a score or value above the 0.8 threshold. Responsive to the determination, the data processing system can generate and transmit an alert to the client device identifying these high-correlation pairs. The data processing system can repeat this process over time without human intervention to configure the relationship computer model. This automated, multi-model approach enables the data processing system to continuously adapt its analysis parameters based on market conditions while processing large volumes of data efficiently and without manual intervention.

Overall, a computing device can use the systems and methods of determining Gerber Statistics as described herein to aid a machine learning language processing model to operate as a robo-advisor and generate recommendations and/or alerts for variable indices. In a non-limiting example, a computing device can store a machine learning language processing model that has been trained or configured to generate responses to requests for recommendations and/or alerts regarding variable indices of different users. The computing device can receive a request for variables to monitor (e.g., based on the variables having a high co-movement relationship with at least one other variable) of a selection of variables from a client device. The computing device can execute the machine learning language processing model using the request as input. Based on the execution, the machine learning language processing model can dynamically identify a machine learning language processing model or application to use to query for data records containing historical performance data for the selection of variables, a parameter machine learning model to generate parameters for configuring a relationship computing model to generate relationships for the selection of variables, and the relationship computing model. The relationship computing model can be configured to determine positive and/or negative unions for pairs of variables and/or relationship values (e.g., Gerber Statistic) for the pairs of variables based on the unions. The machine learning language processing model can execute the models in sequence to identify a set of pairs of variables that have a high co-movement relationship (e.g., a high relationship value) and generate an alert to the computing device including the set of pairs of variables.

Figure 20:
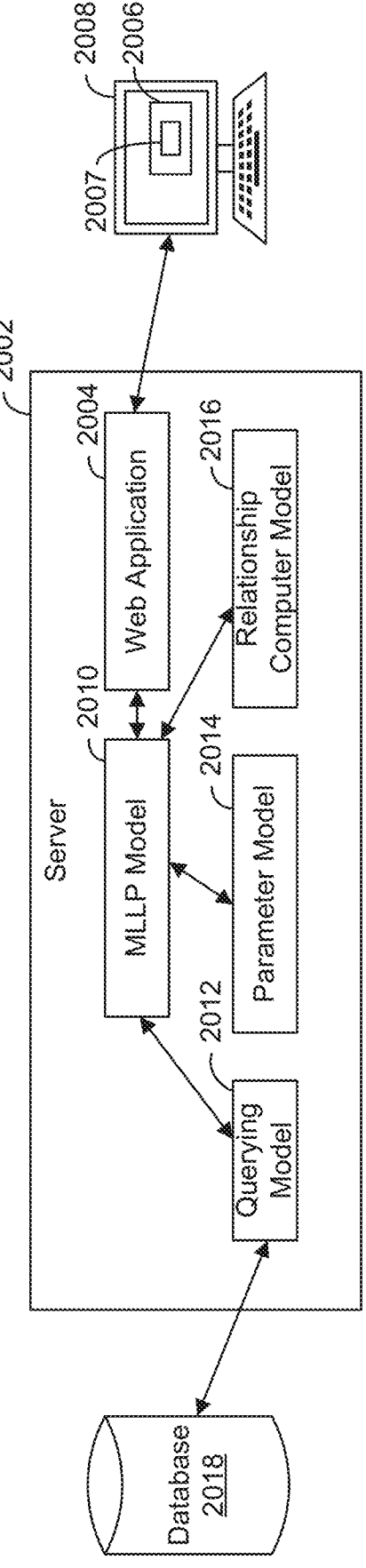
FIG. 20 depicts a sequence for generating a variable index based on relationships between variables, according to an embodiment.

FIG. 20 depicts a sequence diagram 2000 depicting operational steps for generating a variable index based on relationships between variables, according to an embodiment. The operational steps may be performed by a server (e.g., the server 100 or the server 1810a). However, one or more of the operational steps may be executed by any number of computing devices operating in the distributed computing system described in FIG. 1 or FIG. 18. For instance, one or more computing devices (e.g., user devices) may locally perform part or all of the operational steps described with reference to FIG. 20. Moreover, one or more of the operational steps can be performed via any processor of the system, such as any processor of the system 100 or the system 1800.

In the sequence diagram 2000, a server 2002 can execute a web application 2004 to cause presentation of a user interface 2006 to a user at a computing device 2008. The web application 2004 can be an application configured to host a web platform through which users can manage variable indices of profiles owned by the users and/or generate recommendations regarding the variable indices based on requests from the users. The server 2002 can receive such requests and generate responses to the requests using a machine learning language processing model (MLLP model) 2010, which can receive the requests and identify and execute different models and/or applications stored in memory of the server 2002 to generate responses to the requests. The web application 2004 can display the responses to the user at the user interface 2006 displayed on the computing device 2008.

For example, a user can input a request for variables to monitor into the user interface 2006 provided by the web application 2004 on the computing device 2008. The user can input a selection of variables that the user is interested in potentially monitoring, either by selecting indications of the variables on the user interface 2006 or by providing a text input identifying the selection of variables into a chat component 2007 of the user interface. The web application 2004 can pass the request to the MLLP model 2010. The MLLP model 2010 can process the request for variables to monitor and identify a querying model 2012, a parameter model 2014, and/or a relationship computer model 2016 to use to generate a response to the request. The MLLP model 2010 can transmit the identifications of the selection of variables to the querying model 2012. The MLLP model 2010 can execute the querying model 2012 to cause the querying model 2012 to generate one or more queries for data records containing historical performance data for the selection of variables. The querying model 2012 can use the generated queries to query one or more data sources, such as a data source 2018 (e.g., a local or remote database), that contains data records for the selection of variables. The querying model 2012 can query the one or more data sources to retrieve data records for the selection of variables. In some cases, the querying model 2012 can query the one or more data sources by requesting data records within a defined time period input by the MLLP model 2010 and/or a time period for which the querying model 2012 is trained to generate queries and/or retrieve data records. The querying model 2012 can retrieve the data records and pass the data records back to the MLLP model 2010 and/or send the data records to the parameter model 2014 for further processing.

The MLLP model 2010 can execute the parameter model 2014 using the data records for the selection of variables as input. The parameter model 2014 can be a machine learning model (e.g., a support vector machine, a random forest, a neural network, etc.) that is configured to output or generate parameters for configuring the relationship computer model 2016. The parameter model 2014 can be configured to generate the parameters based on data records that the parameter model 2014 receives as input. Based on the execution and the data records that the querying model 2012 retrieved from the data sources, the parameter model 2014 can generate or output one or more parameters for the relationship computer model 2016. For example, the parameter model 2014 can generate or output a time period for the plurality of variables, an alert threshold parameter for the plurality of variables, a lower relationship threshold parameter for each of the plurality of variables, and an upper relationship threshold parameter for each of the plurality of variables. The parameter model 2014 can pass the output parameters to the MLLP model 2010 or to the relationship computer model 2016.

The MLLP model 2010 can configure the relationship computer model 2016 to generate a response to the request from the computing device 2008. The MLLP model 2010 can do so by configuring the relationship computer model 2016 according to the output parameters from the parameter model 2014. For example, the MLLP model 2010 can insert the parameters into the relationship computer model 2016 such that, when executed, the relationship computer model 2016 can generate relationships for pairs of variables of the selection of variables based on the parameters.

The MLLP model 2010 can use the data records retrieved from the data sources and execute the relationship computer model 2016 as configured with the output parameters from the parameter model 2014. The execution can cause the relationship computer model 2016 to generate relationships for individual pairs of the selection of variables and/or identify a set of pairs of variables to recommend for monitoring in response to the request. For example, the relationship computer model 2016 can identify a set of data records from the retrieved data records that correspond with timestamps within the time period output by the parameter model 2014. The relationship computer model 2016 can determine counts of positive and/or negative unions for individual pairs of variables from the set of data records using the upper threshold parameters and/or the lower threshold parameters that the parameter model 2014 output for the individual variables. The relationship computer model 2016 can determine relationship values (e.g., Gerber Statistics) for the individual pairs of variables as a function of the counts of positive and/or negative unions for each of the pairs of variables. The relationship computer model 2016 can compare the relationship values to the alert threshold output by the parameter model 2014 to identify a set of pairs of variables with a high co-movement relationship to recommend for monitoring.

The server 2002 can cause presentation of the set of pairs of variables and/or the relationship values of the set of pairs of variables on the user interface 2006. For example, the relationship computer model 2016 can pass the output set of pairs of variables with the relationship values for the set of pairs of variables back to the MLLP model 2010. The server 2002 can execute the MLLP model 2010 to cause the MLLP model 2010 to generate a text output with the set of variables and/or the relationship values of the set of variables, in some cases with commentary or an analysis or description of the set of variables and/or the relationship values. The MLLP model 2010 can pass the set of variables and/or the relationship values to the web application 2004, which can in turn cause presentation of the output from the MLLP model 2010 on the user interface 2006. In some cases, the relationship computer model 2016 can directly pass the set of pairs of variables and the relationship values for the set of pairs of variables to the web application 2004 for presentation on the user interface 2006.

For instance, the chat component 2007 can include a messaging interface in which the user can provide inputs into a form and select a submit button to cause the inputs to be transmitted to the server 2002. The user's input can be depicted in a thread above or next to the form within the chat component 2007, such as in text bubbles, in list form, or in paragraph form. The server 2002 can generate responses based on the inputs, such as by performing the processing described herein, and generate the responses for presentation within the chat component 2007. In some cases, the server 2002 can configure the chat component 2007 by positioning the responses in the chat component 2007, such as above the previous input. The server 2002 can be configured to take into account entire threads when generating responses through the MLLP model 2010. For example, the server 2002 can generate a text output identifying relationship values between pairs of variables and/or identifications of variables with relationship values that exceed an alert threshold for display. The user can provide an input asking for a recalculation (e.g., with a new parameter for the parameter model 2014) and/or with a question about the output. In cases in which the user provides an input requesting a recalculation, the server 2002 can repeat the process of generating relationship values for pairs of variables and identifying pairs of variables with relationship values that exceed the alert threshold, in some cases with the input parameters. In cases in which the user asks a question about the identified variables, the server 2002 can input the request into the MLLP model 2010, in some cases with one or more, or all, of the messages of the thread of messages with the computing device 2008 and execute the MLLP model 2010 to generate a response. The server 2002 can generate responses for display on the chat component 2007 in list form or in chat bubbles.

In a non-limiting example, a user accessing the computing device 2008 can input a list of variables into the chat component 2007 of the user interface 2006. The variables can include variable A, variable B, variable, C, variable D, variable E, and variable F. The user can also input a text request asking which of variables A-F have a high co-moving relationship and/or need to be monitored. The user may input such a request because variables A-F may be a part of the user's variable index and the user is seeking to identify variables that are causing the variable index to be high risk. The computing device 2008 can transmit the request with the list of variables to the web application 2004 executing on the server 2002.

The web application 2004 can pass the request with the list to the MLLP model 2010. The server 2002 can execute the MLLP model 2010 using the request and list as input to cause the MLLP model 2010 to output identifications of the querying model 2012, the parameter model 2014, and the relationship computer model 2016 to identify the models to execute to identify which of the variables A-F to recommend for monitoring. The MLLP model 2010 can execute the querying model 2012 using identifications of variables A-F as input to cause the querying model 2012 to generate a query for retrieving data records regarding the variables A-F from the data source 2018. The querying model 2012 can use the query to retrieve data records containing historical data of the variables A-F from the data source 2018. The querying model 2012 can pass the data records to the MLLP model 2010 and/or to the parameter model 2014.

The MLLP model 2010 can execute the parameter model 2014 to determine parameters for the relationship computer model 2016 for identifying which of the variables A-F to recommend for monitoring to the user accessing the computing device 2008. The MLLP model 2010 can execute the parameter model 2014 using the retrieved data records regarding the variables A-F as input. Based on the execution, the parameter model 2014 can output a time period for the variables A-F, an alert threshold for the variables A-F, a lower relationship threshold parameter for each of the variables A-F, and an upper relationship threshold parameter for each of the variables A-F. The parameter model 2014 can pass the parameters to the MLLP model 2010 and/or to the relationship computer model 2016.

The MLLP model 2010 can configure the relationship computer model 2016 with the parameters output by the parameter model 2014. The MLLP model 2010 can configure the relationship computer model 2016 by inserting the parameters in the designated locations for the parameters in the relationship computer model 2016. Accordingly, the MLLP model 2010 can customize the relationship computer model 2016 for generating a recommendation specific to the request from the computing device 2008. The MLLP model 2010 can similarly customize the relationship computer model 2016 for different requests over time to enable the server to generate dynamic responses to requests from different users and/or computing devices.

The MLLP model 2010 can execute the relationship computer model 2016 configured according to the parameters output by the parameter model 2014. In doing so, the MLLP model 2010 may cause the relationship computer model 2016 to output one or more positive and/or negative unions for different pairs of the variables A-F. The relationship computer model 2016 can determine counts of positive unions and/or negative unions for the individual pairs of variables. For example, the relationship computer model 2016 can determine variables A and D have 6 positive unions and 3 negative unions and variables B and D have 3 positive unions and 6 negative unions. The MLLP model 2010 can determine such unions from records that correspond to time stamps within the time period output by the parameter model 2014. The relationship computer model 2016 can determine relationship values (e.g., Gerber Statistics) for the pairs of variables as a function of the counts of positive and/or negative unions for the respective pairs of variables. The relationship values can indicate a level of co-movement between variables of the respective pairs of variables.

Based on the execution by the MLLP model 2010, the relationship computer model 2016 can identify variables to monitor. The relationship computer model 2016 can do so based on the alert threshold parameter output by the parameter model 2014. For instance, the relationship computer model 2016 can compare the relationship values for the pairs of variables with the alert threshold parameter. Based on the comparison, the relationship computer model 2016 can identify that the pair including variable A and variable C has a relationship value exceeding the alert threshold parameter and that the pair including variable B and variable E has a relationship value exceeding the alert threshold parameter. The relationship computer model 2016 can output identifications of the pairs of variables to the MLLP model 2010. The MLLP model 2010 can receive the output and cause presentation of identifications for the pair of variable A and variable C as well as the pair of variable B and variable E on the user interface 2006 presented on the computing device 2008.

Automatic Variable Index Generator and Adjuster

FIG. 21 depicts a method 2100 for generating a variable index based on relationships between variables, according to an embodiment. The method 2100 includes steps 2102-2118. However, other embodiments may include additional or alternative execution steps, or may omit one or more steps altogether. The method 2100 is described as being executed by a server, similar to the server described in FIG. 1 and/or FIG. 18. However, one or more steps of method 2100 may also be executed by any number of computing devices operating in the distributed computing system described in FIG. 1 and/or FIG. 18. For instance, one or more computing devices (e.g., user devices) may locally perform part or all of the steps described in FIG. 21. Moreover, one or more of the steps of the method 2100 can be performed via any processor of the system, such as any processor the system 100 and/or the system 1800.

Various actions here are described in terms of being executed by the server and/or different machine learning models and/or agents. However, these actions can be executed by any of the features discussed herein and/or depicted within FIG. 1 and/or FIG. 18. For instance, in one embodiment an action can be performed by a machine learning language processing model. However, additionally or alternatively, the same action can be performed (in other embodiments) by the server.

Using the methods and systems described herein, such as the method 2100, the server may use a machine learning architecture to automatically generate recommendations of combinations of variables to include in a variable index. The server can do so using a chain of machine learning models and/or applications. For instance, the server can execute a machine learning language processing model to process a request for a combination of variables to include in a variable index of a profile. Based on the execution, the machine learning language processing model can identify a relationship computer model that is configured to generate relationships (e.g., relationship values) for individual pairs of variables. The machine learning language processing model can execute the relationship computer model using variables in the variable index of the profile as well as other variables not included in the variable index to generate relationships for pairs of the variables. The machine learning language processing model can use the relationships between the pairs of relationships to determine a set of variables to recommend including in the variable index that causes the variable index to have one or more index characteristics. The server may present the set of variables on a user interface displayed on a user device that transmitted the initial request to the server.

At step 2102, the server can receive a request. The request can be a request for a recommendation for a combination of variables to include in a variable index. The server can receive the request via a user interface. The user interface may be presented on a client device being accessed by a user. For example, the server can receive the request from a graphical or text input (e.g., chat) or audio input (e.g., microphone) component of the user interface in which a user selected or input identifications of a plurality of variables. The server can receive the request for a recommendation as text, audio, speech, images, or any combination of such types of content. In some examples, the server can receive the request via an application programming interface (API) rather than through a user interface. In some examples, the API may be called by another application to provide the request. In one example, the request can be for a recommendation of variables that will improve performance of the variable index of a profile associated with the user making the request. The server can receive the request and input the request into a machine learning language processing model for processing.

At step 2104, the server can execute the machine learning language processing model. The server can execute the machine learning language processing model using the request for a recommendation for a combination of variables to include in the variable index as input. The execution can cause the machine learning language processing model to generate or output a set of variables to recommend in response to the request from the computing device.

The server can execute the machine learning language processing model to retrieve data records for the variable index. For example, the request for the recommendation can include an identifier of a profile associated with a variable index stored in a database stored in memory of the server. The machine learning language processing model can identify the identifier of the profile associated with the variable index and retrieve identifications of the variables of the variable index associated with the profile from the database of the server that stores variable indices of different profiles. In some cases, the machine learning language processing model can retrieve the identifications of the variables by executing another application or machine learning language processing model. Responsive to retrieving the identifications of the variables of the variable index for the profile, the machine learning language processing model can use the identifications to retrieve data records for the variables of the variable index.

For example, the machine learning language processing model can identify a querying machine learning language processing model (e.g., a querying agent) of the server that is configured or trained to generate and use queries to retrieve data based on input identifications of variables. The machine learning language processing model can input the identifications of the variables of the variable index into the querying machine learning language processing model and execute the querying machine learning language processing model. Based on the execution, the querying machine learning language processing model can generate one or more queries (e.g., structured query language (SQL) queries) for data records for the plurality of variables.

In addition to the variables of the variable index, the machine learning language processing model can use the querying machine learning language processing model to query for data records for variables that are not included in the variable index. For example, the request that the server receives from the user interface can include identifications of a selection of variables. The selection of variables can be variables that the user is considering including in the variable index. The machine learning language processing model can include the identifications of the selection of variables in the input into the querying machine learning language processing model to cause the querying machine learning language processing model to generate one or more queries for data records for variables not included in the variable index.

The querying machine learning language processing model can query a local database and/or one or more remote databases that store historical data for the plurality of variables using the generated queries. The querying machine learning language processing model can query the databases for all of the data records that are available for the variables being queried and/or for all of the data records that correspond to a defined time period (e.g., a time period input by an administrator when configuring the server to perform the systems and methods described herein). Based on the queries, the machine learning language processing model can retrieve a plurality of data records that include historical data associated with the variables. The querying machine learning language processing model can pass or transmit the retrieved data records to the machine learning language processing model or to a relationship computer model for further processing.

In some cases, the machine learning language processing model can determine one or more index characteristics.

Index characteristics can be characteristics for the variable index such as an index risk threshold or range, types of variables to exclude from the variable index, a ratio of types of variables to include in the variable index, etc. The machine learning language processing model can determine the index characteristics in a variety of different manners. In one example, the request that the server receives from the user interface can include the index characteristics.

In another example, the machine learning language processing model can automatically determine index characteristics to use to generate a response to the request based on characteristics of the user that input the request into the user interface. The characteristics of the user can include, for example, age, risk tolerance, length of time having the variable index, activity in changing variables within the variable index, demographic attributes of the user, etc. The user can include the characteristics of the user in the request for the recommendation for the variable index or the machine learning language learning model can retrieve the user characteristics from the profile for the user. The machine learning language processing model can identify a machine learning model (e.g., a second machine learning model) that has been trained to generate index characteristics based on characteristics of users. The machine learning language processing model can execute the identified machine learning model using the user characteristics as input to generate or otherwise cause the machine learning model to output index characteristics for the recommendation. The machine learning language processing model can use the index characteristics as a guide for selecting the variables to include in the recommendation in response to the request from the user, such as by ensuring the set of variables that the machine learning language processing model selects for recommending causes the variable index to have the index characteristics.

In another example, the server can use the machine learning language processing model to satisfy index characteristics based on stories or news from the Internet. For example, the machine learning language processing model can determine an index characteristic for the variable index to be excluding variables where news has been negative for a defined time period (e.g., last six months). In response to the determination, the machine learning language processing model can scrape (e.g., using another machine learning model or application) web pages containing stories for different variables of the variable index and/or not of the variable index that the machine learning language processing model is determining whether to recommending including in the variable index. The machine learning language processing model can identify stories (e.g., only identify stories generated or posted on the web pages within the defined time period) for individual variables and generate a context or the content of the stories (e.g., generate summaries of the stories). The machine learning language processing model can process or execute another machine learning model to process the generated context or content of the identified stories, or the stories themselves, to determine which of the variable variables of the variable index and/or potential set of variables are negative variables that have had negative news for the defined time period. The machine learning language processing model may generate a recommendation to remove any negative variables currently in the variable index from the variable index and/or automatically remove such negative variables from the variable index, in some cases depending on the request. The machine learning language processing model may remove any negative variables of the variables not currently included in the variable index from further processing to reduce the processing requirements by avoiding further processing for a variable that would cause the variable to not satisfy the index characteristic. The machine learning language processing model may similarly filter out or remove variables that correspond with at least one or a defined number of negative earnings calls, market reports, and/or research paper or such papers generated or posted within a defined time period.

At step 2106, the machine learning language processing model can execute the relationship computer model. The relationship computer model can be configured to generate relationships (e.g., relationship values) for individual pairs of variables as described herein. The machine learning language processing model can execute the relationship computer model using the data records that the server retrieved for the variables of the variable index for the profile as well as for variables not included in the variable index. Based on the execution, at step 2108, the relationship computer model can determine or output positive unions and/or negative unions for one or more pairs of the variables of the variable index and not included in the variable index. At step 2110, the relationship computer model can determine or output relationship values for the pairs of variables. The relationship computer model can determine the relationship values for the pairs of variables as a function of the counts of positive unions and the counts of negative unions for the individual pairs of variables. The relationship computer can determine or output the unions for the pairs of variables and the relationship values for the pairs of variables in the same manner as described with reference to steps 1912 and 1914 of FIG. 19.

In some embodiments, the machine learning language processing model can configure the relationship computer model for generating relationships for the query. The machine learning language processing model can do so based on the data records that the machine learning language processing model inputs into the relationship computer model in a similar manner to the manner described with reference to steps 1904 and 1906, as described with respect to FIG. 19. The machine learning language processing model can input the data records into a parameter machine learning model to generate or output parameters for configuring the relationship computer model. The machine learning language processing model can then configure the relationship computer model according to the output parameters. Accordingly, the machine learning language processing model can generate recommendations for variables to include in the variable index using data that is specific to the request.

At step 2112, the machine learning language processing model can identify a potential set of variables. The relationship computer model can identify the potential set of variables by identifying (e.g., randomly or pseudo-randomly identifying) one or more variables that are not included in the variable index but for which the relationship computer model generated relationships with other variables.

At step 2114, the machine learning language processing model can determine whether the variable index with the potential set of variables satisfies the one or more index characteristics. For example, the machine learning language processing model can add the potential set of variables to the variable index. The machine learning language processing model can add the potential set of variables by including one or more of the potential set of variables in the variable index and/or by replacing one or more variables of the variable index with one or more variables of the potential set of variables to generate a potential variable index. Based on the addition, the machine learning language processing model can evaluate the potential variable index with the one or more index characteristics to determine whether the potential variable index has the one or more index characteristics.

In one example, the machine learning language processing model can determine whether the set of variables causes the variable index to have the one or more index characteristics based on the relationship values of the relationships of the pairs of variables of the set of variables. For instance, the machine learning language processing model can determine whether an average of the relationship values exceeds or is less than an index risk threshold of the index characteristics. In some cases, the index risk threshold can be an upper threshold such that the variable index satisfies the index risk threshold if the average of the relationship values is less than the index risk threshold. In some cases, the index risk threshold is a lower threshold such that the variable index satisfies the index risk threshold if the average of the relationship values is greater than the index risk threshold. In some cases, the machine learning model determines if the average of the relationship values is within an index risk range to determine whether the variable index satisfies the index risk range (e.g., is within the index risk range).

In some cases, the one or more index characteristics includes criteria involving types of variables. For example, the index characteristics can indicate for the variable index to only include variables of a Type A (e.g., a stock) and Type B (e.g., a bond) and/or to otherwise exclude variables of Type C (e.g., an index fund). The machine learning language processing model can determine whether the types of variables of the set of variables satisfies such criteria to determine whether the variable index would have the index characteristics with the set of variables. In another example, the criteria can indicate a ratio of types of variables for the variable index. The machine learning language processing model can identify or determine counts of the different counts of the different types of variables of the variable index with the set of variables included and determine a ratio of the types of variables. The machine learning language processing model can compare the ratio to the ratio of the criteria to determine whether the variable index would have the index characteristics with the set of variables. The one or more index characteristics can include any number and/or any of such criteria and/or other criteria.

Responsive to determining the current iteration of the potential variable index does not cause the variable index to have the one or more index characteristics (e.g., to not have at least one of the one or more index characteristics), the machine learning language processing model can adjust the addition to the variable index. The machine learning language processing model can do so, for example, by replacing one or more variables of the variable index with one or more variables of the potential set of variables and/or by otherwise not removing a variable from the variable index to generate another potential variable index and determining if the new potential variable index has the one or more index characteristics. The machine learning language processing model can repeat this process for different permutations of adding the potential set of variables to the variable index until identifying a potential set of variables that causes the variable index to have the one or more index characteristics or until determining each possible combination of the potential set of variables added to the variable index does not cause the variable index to have the one or more index characteristics.

Responsive to determining the potential set of variables (e.g., each possible combination of the potential set of variables added to the variable index) does not cause the variable index to have the one or more index characteristics, at step 2116, the machine learning model can adjust the potential set of variables. The machine learning model can adjust the potential set of variables by adding one or more variables (e.g., random or pseudo-randomly selected variables) to the potential set of variables and/or by removing one or more variables (e.g., randomly or pseudo-randomly selected variables) from the potential set of variables. After adjusting the potential set of variables, the machine learning language processing model can repeat steps 2112-2116 until determining a potential set of variables that causes the variable index to have the one or more index characteristics.

Responsive to identifying a potential set of variables that causes the variable index to have the one or more index characteristics, at step 2118, the data processing system can use the machine learning language processing model to generate a data structure (e.g., a table, vector, matrix, etc.). The data structure can be a temporary data structure that the machine learning language processing system deletes from memory responsive to generating the visual representation of the data within the data structure. The machine learning language processing model can include the identified potential set of variables in the data structure. The machine learning language processing model can include the identified potential set of variables in the data structure in a structured format, such as in a JSON format, an XML format, and/or as structured objects. The data structure can be formatted in a manner that the machine learning language processing model can use the data to generate a response to the text request or another type of natural language query.

The data processing system can generate a visual representation based on the data in the data structure. To do so, the data processing system can process the data of the data structure using the machine learning language processing model to generate a visual representation of the data in the data structure according to the text request. For example, the machine learning language processing model can determine a format in which to generate a response based on the text request. Such formats can include, a table, a report, a graph, a text summary, a vector, a list, etc. The machine learning language processing model can determine the format for the response by determining the context or intent in the text request. The machine learning language processing model can determine the format, retrieve the data from the data structure, and generate a visual representation of the data in the data structure in a format appropriate for responding to the natural language query (e.g., in a format requested in the natural language query).

For example, the data processing system can receive an identification of a format indicating to present the set of variables in a list format. The data processing system can receive the identification of the list format in the request received at step 2102. The data processing system can include the identification of the list format in the input into the machine learning language processing model. The machine learning language processing model can identify the list format and process the data within the data structure to depict the set of variables in the list format. The machine learning language processing model can similarly generate the visual representation in another requested format, such as in a table, matrix, or graph. In some cases, the request can include a request for data relating to a set of variables, such as the historical data or any other metrics and/or a time period in which the data was generated, the data processing system has stored for the individual variables of the set of variables. The machine learning language processing model may identify the request and retrieve the requested data from the memory of the data processing system. The machine learning language processing model can generate the visual representation to include the requested data, either within the requested format or in a separate format, such as in an appendage or separate file from the output.

At step 2120, the server can present the visual representation of the data structure in a recommendation for a set of variables to include in the user's variable index on the user interface for display on the client device. The server can present the set of variables using the machine learning language processing model. For example, the machine learning language processing model can generate or output a visual representation of the set of variables after determining the set of variables causes the variable index to have the one or more index characteristics. The server can execute the machine learning language processing model again using the set of variables as input to generate a text output indicating the set of variables, in some cases with other data regarding how the variable index is projected to perform with the set of variables. The server can cause presentation of the text output as a recommendation for a combination of variables to include in the variable index associated with the user's profile.

The server can cause presentation of the visual representation at the client device from which the server received the request for the recommendation. In doing so, the server can cause a presentation of the visual representation on a user interface at the client device. The server can cause the presentation of the visual representation by transmitting instructions including the visual presentation to the client device. For example, the server can generate the visual representation to include the set of variables generated or predicted by the machine learning language processing model. The server can include a button that corresponds to each variable of the set of variables that can be selectable by the user at the client device that provided the input for the request in the visual representation. The buttons can be the text (e.g., as hyperlinks) identifying each variable, buttons that are directly adjacent to the respective variables, and/or buttons separate from the variables but that otherwise identify the variables. The server can transmit the generated visual representation to the client device, and the client device can present the generated visual representation on a user interface. The user can select one of the buttons to cause the server to transmit more information about the variable (e.g., the current value of the value and/or historical values of the variable) that corresponds to the selected button to the client device for display or to cause the server to add the variable to the user's variable index. In some cases, the server can cause the client device to present and/or the user can select a button to cause the server to adjust the user's variable index to the presented set of variables (e.g., initiate execution of any transactions required to adjust accordingly, such as by generating and sending an instruction for such allocation changes). In some cases, the server can cause the client device to present one or more buttons that the user can select to adjust or manipulate the set of variables. The user can select a button to add or adjust the user's variable index based on the adjusted set of variables (e.g., to match the adjusted set of variables or to add the set of variables to the user's variable index).

In some embodiments, the server can include recommendations for allocations for the set of variables in the visual representation. The server can generate or determine the allocations using the machine learning language processing model. For example, in the request for a combination of a set of variables to include in the variable index, the user can include a request for allocations for the set of variables in addition to identifications of the set of variables. The machine learning language processing model can identify the request for allocations and identify an allocation machine learning model (e.g., a second machine learning language processing model, a neural network, a support vector machine, etc.) configured or trained to generate allocations for variables based on index characteristics of a variable index for which the allocation machine learning model is generating or outputting the allocations, identifications of variables for which the allocation machine learning model is generating or outputting the allocations, index characteristics for the recommendation, and/or relationship values for pairs of the set of variables and/or variables already included in the variable index. The machine learning language processing model can input such data received, retrieved, and/or generated in response to receiving the request at step 2102 into the allocation machine learning model to cause the allocation machine learning model to output allocations (e.g., numerical values indicating an amount of emphasis or currency to place on the variables) for the set of variables and/or the variables already in the variable index. The machine learning language processing model can retrieve the output allocations and include the allocations in the recommendation with the set of variables that the server presents on the user interface.

The server can operate as a robo-advisor using models of the server to respond to other types of requests. For instance, in addition or instead of the above, the server can predict or create a fake variable index that can be monitored and compared against an actual variable index, periodically rebalance a variable index using a selection of limited variables (e.g., the server can allow users to select a limited set of variables and only rebalance within the limited set identified by the users), eliminate a variable from a variable index or recommend similar variables, and/or run various scenarios in real time to show projections for a user. The server can receive requests to perform such actions and use the machine learning language processing model that executes and/or accesses other models and/or applications stored in the server to automatically generate responses for the requests.

For example, the server can receive a request to generate a fake variable index from a client computing device. The request can include one or more index characteristics for the fake variable index, characteristics of the user making the request, and/or an identification of the profile or user making the request. The machine learning language processing model can receive the request and determine index characteristics for the fake variable index based on the input as described herein (e.g., execute an index characteristic machine learning model based on the characteristics of the user or identify the index characteristics included in the request). The machine learning language processing model can identify a variable identification model (e.g., a machine learning model or a machine learning language processing model) configured to identify variables based on input index characteristics. The machine learning language processing model can execute the variable identification model using the determined index characteristics as input to generate or otherwise cause the variable identification model to output identifications of variables to include in a fake variable index that has the one or more index characteristics. The server can cause presentation of the fake variable index on the client computing device.

The machine learning language processing model can generate the fake variable index based on relationships (e.g., relationship values) between variables of the fake variable index. For example, to generate the fake variable index, the machine learning language processing model can execute the variable identification model. In doing so, the machine learning language processing model can cause the variable identification model to output a potential variable index including one or more variables that can potentially be a fake variable index that satisfies the one or more index characteristics. The machine learning language processing model or the variable identification model can retrieve data records for the variables of the potential variable index and execute the relationship computing model using the data records as input to generate relationships for pairs of variables of the potential variable index. In some cases, the machine learning language processing model can execute the relationship computing model after configuring the relationship computing model with parameter determined specifically for the relationship computing model using the parameter machine learning model, as described herein. The machine learning language processing model or the variable identification model can determine whether the relationships for the pairs of variables and/or the types of the variables of the potential variable index have the one or more index characteristics. Responsive to determining the potential variables index does not have the one or more index characteristics, the machine learning language processing model can adjust the potential variable index by adding and/or removing variables from the fake variable index, determine relationships for pairs of variables in the adjusted fake variable index, and repeat the process until determining a fake variable index that has the one or more index characteristics. In some cases, the variable identification model and/or the machine learning language processing model can adjust the fake variable index by feeding the determined relationships for the pairs of variables of the fake variable index back into the variable identification model with the one or more index characteristics to generate a new fake variable index and repeat the process. The machine learning language processing model can repeat the process any number of times until determining a fake variable index based on the request.

Continuing with the example, in some cases, the request can include a request to monitor the fake variable index with an actual variable index of a user that input the request. In such cases, after generating a record of the fake variable index, the server can store the record in memory. The server can then monitor performance data of the fake variable index over time as well as performance data of the actual variable index included in the request. The machine learning language processing model can compare (e.g., do the comparison itself or by executing an application or agent configured for such comparisons) the two indices and generate a visual representation (e.g., a graph, such as a line graph showing the performance of the two variable indices over time) of the comparison. In some cases, the machine learning language processing model can generate the visual indication in a requested format (e.g., a bar graph, a chart, a line graph, etc.) included in the request. The machine learning language processing model can generate a response with the visual indication and transmit the response to the client device that submitted the request at set time intervals to show how the fake variable index is performing compared with the actual variable index.

In another example, the server can use the machine learning language processing model to periodically rebalance a selection of variables of a variable index. For instance, the server can receive a request to periodically rebalance (e.g., rebalance at set time intervals) a variable of a profile of a user. The request can include text indicating the request, an identification of the profile of the user making the request, and/or identifications of the variables selected by the user for rebalancing. At each periodic time interval, the machine learning language processing model can retrieve performance data for the variables of the variable index from the previous time interval and/or time intervals prior to the previous interval and execute the allocation machine learning model with the allocation machine learning model. For the execution, the machine learning language processing model can include the collected performance data and the identifications of the variables that the user selected for rebalancing. The allocation machine learning model can output rebalanced allocations for the variable index in which the selected variables are the only variables with changed values from the current allocations. The allocation machine learning model can reallocate the selected variables such that the total allocation of the selected variables remains the same, but the individual allocations change. The server can implement the reallocations in the variable index and/or generate a recommendation of the reallocation using the machine learning language processing model and cause presentation of the recommendation on the user interface for the user to implement.

In another example, the server can recommend eliminating a variable from a variable index. For instance, the server can receive (e.g., from a client device) a request to recommend eliminating a variable that is causing the variable index to increase or decrease the variable index by too much. The request can include text indicating the request and/or an identification of the profile of the user making the request. Responsive to receiving the request, the machine learning language processing model can retrieve the variable index for the profile and retrieve the data records for the variables of the variable index. The machine learning language processing model can generate parameters for the relationship computer model using the parameter machine learning model and the data records and then configure the relationship computing model with the parameters. The machine learning language processing model can execute the relationship computer model using the data records to determine relationships for pairs of the variables. The machine learning language processing model can compare the relationships for individual variables with each other to identify variables with relationships that are causing the most risk (e.g., the variables that correspond with the highest positive relationship values, on average) or variables that are causing the least amount of risk (e.g., the variables that correspond with the lowest negative relationship values, on average), as indicated in the request. The machine learning language processing model can automatically remove the identified variables from the variable index and/or generate a recommendation to remove the identified variables from the variable index for display on the client device that submitted the request.

In another example, the server can recommend making a change to a variable index to accommodate the potential addition of a different variable to the variable index. For instance, the server can receive (e.g., from a client device) a request to recommend any changes that are necessary for a variable index based on the addition of a particular variable to the variable index. The request can include text indicating the request, an identification of the profile of the user making the request, and/or an identification of the variable to be added to the variable index. In some cases, the request can include index characteristics for the variable index to have. Responsive to receiving the request, the machine learning language processing model can retrieve the variable index for the profile and retrieve the data records for the variables of the variable index and the variable to be added to the variable index. The machine learning language processing model can also retrieve data records of other data records not included in the variable index, such as variables that satisfy criteria. For instance, the machine learning language processing can retrieve variables with a certain characteristic based on the criteria in the request, such variables associated with a "green" attribute in response to a request such as "I want to add green companies or remove non-green companies from my variable index with my addition of company A to my variable index." The machine learning language processing model can generate parameters for the relationship computer model using the parameter machine learning model and the data records and then configure the relationship computing model with the parameters. The machine learning language processing model can execute the relationship computer model using the data records to determine relationships for pairs of the variables. The machine learning language processing model can determine an average or median relationship value of the variables of the variable index including the additional variable and determine whether the average or median relationship value satisfies an index characteristic (e.g., exceeds or is less than an index risk threshold). The machine learning language processing model can determine the addition causes the variable index not to have the one or more index characteristics. In response to the determination, the machine learning language processing model can identify relationships of the variables outside of the variable index and identify variables with relationships that will cause the variable index to have the one or more index characteristics. In some cases, the machine learning language processing model can additionally or instead identify variables of the variable index with relationships that are causing the variable index not to have the one or more index characteristics. The machine learning language processing model can automatically adjust the variable index according to the identifications to cause the variable index to have the one or more index characteristics and/or generate a recommendation for such an adjustment for display on the client device that submitted the request.

In another example, the server may provide users with an interactive experience in which users can run scenarios of different asset allocations for a variable index and the server can automatically generate projects for the asset allocations. For instance, the server can receive (e.g., from a client device) a request to run a scenario with a particular asset allocation for a user's variable index. The request can include text and/or selections from a user interface provided by the server indicating the request, an identification of the profile of the user making the request, and/or the asset allocations of the variable to be added to the variable index. Responsive to receiving the request, the machine learning language processing model can retrieve the variable index for the profile and retrieve the data records for the variables of the variable index. The machine learning language processing model can identify a performance prediction machine learning model that is configured to automatically generate forecasts of performance for variable indices based on input allocations for the variables of the variable indices and/or historical data records for the variables. The machine learning language processing model can input the data records retrieved from the variable index and input the data records into the performance prediction machine learning model with the input allocations for the variable index. The machine learning language processing model can execute the performance prediction machine learning model based on the input to cause the performance prediction machine learning model to output an aggregate predicted performance (e.g., total change) for the variable index based on the input allocations for a set time period. In some cases, the user can include the time period in the request and the machine learning language processing model can include the requested time period in the input into the performance prediction machine learning model to cause the performance prediction machine learning model to generate an aggregate predicted performance for the variable index with the requested allocations for the requested time period. The server can cause presentation of the predicted performance at the user interface. The user can view the predicted performance and adjust the request by adjusting the allocations and/or the time period to cause the machine learning language processing system to repeat the process to generate a new predicted performance according to the adjusted request. Thus, the server can use the machine learning language processing system for real-time and dynamic projections for different variable allocations.

In another example, the server may generate variable indices for individual users. For instance, the server can receive (e.g., from a client device) a request to generate a variable index for a user. The request can include text and/or selections from a user interface provided by the server indicating the request and/or an identification of the profile of the user making the request. Responsive to receiving the request, the machine learning language processing model can retrieve user characteristics of the user from the profile or identify user characteristics that the user included in the request. The machine learning language processing model can execute an index characteristic model using the user characteristics as input to generate one or more index characteristics for the variable index. In some cases, the user can include index characteristics in the request. For example, a request may be "Generate me a variable index that only includes green energy and/or gun companies." In this example, the machine learning language processing model may only query for variables associated with green energy and/or guns to generate the variable index. The machine learning language processing model can query a data source for data records of a defined or stored set of variables. In some cases, the machine learning language processing model can query the data source for data records of variables identified in the request. The machine learning language processing model can retrieve the data records based on the query. The machine learning language processing model can execute the parameter model and/or the relationship model as described herein to identify a variable index that has the one or more index characteristics. The server can cause presentation of the variable index to the user at the client device.

The server can use the machine learning language processing model, the relationship computer model, and/or any other type of computer model stored by the server to make any type of on-demand changes and/or recommendations for a variable index. For example, the server can automatically remove variables from a variable index that is causing the variable index to have an average or median relationship value that is too high (e.g., above a threshold) or too low (e.g., below a threshold). The server can use a rule-based computer model to generate different versions of a variable index and execute the machine learning language processing model to either select the version of the variable index that satisfies one or more input or determined index characteristics of a user or propose adjustments to one of the versions of the variable index to cause the version of the variable index to have the one or more index characteristics.

In a few more examples, the server can use the machine learning language processing model to automatically generate and perform phone calls requesting information about a variable and include the information as input into the machine learning language processing model when generating recommendations as described herein to determine whether to include the variable in a recommendation and/or if the variable would cause a variable index to have one or more index characteristics. The server can use the machine learning language processing model to automatically scrape web pages identifying or otherwise associated with specific variables to collect data regarding variables and include the collected data in inputs into the machine learning language processing model when generating recommendations as described herein to determine whether to include the variables in a recommendation and/or if the variables would cause a variable index to have one or more index characteristics.

Figure 22:
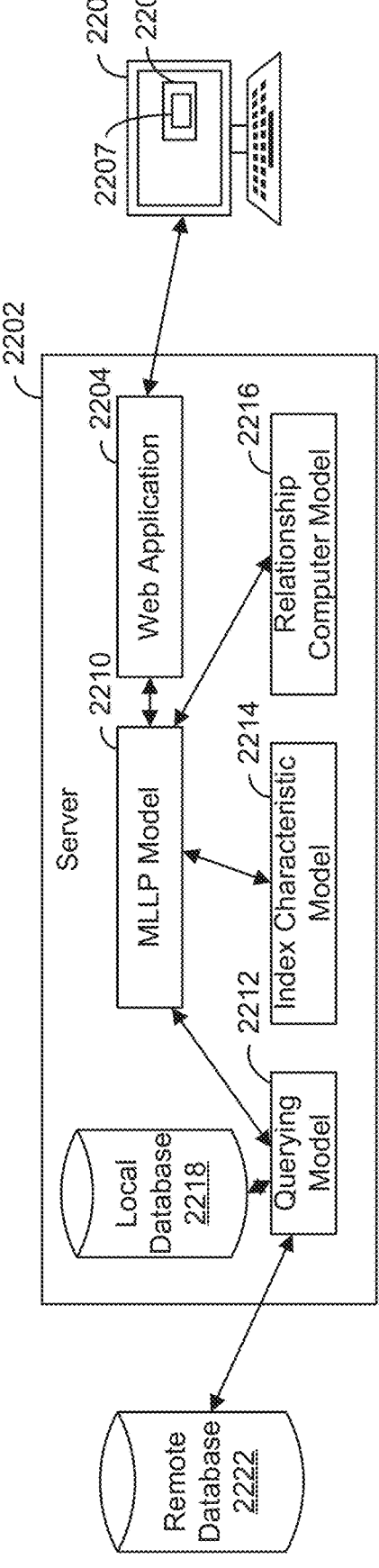
FIG. 22 depicts a sequence for generating a variable index based on relationships between variables, according to an embodiment.

FIG. 22 depicts a sequence diagram 2200 depicting operational steps for generating a variable index based on relationships between variables, according to an embodiment. The operational steps may be performed by a server (e.g., the server 100 or the server 1810a). However, one or more of the operational steps may be executed by any number of computing devices operating in the distributed computing system described in FIG. 1 or FIG. 18. For instance, one or more computing devices (e.g., user devices) may locally perform part or all of the operational steps described with reference to FIG. 22. Moreover, one or more of the operational steps can be performed via any processor of the system, such as any processor of the system 100 or the system 1800. One or more of the operational steps depicted and described with reference to FIG. 22 can be similar to or the same as one or more corresponding operational steps depicted and described with reference to FIG. 20.

In the sequence diagram 2200, a server 2202 can execute a web application 2204 to cause presentation of a user interface 2206 to a user at a computing device 2208. The web application 2204 can be an application configured to host a web platform through which users can manage variable indices of profiles owned by the users and/or generate recommendations regarding the variable indices based on requests from the users. The server 2202 can receive such requests and generate responses to the requests using a machine learning language processing (MLLP) model 2210, which can receive the requests and identify and execute different models and/or applications stored in memory of the server 2202 to generate responses to the requests. The web application 2204 can display the responses to the user at the user interface 2206 displayed on the computing device 2208.

For example, a user can input a request for a recommendation of variables to include in a variable index associated with the user. The user can input the request into the user interface 2206 provided by the web application 2204 on the computing device 2208. The user can include selections or identifications of variables not currently in the variable indices of the user in the request. Such variables may be variables that the user is considering adding to the variable index. The web application 2204 can pass the request to the MLLP model 2210. The MLLP model 2210 can process the request for variables to monitor and identify a querying model 2212, an index characteristic model 2214, and/or a relationship computer model 2216 to use to generate a response to the request.

The MLLP model 2210 can transmit the identifications of the variables as well as an identification of the user's profile (e.g., which may be included in the request and/or retrieved by the MLLP model 2210 based on the account that the user is using to access the platform provided by the server 2202) to the querying model 2212. The MLLP model 2210 can first execute the querying model 2212 using the identification of the user's profile to cause the querying model 2212 to generate a query for variables of the variable index associated with the user. The querying model 2212 can use the generated query to query the local database 2218, which may be a database storing data (e.g., variable indices and/or demographic data) for different profiles. The querying model 2212 can retrieve identifications of the variables of the variable index of the profile associated with the request using the identification of the user's profile to generate the query for the retrieval.

Responsive to retrieving the identifications of the variables of the variable index of the profile, the MLLP model 2210 can execute the querying model 2212 again using the identifications of the variables in the variable index as well as the identifications of the variables included in the request to generate one or more one or more queries for data records containing historical performance data for the variables. The querying model 2212 can use the generated queries to query one or more data sources, such as a data source 2220, that contain data records for the variables. The querying model 2212 can query the one or more data sources to retrieve data records for the variables. In some cases, the querying model 2212 can query the one or more data sources by requesting data records with timestamps within a defined time period input by the MLLP model 2210 and/or a time period for which the querying model 2212 is trained to generate queries and/or retrieve data records. The querying model 2212 can retrieve the data records and pass the data records back to the MLLP model 2210 and/or send the data records to the relationship computer model 2216 for further processing.

The MLLP model 2210 can determine index characteristics to use to respond to the request for a recommendation for a combination of variables to include in the variable index. In one example, the MLLP model 2210 the user can include the index characteristics in the input request. The MLLP model 2210 can determine the index characteristics by identifying the index characteristics from the request. In another example, the MLLP model 2210 can determine the index characteristics using the index characteristic model 2214. The index characteristic model 2214 can be a machine learning model (e.g., a support vector machine, random forest, neural network, etc.) that has been trained to generate index characteristics based on inputs such as based on characteristics of the user that submitted the request. For instance, the user can include characteristics of the user (e.g., demographic information) in the request, or the querying model 2212 can retrieve such characteristics from the profile for the user (e.g., when retrieving the identifications of the variables of the variable index for the profile of the user). The MLLP model 2210 can input the characteristics of the user in the index characteristic model 2214 and execute the index characteristic model 2214. The execution can cause the index characteristic model 2214 to output index characteristics that indicates criteria for the MLLP model

2210 to follow when generating the response to the request for a recommendation of a combination of variables to include in the variable index.

The MLLP model 2210 can execute the relationship computer model 2216 using the data records retrieved from the data sources as input. The execution can cause the relationship computer model 2216 to generate relationships for individual pairs of the variables. For example, the relationship computer model 2216 can determine positive unions and/or negative unions of corresponding data records for different pairs of variables of the variable index and/or not of the variable index using upper threshold parameters and/or lower threshold parameters for the respective variables as described herein. The relationship computer model 2216 can determine counts of positive and/or negative unions for individual pairs of variables from the set of data records. The relationship computer model 2216 can determine relationship values (e.g., Gerber Statistics) for the individual pairs of variables as a function of the counts of positive and/or negative unions for each of the pairs of variables.

The MLLP model 2210 can determine a set of variables to recommend as a combination of variables to include in the variable index based on the relationships and/or relationship values output by the relationship computer model. The MLLP model 2210 can do so by iteratively identifying different combinations of variables not currently included in the variable index and determining if the combinations cause the variable index to have the index characteristics determined by the MLLP model 2210. For example, the MLLP model 2210 can identify a potential set of one or more variables not currently included the variable index. The MLLP model 2210 can do so by randomly or pseudo-randomly selecting the variables to include in the potential set of one or more variables. The MLLP model 2210 can determine whether the potential set of variables causes the variable index to have the one or more index characteristics. MLLP model 2210 can do so by comparing the relationship values that the individual variables of the potential set of variables have with each other as well as the remaining variables in the variable index after the inclusion of the potential set of one or more variables in the variable index. The MLLP model 2210 can determine an average relationship value, a median relationship value, or any other output relationship value based on the relationship values of the pairs of variables. The MLLP model 2210 can determine whether the output relationship value exceeds or otherwise satisfies the one or more index characteristics, such as by determining whether the output relationship value is above or below a maximum and/or minimum acceptable risk threshold parameter. In some cases, the MLLP model 2210 can additionally or instead determine if the types of variables of the variable index with the potential set of variables added satisfies criteria indicating an acceptable ratio of types of variables or any other rule or criteria of the index characteristics.

Responsive to determining the variable index with the potential set of one or more variables included does not satisfy the one or more index characteristics, the MLLP model 2210 can adjust the potential set of one or more variables. The MLLP model 2210 can adjust the potential set of one or more variables by adding and/or removing one or more variables from the potential set of variables. The MLLP model 2210 can add and/or remove one or more random or pseudo-random variables from the variables not currently included in the variable index to the potential set of variables. The MLLP model 2210 can then determine whether the variable index would have the one or more index characteristics with the adjusted potential set of one or more variables. The MLLP model 2210 can iteratively add and/or remove variables to the potential set of variables in this manner until determining a potential set of variables that causes the variable index to have the one or more index characteristics.

Responsive to the MLLP model 2210 determining the potential set of variables that causes the variable index to have the one or more index characteristics, the server 2202 can cause presentation of the potential set of variables on the user interface 2206 in a recommendation for a combination of variables to include in the variable index. For example, the server 2202 can execute the MLLP model 2210 to cause the MLLP model 2210 to generate a text output with the set of variables, in some cases with commentary or an analysis or description of the set of variables. The MLLP model 2210 can pass the set of variables and/or the relationship values to the web application 2204, which can in turn cause presentation of the output from the MLLP model 2210 on the user interface 2206. In some cases, the MLLP model 2210 can directly pass the set of variables to the web application 2204 after determining the set of variables cause the variable index to have the one or more index characteristics without further processing for presentation on the user interface 2206.

In a non-limiting example, a user accessing the computing device 2208 can input an identification of the user's profile with the server 2202 and/or identifications of variables A-F that are not currently included in the user's variable index into a chat component 2207 of the user interface 2206. The user may input such a request because the user may be considering adding variables A-F to the user's variable index. The computing device 2208 can transmit the request with the identifications of the variables A-F and the identification of the user's profile to the web application 2204 executing on the server 2202.

The web application 2204 can pass the request with the identification of the profile and the identifications of variables A-F to the MLLP model 2210. The server 2202 can execute the MLLP model 2210 using the request, the identification of the profile, and identifications of the variables A-F. Based on the execution, the MLLP model 2210 can retrieve identifications of variables in the variable index of the user's profile from the local database 2218 using the querying model 2212. The MLLP model 2210 can use the querying model 2212 with the identifications of the variables of the variable index and variables A-F to retrieve data records for the variables from the remote database 2222. The querying model 2212 can pass the data records to the MLLP model 2210 and/or to the relationship computer model 2216.

The MLLP model 2210 can determine index characteristics to use to generate the response. The MLLP model 2210 can do so using user characteristics of the user and the index characteristic model 2214. For example, the querying model 2212 can retrieve user characteristics of the user from the user's profile when querying the local database 2218. The user characteristics can be or include age, risk tolerance, and/or any other demographic information. In some cases, the user can include the user characteristics in the request input into the user interface 2206. The MLLP model 2210 can input the user characteristics into the index characteristic model 2214 and execute the index characteristic model 2214. Based on the execution, the index characteristic model 2214 can output index characteristics indicating a maximum average relationship value for the variable index of 0.7, the variable index may only include individual stocks for green energy companies and index funds and that the ratio of stocks to index funds have to be 30/70. The index characteristic model 2214 can pass the index characteristics to the MLLP model.

The MLLP model 2210 can determine relationships between different pairs of the variables of the variable index and the variables A-F. The MLLP model 2210 can do so using the relationship computer model 2216. For example, the MLLP model 2210 can execute the relationship computer model 2216 using the data records that the querying model 2212 retrieved for the variables of the variable index and/or the variables A-F. Based on the execution, the relationship computer model 2216 can determine relationship values for the pairs of variables. The relationship computer model 2216 can pass the relationship values back to the MLLP model 2210.

The MLLP model 2210 can determine a set of variables that causes the variable index to have the one or more index characteristics when included in the variable index. For example, the MLLP model 2210 can variables A and B to the variable index to generate a potential variable index. Based on the addition, the MLLP model 2210 can determine whether the potential variable index has an average relationship value below 0.7, only includes individual stocks for green energy companies and index funds, and has a stock to index fund ratio of 30/70. The MLLP model 2210 can determine at least one of the index characteristics is not satisfied and remove one of the variables from the potential variable index and repeat the evaluation. The MLLP model 2210 can repeat this process for different combinations of adding variables A and B and removing variables form the variable index until determining a potential variable index that has the one or more index characteristics or determining such a potential variable index does not exist based only on variables A and B. Responsive to determining such a potential variable index does not exist, the MLLP model 2210 can repeat the process by adding variables A, B, and D to variable index to generate a new potential variable index. The MLLP model 2210 can repeat the process any number of times for any combination of the variables A-F until determining variables a combination of variables A-F that can be added to the variable index, and in some cases variables to remove from the variable index, to cause the variable index to have the one or more index characteristics. The MLLP model 2210 can cause presentation of the set of variables that the MLLP model 2210 determined cause the variable index to have the one or more index characteristics on the user interface 2206, in some cases with identifications of variables to remove from the variable index to enable the set of variables to cause the variable index to have the one or more index characteristics. In some cases, the MLLP model 2210 can automatically change or adjust the variable index profile according to the recommendation, such as based on an indication to do so in the initial request.

For instance, the chat component 2207 can include a messaging interface in which the user can provide inputs into a form and select a submit button to cause the inputs to be transmitted to the server 2202. The user's input can be depicted in a thread above or next to the form within the chat component 2207, such as in text bubbles, in list form, or in paragraph form. The server 2202 can generate responses based on the inputs, such as by performing the processing described herein, and generate the responses for presentation within the chat component 2207. In some cases, the server 2202 can configure the chat component 2207 by positioned the responses in the chat component 2207, such as above the previous input. The server 2202 can be configured to take into account entire threads when generating responses through the MLLP model 2210. For example, the server 2202 can generate a text output identifying a set of variables and cause presentation of the text output for display within the chat component 2207. The user can provide an input asking for a recalculation (e.g., with a new parameter for the parameter model 2214) and/or with a question about the output set of variables. In cases in which the user provides an input requesting a recalculation, the server 2202 can repeat the process of generating identifications of a set of variables using the relationship computer model 2216, in some cases with the input parameters. In cases in which the user asks a question about the set of variables, the server 2202 can input the request into the MLLP model 2210, in some cases with one or more, or all, of the messages of the thread of messages with the computing device 2208 and execute the MLLP model 2210 to generate a response. The server 2202 can generate responses for display on the chat component 2207 in list form or in chat bubbles.

Advantageously, by implementing the machine learning architecture as described herein, a computer can operate as a robo-advisor and generate customized responses to a wider variety of requests than conventional algorithm-based or machine learning-based robo-advisors. The computer can execute task-specific applications and/or machine learning models using a machine learning language processing model to generate allocations and/or variables to monitor and/or include in a variable index. The computer can use Gerber relationships between pairs of variables to facilitate variables and/or allocations to recommend for a variable index. In doing so, the computer can generate customized responses for specific users and/or variables to individual requests that could otherwise not be generated or could only be generated with substantial processing latency or memory resource usage under an algorithm-based approach that may brute force generation of such responses by generating different simulated variable indices.

Unless specifically stated otherwise as apparent from the following discussion, it is appreciated that throughout the description, discussions utilizing terms such as "creating," "executing," "providing," "calculating," "processing," "computing," "transmitting," "receiving," "determining," "displaying," "identifying," "presenting," "establishing," or the like, can refer to the action and processes of a data processing system, or similar electronic device, that manipulates and transforms data represented as physical (electronic) quantities within the system's registers or memories into other data similarly represented as physical quantities within the system's memories or registers or other such information storage, transmission or display devices. The system can be installed on a mobile device.

The embodiments can relate to an apparatus for performing one or more of the functions described herein. This apparatus may be specially constructed for the required purposes, or it may comprise a specially-programmed computer selectively activated or reconfigured by a computer program stored in the computer. Such a computer program may be stored in a machine (e.g. computer) readable storage medium, such as, but not limited to, any type of disk including floppy disks, optical disks, CD-ROMs and magnetic-optical disks, read only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

The embodiments described herein are described as software executed on at least one server, though it is understood that embodiments can be configured in other ways and retain functionality. The embodiments can be implemented on known non-transitory devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to the disclosure.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components can be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms "determine," "calculate" and "compute," and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A method, comprising:

receiving, by a server, an input indicating a plurality of variables on a graphical user interface displayed on a client computing device, the plurality of variables corresponding to a plurality of data records comprising historical data associated with the plurality of variables;

executing, by the server, a machine learning model using the plurality of data records as input to generate one or more parameters, the one or more parameters comprising at least a time period for the plurality of variables, an alert threshold parameter for the plurality of variables, a lower relationship threshold parameter for each of the plurality of variables, and an upper relationship threshold parameter for each of the plurality of variables for a relationship computer model configured to automatically generate a relationship for each of one or more pairs of the plurality of variables;

responsive to the generation, configuring, by the server, the relationship computer model according to the time period for the plurality of variables, the alert threshold parameter for the plurality of variables, the lower relationship threshold parameter for each of the plurality of variables, and the upper relationship threshold parameter for each of the plurality of variables generated by the machine learning model;

executing, by the server, the configured relationship computer model to generate a relationship for each of the one or more pairs of the plurality of variables, wherein executing the configured relationship computer model comprises:

selecting, by the configured relationship computer model, a set of data records from the plurality of data records based on each of the set of data records corresponding to a timestamp within the time period;

for each of the one or more pairs of the plurality of variables:

determining, by the configured relationship computer model using the selected set of data records, whether a first data record of a pair of data records for a first variable of the pair of variables and a second data record of the pair of data records for a second variable of the pair of variables have a positive union or a negative union based on whether a respective value of performance data of the first data record and the second data record exceeds the upper relationship threshold parameter for a respective first or second variable or is less than the lower relationship threshold parameter for another of the respective first or second variable; and determining, by the configured relationship computer model, a relationship value of the relationship for the pair of variables as a function of a count of positive unions for the pair of variables and a count of negative unions for the pair of variables; and identifying, by the configured relationship computer model, a set of pairs of variables that correspond to a relationship value exceeding the alert threshold parameter; and generating, by the server to the client computing device, an alert indicating the set of pairs of variables and the relationship values has exceeded the alert threshold parameter representing the strength of the relationship for the set of pairs of variables.

2. The method of claim 1, further comprising:

retrieving, by the server, a training data set comprising a second set of data records comprising second historical data associated with a second plurality of variables;

executing, by the server, the machine learning model using the training data set to output second one or more parameters for the relationship computer model;

responsive to the output, configuring, by the server, the relationship computer model according to the second one or more configuration parameters output by the machine learning model;

executing, by the server, the relationship computer model configured according to the second one or more configuration parameters using the training data set to generate second one or more relationships within each of second one or more pairs of the second plurality of variables;

assigning, by the server, values to the plurality of variables based on the generated second one or more relationships;

retrieving, by the server, performance data for the plurality of variables from a database stored on a remote computing device;

determining, by the server, a performance score for the plurality of variables based on the assigned values and the performance data for the plurality of variables; and training, by the server, the machine learning model based on the determined performance score for the plurality of variables.

3. The method of claim 1, wherein executing the machine learning model to generate the lower relationship threshold parameter for each of the plurality of variables and the upper relationship threshold parameter for each of the plurality of variables generated by the machine learning model comprises executing, by the server, the machine learning model to generate a different lower relationship threshold parameter for each of the plurality of variables, and a different upper relationship threshold parameter for each of the plurality of variables.

4. The method of claim 1, wherein configuring the relationship computer model comprises inputting, by the server, the one or more parameters into the relationship computer model using a machine learning language processing model.

5. The method of claim 1, further comprising:

receiving, by the server, a text string from the graphical user interface requesting an allocation of the plurality of variables; and executing, by the server, a machine learning language processing model using the text string and identifications of the plurality of variables as input to generate an output text string including the allocation of the plurality of variables.

6. The method of claim 5, further comprising:

determining, by the server using the machine learning language processing model, the allocation of the plurality of variables based on the generated one or more relationships within each of the one or more pairs of the plurality of variables; and generating, by the server, the allocation of the plurality of variables to the graphical user interface displayed on the client device.

7. The method of claim 6, wherein determining the allocation of the plurality of variables based on the generated one or more relationships comprises executing, by the server using the machine learning language processing model, a second machine learning model using at least the one or more relationships within each of the one or more pairs of the plurality of variables as input to generate the allocation of the plurality of variables.

8. The method of claim 6, wherein determining the allocation of the plurality of variables based on the generated one or more relationships comprises removing, by the server using the machine learning language processing model, one or more variables from the plurality of variables, and generating, by the server using the machine learning language processing model, allocations for variables of the plurality of variables remaining after the removal.

9. The method of claim 6, wherein determining the allocation of the plurality of variables based on the generated one or more relationships comprises assigning, by the server using the machine learning language processing model, a value to each of one or more of the plurality of variables.

10. The method of claim 1, comprising:

executing, by the server, the machine learning model and the relationship computer model using a machine learning language processing model responsive to the machine learning language processing model generating identifications of the machine learning model and the relationship computer model based on the input indicating the plurality of variables.

11. A system, comprising:

a processor; and a non-transitory, computer-readable medium comprising instructions which, when executed by the processor, cause the processor to:

receive an input indicating a plurality of variables on a graphical user interface displayed on a client computing device, the plurality of variables corresponding to a plurality of data records comprising historical data associated with the plurality of variables;

execute a machine learning model using the plurality of data records as input to generate one or more parameters, the one or more parameters comprising at least a time period for the plurality of variables, an alert threshold parameter for the plurality of variables, a lower relationship threshold parameter for each of the plurality of variables, and an upper relationship threshold parameter for each of the plurality of variables for a relationship computer model configured to automatically generate a relationship for each of one or more pairs of the plurality of variables;

responsive to the generation, configure the relationship computer model according to the time period for the plurality of variables, the alert threshold parameter for the plurality of variables, the lower relationship threshold parameter for each of the plurality of variables, and the upper relationship threshold parameter for each of the plurality of variables generated by the machine learning model;

execute the configured relationship computer model to generate a relationship for each of the one or more pairs of the plurality of variables, wherein executing the configured relationship computer model comprises:

select, using the configured relationship computer model, a set of data records from the plurality of data records based on each of the set of data records corresponding to a timestamp within the time period;

for each of the one or more pairs of the plurality of variables:

determine, using the configured relationship computer model using the selected set of data records, whether a first data record of a pair of data records for a first variable of the pair of variables and a second data record of the pair of data records for a second variable of the pair of variables have a positive union or a negative union based on whether a respective value of performance data of the first data record and the second data record exceeds the upper relationship threshold parameter for a respective first or second variable or is less than the lower relationship threshold parameter for another of the respective first or second variable; and determine a relationship value of the relationship for the pair of variables as a function of a count of positive unions for the pair of variables and a count of negative unions for the pair of variables; and identify, using the configured relationship computer model, a set of pairs of variables that correspond to a relationship value exceeding the alert threshold parameter; and generate, to the client computing device, an alert indicating the set of pairs of variables and the relationship values has exceeded the alert threshold parameter representing the strength of the relationship for the set of pairs of variables.

12. The system of claim 11, wherein the instructions further cause the processor to:

retrieve a training data set comprising a second set of data records comprising second historical data associated with a second plurality of variables;

execute the machine learning model using the training data set to generate second one or more parameters for the relationship computer model;

responsive to the generation, configure the relationship computer model according to the second one or more configuration parameters generated by the machine learning model;

execute the relationship computer model configured according to the second one or more configuration parameters using the training data set to generate second one or more relationships within each of second one or more pairs of the second plurality of variables;

assign values to the plurality of variables based on the generated second one or more relationships;

retrieve performance data for the plurality of variables from a database stored on a remote computing device;

determine a performance score for the plurality of variables based on the assigned values and the performance data for the plurality of variables; and train the machine learning model based on the determined performance score for the plurality of variables.

13. The system of claim 11, wherein the instructions cause the processor to execute the machine learning model to generate the lower relationship threshold parameter for each of the plurality of variables and the upper relationship threshold parameter for each of the plurality of variables generated by the machine learning model by executing the machine learning model to generate a different lower relationship threshold parameter for each of the plurality of variables, and a different upper relationship threshold parameter for each of the plurality of variables.

14. The system of claim 11, wherein the instructions cause the processor to configure the relationship computer model by inputting the one or more parameters into the relationship computer model using a machine learning language processing model.

15. The system of claim 11, wherein the instructions further cause the processor to:

receive a text string from the graphical user interface requesting an allocation of the plurality of variables; and execute a machine learning language processing model using the text string and identifications of the plurality of variables as input to generate an output text string including the allocation of the plurality of variables.

16. The system of claim 15, wherein the instructions further cause the processor to:

determine, using the machine learning language processing model, the allocation of the plurality of variables based on the generated one or more relationships within each of the one or more pairs of the plurality of variables; and generate the allocation of the plurality of variables to the graphical user interface displayed on the client device.

17. The system of claim 16, wherein the instructions cause the processor to determine the allocation of the plurality of variables based on the generated one or more relationships by executing, using the machine learning language processing model, a second machine learning model using at least the one or more relationships within each of the one or more pairs of the plurality of variables as input to generate the allocation of the plurality of variables.

18. The system of claim 16, wherein the instructions cause the processor to determine the allocation of the plurality of variables based on the generated one or more relationships by removing, using the machine learning language processing model, one or more variables from the plurality of variables, and generating, using the machine learning language processing model, allocations for variables of the plurality of variables remaining after the removal.

19. The system of claim 16, wherein the instructions cause the processor to determine the allocation of the plurality of variables based on the generated one or more relationships by assigning, using the machine learning language processing model, a value to each of one or more of the plurality of variables.

20. The system of claim 11, wherein the instructions cause the processor to:

execute the machine learning model and the relationship computer model using a machine learning language processing model responsive to the machine learning language processing model generating identifications of the machine learning model and the relationship computer model based on the input indicating the plurality of variables.

\* \* \* \* \*